United States Patent
Lopez

(10) Patent No.: US 9,775,029 B2
(45) Date of Patent: Sep. 26, 2017

(54) EMBEDDING CLOUD-BASED FUNCTIONALITIES IN A COMMUNICATION DEVICE

(71) Applicant: Visa International Service Association, San Francisco, CA (US)

(72) Inventor: Eduardo Lopez, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 66 days.

(21) Appl. No.: 14/834,028

(22) Filed: Aug. 24, 2015

(65) Prior Publication Data

US 2016/0057619 A1     Feb. 25, 2016

Related U.S. Application Data

(60) Provisional application No. 62/040,935, filed on Aug. 22, 2014.

(51) Int. Cl.
*H04L 29/06* (2006.01)
*H04W 12/04* (2009.01)
(Continued)

(52) U.S. Cl.
CPC ............ *H04W 12/04* (2013.01); *G06Q 20/32* (2013.01); *G06Q 20/322* (2013.01);
(Continued)

(58) Field of Classification Search
CPC .................................................. H04L 63/0853
(Continued)

(56) References Cited

U.S. PATENT DOCUMENTS

| 5,301,231 A | 4/1994 | Abraham |
| 5,336,870 A | 8/1994 | Hughes et al. |

(Continued)

FOREIGN PATENT DOCUMENTS

| CN | 102103683 A | 6/2011 |
| EA | 11495 B1 | 4/2009 |

(Continued)

OTHER PUBLICATIONS

International Search Report and Written Opinion dated Mar. 27, 2015 for International Patent Application No. PCT/US2014/071622, 11 pages.

(Continued)

*Primary Examiner* — Longbit Chai
(74) *Attorney, Agent, or Firm* — Kilpatrick Townsend & Stockton LLP

(57) ABSTRACT

Techniques for enhancing the security of a communication device may include providing an application agent that executes in a trusted execution environment of the communication device, and a transaction application that executes in a normal application execution environment of the communication device. The application agent may receive, from the application, a limited-use key (LUK) generated by a remote computer, and store the LUK in a secure storage of the trusted execution environment. When the application agent receives a request to conduct a transaction from the application executing in the normal execution environment, the application agent may generate a transaction cryptogram using the LUK, and provides the transaction cryptogram to an access device.

20 Claims, 18 Drawing Sheets

(51) Int. Cl.
*H04W 4/00* (2009.01)
*G06Q 20/32* (2012.01)
*G06Q 20/38* (2012.01)
*H04W 88/02* (2009.01)

(52) U.S. Cl.
CPC ....... *G06Q 20/327* (2013.01); *G06Q 20/3227* (2013.01); *G06Q 20/3278* (2013.01); *G06Q 20/382* (2013.01); *G06Q 20/385* (2013.01); *G06Q 20/3825* (2013.01); *G06Q 20/3829* (2013.01); *H04W 4/008* (2013.01); *H04L 63/068* (2013.01); *H04W 88/02* (2013.01)

(58) Field of Classification Search
USPC .......................................................... 726/26
See application file for complete search history.

(56) References Cited

U.S. PATENT DOCUMENTS

| | | |
|---|---|---|
| 5,365,586 A | 11/1994 | Indeck et al. |
| 5,450,537 A | 9/1995 | Hirai et al. |
| 5,548,282 A | 8/1996 | Escritt et al. |
| 5,613,012 A | 3/1997 | Hoffman |
| 5,625,669 A | 4/1997 | McGregor et al. |
| 5,640,577 A | 6/1997 | Scharmer |
| 5,729,591 A | 3/1998 | Bailey |
| 5,742,845 A | 4/1998 | Wagner |
| 5,781,438 A | 7/1998 | Lee |
| 5,794,259 A | 8/1998 | Kikinis |
| 5,883,810 A | 3/1999 | Franklin |
| 5,892,900 A | 4/1999 | Ginter |
| 5,953,710 A | 9/1999 | Fleming |
| 5,956,699 A | 9/1999 | Wong |
| 5,974,430 A | 10/1999 | Mutschler, III et al. |
| 6,000,832 A | 12/1999 | Franklin |
| 6,014,635 A | 1/2000 | Harris |
| 6,044,349 A | 3/2000 | Tolopka et al. |
| 6,044,360 A | 3/2000 | Picciallo |
| 6,067,621 A | 5/2000 | Yu et al. |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,421,729 B1 | 7/2002 | Paltenghe et al. |
| 6,422,462 B1 | 7/2002 | Cohen |
| 6,425,523 B1 | 7/2002 | Shem Ur |
| 6,490,601 B1 | 12/2002 | Markus et al. |
| 6,499,042 B1 | 12/2002 | Markus |
| 6,571,339 B1 | 5/2003 | Danneels et al. |
| 6,592,044 B1 | 7/2003 | Wong |
| 6,636,833 B1 | 10/2003 | Flitcroft |
| 6,658,568 B1 | 12/2003 | Ginter |
| 6,748,367 B1 | 6/2004 | Lee |
| 6,805,287 B2 | 10/2004 | Bishop |
| 6,850,996 B2 | 2/2005 | Wagner |
| 6,873,974 B1 | 3/2005 | Schutzer |
| 6,879,965 B2 | 4/2005 | Fung |
| 6,901,387 B2 | 5/2005 | Wells |
| 6,907,476 B2 | 6/2005 | Wagner |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,983,882 B2 | 1/2006 | Cassone |
| 6,990,470 B2 | 1/2006 | Hogan |
| 6,991,157 B2 | 1/2006 | Bishop |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,080,256 B1 | 7/2006 | Vedder |
| 7,103,576 B2 | 9/2006 | Mann, III |
| 7,110,792 B2 | 9/2006 | Rosenberg |
| 7,111,324 B2 | 9/2006 | Elteto et al. |
| 7,113,930 B2 | 9/2006 | Eccles |
| 7,136,835 B1 | 11/2006 | Flitcroft |
| 7,146,159 B1 | 12/2006 | Zhu |
| 7,159,180 B2 | 1/2007 | Ward |
| 7,177,835 B1 | 2/2007 | Walker |
| 7,177,848 B2 | 2/2007 | Hogan |
| 7,194,437 B1 | 3/2007 | Britto |
| 7,210,169 B2 | 4/2007 | Smith et al. |
| 7,216,292 B1 | 5/2007 | Snapper et al. |
| 7,218,915 B2 | 5/2007 | Craven |
| 7,228,155 B2 | 6/2007 | Saunders |
| 7,231,045 B1 | 6/2007 | Parrott |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,356,706 B2 | 4/2008 | Scheurich |
| 7,366,703 B2 | 4/2008 | Gray et al. |
| 7,374,082 B2 | 5/2008 | Van De Velde et al. |
| 7,376,583 B1 | 5/2008 | Rolf |
| 7,379,919 B2 | 5/2008 | Hogan |
| RE40,444 E | 7/2008 | Linehan |
| 7,412,420 B2 | 8/2008 | Holdsworth |
| 7,413,113 B1 | 8/2008 | Zhu |
| 7,415,270 B2 | 8/2008 | Wilhelmsson et al. |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,469,151 B2 | 12/2008 | Khan et al. |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,548,889 B2 | 6/2009 | Bhambri |
| 7,552,094 B2 | 6/2009 | Park et al. |
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano |
| 7,571,142 B1 | 8/2009 | Flitcroft |
| 7,580,898 B2 | 8/2009 | Brown et al. |
| 7,581,678 B2 | 9/2009 | Narendra |
| 7,584,153 B2 | 9/2009 | Brown |
| 7,587,756 B2 | 9/2009 | Peart et al. |
| 7,593,896 B1 | 9/2009 | Flitcroft |
| 7,599,863 B2 | 10/2009 | Sines et al. |
| 7,606,560 B2 | 10/2009 | Labrou |
| 7,627,531 B2 | 12/2009 | Breck et al. |
| 7,627,895 B2 | 12/2009 | Gifford |
| 7,628,322 B2 | 12/2009 | Holtmanns et al. |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |

(56) References Cited

U.S. PATENT DOCUMENTS

| | | |
|---|---|---|
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,857,225 B2 | 12/2010 | Challa et al. |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |
| 7,891,563 B2 | 2/2011 | Oder, II |
| 7,896,238 B2 | 3/2011 | Fein |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,954,717 B2 | 6/2011 | Narendra et al. |
| 7,959,076 B1 | 6/2011 | Hopkins, III |
| 7,966,257 B2 | 6/2011 | Digioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen et al. |
| 8,083,145 B2 | 12/2011 | Narendra et al. |
| 8,095,113 B2 | 1/2012 | Kean et al. |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,165,635 B2 | 4/2012 | Khan et al. |
| 8,171,525 B1 | 5/2012 | Pelly et al. |
| 8,196,131 B1 | 6/2012 | Von Behren et al. |
| 8,196,813 B2 | 6/2012 | Vadhri |
| 8,196,818 B2 | 6/2012 | Van De Velde et al. |
| 8,205,791 B2 | 6/2012 | Randazza |
| 8,224,702 B2 | 7/2012 | Mengerink |
| 8,225,089 B2 | 7/2012 | Wang et al. |
| 8,225,385 B2 | 7/2012 | Chow |
| 8,265,993 B2 | 9/2012 | Chien |
| 8,280,777 B2 | 10/2012 | Mengerink |
| 8,302,167 B2 | 10/2012 | Mennes et al. |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,474 B2 | 3/2013 | Charrat |
| 8,401,539 B2 | 3/2013 | Beenau |
| 8,401,898 B2 | 3/2013 | Chien |
| 8,403,211 B2 | 3/2013 | Brooks |
| 8,412,099 B2 | 4/2013 | Charrat |
| 8,412,623 B2 | 4/2013 | Moon |
| 8,412,631 B2 | 4/2013 | Crofts et al. |
| 8,412,837 B1 | 4/2013 | Emigh |
| 8,417,642 B2 | 4/2013 | Oren |
| 8,447,699 B2 | 5/2013 | Batada et al. |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway et al. |
| 8,498,908 B2 | 7/2013 | Mengerink |
| 8,504,478 B2 | 8/2013 | Saunders |
| 8,510,816 B2 | 8/2013 | Quach et al. |
| 8,523,059 B1 | 9/2013 | Mullen |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,594,566 B2 | 11/2013 | Zhu et al. |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,628,012 B1 | 1/2014 | Wallner |
| 8,635,157 B2 | 1/2014 | Smith |
| 8,644,959 B2 | 2/2014 | Hermann |
| 8,646,059 B1 | 2/2014 | Von Behren |
| 8,651,374 B2 | 2/2014 | Brabson et al. |
| 8,656,180 B2 | 2/2014 | Shablygin |
| 8,677,467 B2 | 3/2014 | Lincoln et al. |
| 8,700,729 B2 | 4/2014 | Dua |
| 8,706,556 B2 | 4/2014 | Mestre et al. |
| 8,712,325 B2 | 4/2014 | Leica et al. |
| 8,719,952 B1 | 5/2014 | Damm-Goossens |
| 8,855,314 B2 | 10/2014 | Modave et al. |
| 8,856,640 B1 | 10/2014 | Barr et al. |
| 8,955,039 B2 | 2/2015 | Prakash et al. |
| 8,990,572 B2 | 3/2015 | Patefield-Smith |
| 9,026,462 B2 | 5/2015 | Lin |
| 9,037,491 B1 | 5/2015 | Lee |
| 9,195,926 B2 | 11/2015 | Spodak |
| 9,361,619 B2 * | 6/2016 | Varadarajan ........ H04L 63/0853 |
| 9,411,601 B2 | 8/2016 | Zimmer et al. |
| 2001/0029485 A1 | 10/2001 | Brody et al. |
| 2001/0032182 A1 | 10/2001 | Kumar et al. |
| 2001/0034720 A1 | 10/2001 | Armes |
| 2001/0042785 A1 | 11/2001 | Walker et al. |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan |
| 2002/0016749 A1 | 2/2002 | Borecki |
| 2002/0023054 A1 | 2/2002 | Gillespie |
| 2002/0029193 A1 | 3/2002 | Ranjan |
| 2002/0035548 A1 | 3/2002 | Hogan |
| 2002/0049636 A1 | 4/2002 | Griffin |
| 2002/0073045 A1 | 6/2002 | Rubin |
| 2002/0091877 A1 | 7/2002 | Karidis |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0115142 A1 | 6/2003 | Brickell et al. |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0058705 A1 | 3/2004 | Morgan et al. |
| 2004/0059682 A1 | 3/2004 | Hasumi |
| 2004/0093281 A1 | 5/2004 | Silverstein |
| 2004/0104268 A1 | 6/2004 | Bailey |
| 2004/0127256 A1 | 7/2004 | Goldthwaite et al. |

(56) References Cited

U.S. PATENT DOCUMENTS

| | | |
|---|---|---|
| 2004/0139008 A1 | 7/2004 | Mascavage |
| 2004/0143532 A1 | 7/2004 | Lee |
| 2004/0158532 A1 | 8/2004 | Breck |
| 2004/0188519 A1 | 9/2004 | Cassone |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat et al. |
| 2004/0232225 A1 | 11/2004 | Bishop |
| 2004/0248554 A1 | 12/2004 | Khan et al. |
| 2004/0254890 A1 | 12/2004 | Sancho et al. |
| 2004/0260646 A1 | 12/2004 | Berardi |
| 2005/0037735 A1 | 2/2005 | Coutts |
| 2005/0043997 A1 | 2/2005 | Sahota et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0156026 A1 | 7/2005 | Ghosh et al. |
| 2005/0194452 A1 | 9/2005 | Nordentoft |
| 2005/0199709 A1 | 9/2005 | Linlor |
| 2005/0238174 A1 | 10/2005 | Kreitzer |
| 2005/0246293 A1 | 11/2005 | Ong |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0131390 A1 | 6/2006 | Kim |
| 2006/0142058 A1 | 6/2006 | Elias et al. |
| 2006/0168653 A1 | 7/2006 | Contrera |
| 2006/0235795 A1 | 10/2006 | Johnson |
| 2006/0237528 A1 | 10/2006 | Bishop |
| 2006/0253389 A1 | 11/2006 | Hagale |
| 2006/0278704 A1 | 12/2006 | Saunders |
| 2006/0294023 A1 | 12/2006 | Lu |
| 2007/0005685 A1 | 1/2007 | Chau et al. |
| 2007/0107044 A1 | 5/2007 | Yuen |
| 2007/0114274 A1 | 5/2007 | Gibbs |
| 2007/0118483 A1 | 5/2007 | Hill |
| 2007/0129955 A1 | 6/2007 | Dalmia |
| 2007/0136193 A1 | 6/2007 | Starr |
| 2007/0136211 A1 | 6/2007 | Brown |
| 2007/0143828 A1 | 6/2007 | Jeal et al. |
| 2007/0170247 A1 | 7/2007 | Friedman |
| 2007/0178883 A1 | 8/2007 | Nandagopal |
| 2007/0179885 A1 | 8/2007 | Bird |
| 2007/0208671 A1 | 9/2007 | Brown |
| 2007/0228148 A1 | 10/2007 | Rable |
| 2007/0245414 A1 | 10/2007 | Chan |
| 2007/0276765 A1 | 11/2007 | Hazel et al. |
| 2007/0284443 A1 | 12/2007 | Anson et al. |
| 2007/0288377 A1 | 12/2007 | Shaked |
| 2007/0291995 A1 | 12/2007 | Rivera |
| 2008/0001744 A1 | 1/2008 | Batra et al. |
| 2008/0011823 A1 | 1/2008 | Patel et al. |
| 2008/0014867 A1 | 1/2008 | Finn |
| 2008/0015988 A1 | 1/2008 | Brown |
| 2008/0029598 A1 | 2/2008 | Fernandes |
| 2008/0029607 A1 | 2/2008 | Mullen |
| 2008/0034221 A1 | 2/2008 | Hammad |
| 2008/0035738 A1 | 2/2008 | Mullen |
| 2008/0040276 A1 | 2/2008 | Hammad et al. |
| 2008/0040285 A1 | 2/2008 | Wankmueller |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0071681 A1 | 3/2008 | Khalid |
| 2008/0110983 A1 | 5/2008 | Ashfield |
| 2008/0126260 A1 | 5/2008 | Cox |
| 2008/0142582 A1 | 6/2008 | Corioni |
| 2008/0154770 A1 | 6/2008 | Rutherford et al. |
| 2008/0177796 A1 | 7/2008 | Eldering |
| 2008/0201264 A1 | 8/2008 | Brown |
| 2008/0201265 A1 | 8/2008 | Hewton |
| 2008/0201577 A1 | 8/2008 | Tuliani |
| 2008/0208759 A1 | 8/2008 | Royyuru |
| 2008/0228646 A1 | 9/2008 | Myers |
| 2008/0228653 A1 | 9/2008 | Holdsworth |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0037333 A1 | 2/2009 | Flitcroft |
| 2009/0043702 A1 | 2/2009 | Bennett |
| 2009/0048953 A1 | 2/2009 | Hazel et al. |
| 2009/0048971 A1 | 2/2009 | Hathaway |
| 2009/0104888 A1 | 4/2009 | Cox |
| 2009/0106112 A1 | 4/2009 | Dalmia |
| 2009/0106138 A1 | 4/2009 | Smith |
| 2009/0106160 A1 | 4/2009 | Skowronek |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Mcato |
| 2009/0200371 A1 | 8/2009 | Kean |
| 2009/0216681 A1 | 8/2009 | McCown et al. |
| 2009/0219430 A1 | 9/2009 | Okamoto |
| 2009/0248583 A1 | 10/2009 | Chhabra |
| 2009/0255987 A1 | 10/2009 | Olivares Baena |
| 2009/0265260 A1 | 10/2009 | Aabye et al. |
| 2009/0276347 A1 | 11/2009 | Kargman |
| 2009/0289110 A1 | 11/2009 | Regen et al. |
| 2009/0294527 A1 | 12/2009 | Brabson |
| 2009/0300351 A1 | 12/2009 | Lei et al. |
| 2009/0307139 A1 | 12/2009 | Mardikar et al. |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0327131 A1 | 12/2009 | Beenau |
| 2010/0008535 A1 | 1/2010 | Abulafia |
| 2010/0042841 A1 | 2/2010 | King et al. |
| 2010/0082444 A1 | 4/2010 | Lin et al. |
| 2010/0082485 A1 | 4/2010 | Lin et al. |
| 2010/0088237 A1 | 4/2010 | Wankmueller |
| 2010/0094755 A1 | 4/2010 | Kloster |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0176935 A1 | 7/2010 | Phillips |
| 2010/0185545 A1 | 7/2010 | Royyuru et al. |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0274692 A1 | 10/2010 | Hammad |
| 2010/0274712 A1 | 10/2010 | Mestr et al. |
| 2010/0274721 A1 | 10/2010 | Hammad |
| 2010/0291904 A1 | 11/2010 | Musfeldt et al. |
| 2010/0293189 A1 | 11/2010 | Hammad |
| 2010/0293381 A1 | 11/2010 | Hammad |

(56) References Cited

U.S. PATENT DOCUMENTS

| | | |
|---|---|---|
| 2010/0293382 A1 | 11/2010 | Hammad |
| 2010/0306076 A1 | 12/2010 | Taveau et al. |
| 2010/0318801 A1 | 12/2010 | Roberge et al. |
| 2010/0325041 A1 | 12/2010 | Berardi |
| 2010/0327054 A1 | 12/2010 | Hammad |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0078081 A1 | 3/2011 | Pirzadeh |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0112918 A1 | 5/2011 | Mestre et al. |
| 2011/0112920 A1 | 5/2011 | Mestre et al. |
| 2011/0125597 A1 | 5/2011 | Oder, II |
| 2011/0153437 A1 | 6/2011 | Archer et al. |
| 2011/0154466 A1 | 6/2011 | Harper |
| 2011/0161233 A1 | 6/2011 | Tieken |
| 2011/0184867 A1 | 7/2011 | Varadarajan |
| 2011/0191244 A1 | 8/2011 | Dai |
| 2011/0208529 A1 | 8/2011 | Jeal et al. |
| 2011/0238511 A1 | 9/2011 | Park |
| 2011/0238573 A1 | 9/2011 | Varadarajan |
| 2011/0238579 A1 | 9/2011 | Coppinger |
| 2011/0240745 A1 | 10/2011 | Brown |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hrka |
| 2012/0035998 A1 | 2/2012 | Chien |
| 2012/0041881 A1 | 2/2012 | Basu |
| 2012/0047237 A1 | 2/2012 | Arvidsson et al. |
| 2012/0066078 A1 | 3/2012 | Kingston |
| 2012/0072350 A1 | 3/2012 | Goldthwaite |
| 2012/0078735 A1 | 3/2012 | Bauer et al. |
| 2012/0078798 A1 | 3/2012 | Downing |
| 2012/0078799 A1 | 3/2012 | Jackson |
| 2012/0084206 A1 | 4/2012 | Mehew et al. |
| 2012/0089519 A1 | 4/2012 | Peddada |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0124394 A1 | 5/2012 | Brudnicki et al. |
| 2012/0129514 A1 | 5/2012 | Beenau |
| 2012/0143707 A1 | 6/2012 | Jain |
| 2012/0143752 A1 | 6/2012 | Wong et al. |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama et al. |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0284526 A1 | 11/2012 | Arnold |
| 2012/0290376 A1 | 11/2012 | Dryer et al. |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0317628 A1 | 12/2012 | Yeager |
| 2012/0324566 A1 | 12/2012 | Baum et al. |
| 2013/0017784 A1 | 1/2013 | Fisher |
| 2013/0019098 A1 | 1/2013 | Gupta |
| 2013/0028502 A1 | 1/2013 | Nepomniachtchi et al. |
| 2013/0054336 A1 | 2/2013 | Graylin |
| 2013/0054337 A1 | 2/2013 | Brendell |
| 2013/0054466 A1 | 2/2013 | Mcato |
| 2013/0054474 A1 | 2/2013 | Yeager |
| 2013/0081122 A1 | 3/2013 | Svigals |
| 2013/0086375 A1 | 4/2013 | Lyne et al. |
| 2013/0091028 A1 | 4/2013 | Oder, II |
| 2013/0110658 A1 | 5/2013 | Lyman et al. |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0140360 A1 | 6/2013 | Graylin |
| 2013/0144888 A1 | 6/2013 | Faith |
| 2013/0145148 A1 | 6/2013 | Shablygin |
| 2013/0145172 A1 | 6/2013 | Shablygin |
| 2013/0145455 A1 | 6/2013 | Vijayshankar et al. |
| 2013/0159178 A1 | 6/2013 | Colon |
| 2013/0159186 A1 | 6/2013 | Brudnicki et al. |
| 2013/0166402 A1 | 6/2013 | Parento |
| 2013/0166448 A1 | 6/2013 | Narayanan |
| 2013/0166456 A1 | 6/2013 | Zhang |
| 2013/0173736 A1 | 7/2013 | Krzeminski |
| 2013/0179348 A1 | 7/2013 | Crofts et al. |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226812 A1 | 8/2013 | Landrok et al. |
| 2013/0226813 A1 | 8/2013 | Voltz |
| 2013/0232083 A1 | 9/2013 | Smith et al. |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1* | 10/2013 | Collinge ............ G06Q 20/3823 705/71 |
| 2013/0268776 A1 | 10/2013 | Motoyama |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |

(56) References Cited

U.S. PATENT DOCUMENTS

| | | |
|---|---|---|
| 2013/0297504 A1 | 11/2013 | Nwokolo |
| 2013/0297508 A1 | 11/2013 | Belamant |
| 2013/0304649 A1 | 11/2013 | Cronic |
| 2013/0305035 A1 | 11/2013 | Lyne et al. |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339166 A1 | 12/2013 | Baer et al. |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0020073 A1 | 1/2014 | Ronda et al. |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki et al. |
| 2014/0040144 A1 | 2/2014 | Plomske |
| 2014/0040145 A1 | 2/2014 | Ozvat |
| 2014/0040148 A1 | 2/2014 | Ozvat |
| 2014/0040149 A1 | 2/2014 | Fiske |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |
| 2014/0074635 A1 | 3/2014 | Reese et al. |
| 2014/0074637 A1 | 3/2014 | Hammad |
| 2014/0074724 A1 | 3/2014 | Gordon et al. |
| 2014/0075496 A1 | 3/2014 | Prakash et al. |
| 2014/0100973 A1 | 4/2014 | Brown et al. |
| 2014/0108241 A1 | 4/2014 | Tunnell et al. |
| 2014/0108263 A1 | 4/2014 | Ortiz et al. |
| 2014/0108265 A1 | 4/2014 | Hayhow et al. |
| 2014/0123237 A1 | 5/2014 | Gaudet et al. |
| 2014/0129438 A1 | 5/2014 | Desai et al. |
| 2014/0207682 A1 | 7/2014 | Wolfond et al. |
| 2014/0236842 A1 | 8/2014 | Salminen et al. |
| 2014/0246490 A1 | 9/2014 | Graylin |
| 2014/0246492 A1 | 9/2014 | Hill et al. |
| 2014/0298027 A1 | 10/2014 | Roberts et al. |
| 2014/0351581 A1 | 11/2014 | Pritikin |
| 2014/0358796 A1 | 12/2014 | Smets |
| 2015/0116887 A1 | 4/2015 | Avestruz |
| 2015/0180836 A1 | 6/2015 | Wong |
| 2015/0371050 A1 | 12/2015 | Martini |
| 2015/0373762 A1 | 12/2015 | Raj |
| 2016/0019512 A1 | 1/2016 | Buchheim |
| 2016/0086073 A1 | 3/2016 | Narendra |
| 2016/0140545 A1 | 5/2016 | Flurscheim et al. |
| 2016/0217452 A1 | 7/2016 | Wong |

FOREIGN PATENT DOCUMENTS

| | | |
|---|---|---|
| EP | 1168265 A1 | 1/2002 |
| EP | 2098985 A2 | 9/2009 |
| EP | 2156397 A1 | 2/2010 |
| EP | 2515472 A1 | 10/2012 |
| GB | 2459850 A | 11/2009 |
| JP | 2008-210370 A | 9/2008 |
| KR | 10-2000-0054496 A | 9/2000 |
| KR | 10-2005-0019674 A | 3/2005 |
| KR | 10-2006-0096821 A | 9/2006 |
| KR | 10-2007-0100076 A | 10/2007 |
| KR | 10-2008-0026802 A | 3/2008 |
| KR | 10-2008-0039330 A | 5/2008 |
| KR | 10-2008-0051198 A | 6/2008 |
| KR | 10-2009-0021388 A | 3/2009 |
| KR | 10-2009-0044619 A | 5/2009 |
| KR | 10-2010-0110642 A | 10/2010 |
| RU | 2252451 C2 | 5/2005 |
| RU | 2331110 C2 | 8/2008 |
| WO | 01/16900 A2 | 3/2001 |
| WO | 01/35304 A1 | 5/2001 |
| WO | 02/01520 A1 | 1/2002 |
| WO | 02/059727 A2 | 8/2002 |
| WO | 03/047208 A1 | 6/2003 |
| WO | 2004/042536 A2 | 5/2004 |
| WO | 2005/109360 | 11/2005 |
| WO | 2006/099294 A1 | 9/2006 |
| WO | 2006/113834 A2 | 10/2006 |
| WO | 2008/014554 A1 | 2/2008 |
| WO | 2009/025605 A3 | 2/2009 |
| WO | 2009/032523 A1 | 3/2009 |
| WO | 2009/052634 A1 | 4/2009 |
| WO | 2010/078522 A1 | 7/2010 |
| WO | 2012/068078 A2 | 5/2012 |
| WO | 2012/098556 A1 | 7/2012 |
| WO | 2012/142370 A2 | 10/2012 |
| WO | 2012136986 A1 | 10/2012 |
| WO | 2012/167941 A1 | 12/2012 |
| WO | 2013/048538 A1 | 4/2013 |
| WO | 2013/049213 A1 | 4/2013 |
| WO | 2013/056104 A1 | 4/2013 |
| WO | 2013/096486 A1 | 6/2013 |
| WO | 2013/101035 A1 | 7/2013 |
| WO | 2013/116817 A1 | 8/2013 |
| WO | 2013/119914 A1 | 8/2013 |
| WO | 2013/130982 A1 | 9/2013 |
| WO | 2013/155627 A1 | 10/2013 |
| WO | 2013/179271 A2 | 12/2013 |
| WO | 2014/012037 A1 | 1/2014 |
| WO | 2015 095771 A1 | 6/2015 |

OTHER PUBLICATIONS

International Search Report and Written Opinion dated Jul. 27, 2015 for International Patent Application No. PCT/US2015/031968, 9 pages.

"2.4.2 How VISA Card Verification Values are Used," 2.4.2 "z/Os V1R3.0 ICSF Application Programmer's Guide" IBM Library Server, 1 page, © Copyright IBM Corp. 1997, 2002, downloaded Mar. 27, 2012 from URL: http://publibz.boulderibm.com/cgi-bin/bookmgr_OS390/BOOKS/CSFB4Z20/2.4.2?SHEL.

Reisinger, D., "PayPal offers SMS security key for mobile users," Nov. 24, 2008, pp. 1-3, © Copyright CBS Interactive, downloaded Mar. 27, 2012 from URL: http://news.cnet/com/8301-17939_1209-10106410-2.html.

International Search Report / Written Opinion issued Jun. 25, 2015 in PCT Application No. PCT/US14/71622, 9 pages.

International Search Report / Written Opinion issued Nov. 26, 2015 in PCT Application No. PCT/US15/31968, 7 pages.

Non-Final Office Action issued Dec. 31, 2015 in U.S. Appl. No. 14/577,837, 23 pages.

Final Office Action issued Jul. 18, 2016 in U.S. Appl. No. 14/577,837, 25 pages.

Non-Final Office Action issued Dec. 15, 2016 in U.S. Appl. No. 14/577,837, 18 pages.

Non-Final Office Action issued May 24, 2016 in U.S. Appl. No. 15/004,705, 28 pages.

Final Office Action issued Nov. 3, 2016 in U.S. Appl. No. 15/004,705, 25 pages.

Non-Final Office Action issued Dec. 19, 2016 in U.S. Appl. No. 15/091,253, 26 pages.

Non-Final Office Action issued Aug. 19, 2016 in U.S. Appl. No. 14/719,014, 21 pages.

Final Office Action issued Dec. 9, 2016 in U.S. Appl. No. 14/719,014, 31 pages.

Non-Final Office Action, mailed Apr. 6, 2017, in U.S. Appl. No. 15/004,705, 26 pages.

EMV Integrated Circuit Card Specifications for Payment Systems (Book 2—Security and Key Management) Version 4.3, Nov. 2011, p. 89, 127-130, 133.

(56) References Cited

OTHER PUBLICATIONS

Search Report and Written Opinion, dated Jun. 29, 2017, in Singapore Patent Application No. 11201604906Q, 11 pages.
Final Office Action dated Jul. 3, 2017, in U.S. Appl. No. 15/091,253, 21 pages.
Supplementary European Search Report, dated Jul. 11, 2017, in EP Application No. 14872737.3, 8 pages.

* cited by examiner

EMBEDDING CLOUD-BASED FUNCTIONALITIES IN A COMMUNICATION DEVICE

CROSS-REFERENCES TO RELATED APPLICATIONS

This application claims the benefit of priority to U.S. Provisional Application No. 62/040,935, filed on Aug. 22, 2014, which is herein incorporated by reference in its entirety for all purposes.

BACKGROUND

Advances in the capabilities of portable communication devices have allowed portable communication devices such as smart phones to be used as payment instruments to conduct contactless transactions. For example, a portable communication device can be placed in proximity to an access device such as a point-of-sale (POS) terminal to transfer account information from the portable communication device to the access device to conduct a transaction. To provide a secure operating environment to securely store account information on a portable communication device, a secure element such as subscriber identity module (SIM) card, specialized integrated chip embedded into the portable communication device, or specialized component provided as aftermarket solution is used. At the time of a transaction, the secure element communicates directly with a contactless interface (e.g., a near-field communication (NFC) transceiver) of the portable communication device to pass payment data to a contactless reader of the access device. A secure element is considered secure because account information is stored in tamper-resistant hardware, which protects the account information from malware or viruses that may have infected the operating system or an application running on the portable communication device.

However, a secure element used in a portable communication device is typically not under the control of a financial institution, but is instead under the control of a mobile network operator (MNO). As a result, an issuer and/or payment processor may not have direct access to a secure element to provision it with account credentials and payment functionalities. In order to gain access to a secure element, an issuer and/or payment processor may have to establish commercial agreements and technical connectivity with the party controlling the secure element to perform over-the-air (OTA) personalization of the secure element. This is both a cumbersome and complex process. Furthermore, incorporating a secure element adds to the manufacturing cost of the portable communication device, and increases the cost of the finished portable communication device.

Thus, in some cases, it would be desirable to use a portable communication device that does not have a secure element to make payments. Or, if the portable communication device does have a secure element, it may be desirable not to rely on the use of the secure element. However, because a secure element is not used, transaction security will be a concern.

Embodiments of the present invention address these and other problems individually and collectively. Specifically, embodiments of the invention address the problem of security concerns with conducting transactions with a portable communication device that does not have or does not rely on a secure element.

BRIEF SUMMARY

Embodiments of the present invention provide techniques for enhancing the security of a communication device (e.g., a portable communication device) when conducting a transaction using the communication device, and techniques for embedding such functionalities in a communication device. The techniques described herein can be used with a communication device that may or may not have a secure element, because the techniques do not require the use of a secure element to safeguard account credentials. Embodiments of the invention instead utilize limited-use account parameters that may have a limited lifespan, and once expired, may no longer be used to conduct a transaction until the limited-use account parameters are replenished from the cloud (e.g., a remote computer). Hence, transactions conducted using the techniques described herein may be referred to as "cloud-based transactions."

According to some embodiments, a communication device (e.g., a portable communication device) may include a processor, a contactless interface (e.g., a contactless transceiver) coupled to the processor, a first memory region storing an application executing in a normal execution environment, and a second memory region storing an application agent executing in a trusted execution environment. The application agent may receive, from the application executing in the normal execution environment, a limited-use key (LUK) generated by a remote computer and associated with a set of one or more limited-use thresholds that limits usage of the LUK. The application agent may store the LUK in a secure storage of the trusted execution environment. When the application agent receives a request to conduct a transaction from the application executing in the normal execution environment, the application agent may generate a transaction cryptogram using the LUK, access the contactless interface, and transmit the transaction cryptogram to an access device via the contactless interface.

According to some embodiments, a method for enhancing security of a communication device may include receiving, from a remote computer by an application executing in a normal execution environment of the communication device, a limited-use key (LUK) that is associated with a set of one or more limited-use thresholds that limits usage of the LUK. The application executing in the normal execution environment may send the LUK to an application agent executing in a trusted execution environment of the communication device. The application executing in the normal execution environment may receive a request to conduct a transaction, and send the request to conduct the transaction to the application agent executing in the trusted execution environment. The application agent may generate a transaction cryptogram using the LUK, and access a contactless interface of the communication device to transmit the transaction cryptogram to an access device to conduct the transaction.

According to some embodiments, a method for enhancing security of a communication device may include receiving, by an application agent executing in a trusted execution environment of the communication device, a limited-use key (LUK) from an application executing in a normal execution environment of the communication device. The LUK may be associated with a set of one or more limited-use thresholds that limits usage of the LUK, and may have been provided to the application executing in the normal execution environment from a remote computer. The application agent executing in the trusted execution environment may store the LUK in a secure storage of the trusted execution environment. The application agent executing in the trusted execution environment may receive a request to conduct a transaction from the application executing in the normal execution environment, generate a transaction cryptogram using the LUK, and access a contactless interface of the communication device to transmit the transaction cryptogram to an access device to conduct the transaction.

DETAILED DESCRIPTION

Figure 1:
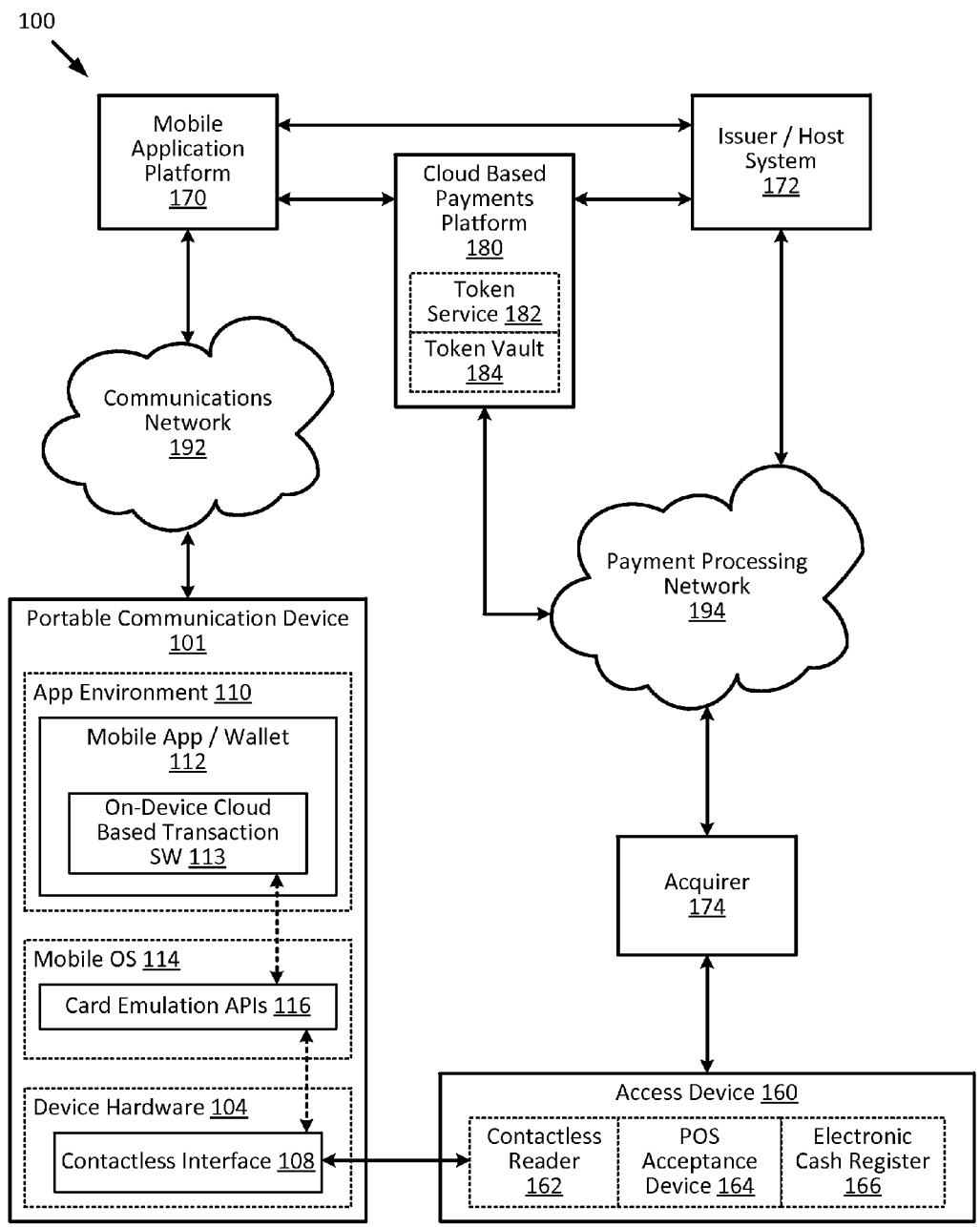
FIG. 1 illustrates a block diagram of an example of a cloud-based transaction system, according to some embodiments.

Embodiments of the present invention provide for methods, devices, and systems for cloud-based transactions that can be performed by a communication devices with or without a secure element. The techniques described herein can utilize card emulation technology (e.g., Host Card Emulation (HCE), etc.) to emulate a smartcard on a communication device (e.g., a portable communication device) to allow a mobile application running on the portable communication device to conduct contactless transactions. In the card emulation environment, a mobile application can access the contactless interface (e.g., a near-field communication (NFC) transceiver) of the portable communication device via the operating system (OS) of the portable communication device without involving a secure element. As compared to secure element implementations, the card emulation approach reduces the technical and commercial complexities for issuers and/or payment processors, because issuers and/or payment processors can provision account credentials and payment functionalities to a mobile application on a portable communication device without having to obtain access to a secure element through a mobile network operator.

By removing the control of payment functionalities and account credentials from the confines of a secure element, the tamper-resistant hardware based security provided by a secure element can no longer be relied on to safeguard account information. Without the requirement that a secure element be present, account credentials may be stored in a memory of the portable communication device that is not part of a secure element, such as the general memory of the portable communication device. As such, the account credentials may be susceptible to access by malware or viruses that may have infected an application or operating system of the portable communication device.

To enhance the security of a portable communication device when conducting transactions without utilizing a secure element, instead of using stagnant account credentials stored on a portable communication device which may be valid for the lifetime of an account, the cloud-based techniques described herein provision a portable communication device with limited-use account parameters that have a limited usage or lifespan. When the limited usage or lifespan of the limited-use account parameters is exhausted, the same set of limited-use account parameters may no longer be used to conduct further transactions. In order to conduct further transactions using the portable communication device, new limited-use account parameters are replenished to the portable communication device. The limited-use account parameters provided to the portable communication device can be renewed or replenished from the network (also be referred to as the "cloud") repeatedly during the lifetime of an account. By managing the delivery and lifecycle of the limited-use account parameters between a set of network based capabilities and the portable communication device, the compromise of mobile application software and/or account credentials stored on a portable communication device becomes only a limited security risk, because stolen limited-use account parameters can at most be used for only a small number of transactions or limited monetary amount.

Prior to discussing the details of some embodiments of the present invention, description of some terms may be helpful in understanding the various embodiments.

A "communication device" may be a device that includes one or more electronic components (e.g., an integrated chip) that can communicate with another device. A "portable communication device" be a communication device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of portable communication devices may also include portable computing devices (e.g., laptops, netbooks, ultrabooks, etc.).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

The term "authentication" and its derivatives may refer to a process by which the credential of an endpoint (including but not limited to applications, people, devices, processes, and systems) can be verified to ensure that the endpoint is who they are declared to be.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "trusted execution environment" may refer to an isolated execution environment for trusted applications, and may be separate and isolated from the normal application execution environment of a communication device to prevent rouge applications or malware from accessing the trusted applications. In some embodiments, a trusted execution environment can be implemented as a virtual machine or as a secure operating mode of the processor of communication device, and access to the functionalities and applications executing in trusted execution environment can be restricted to processes and applications with the requisite privileges.

"Virtualization" may refer to techniques for providing isolation between different operating environments sharing the same physical resources. In some embodiments, a trusted execution environment can be implemented using virtualization. Virtualization provides a logical abstraction of computing resources from physical constraints. One common abstraction is referred to as a virtual machine (VM), which provides the content running in the VM a direct interface to the physical hardware while maintaining the abstraction. Virtualization technology allows multiple VMs running on the same physical hardware to operate independently and isolated from each other. One or more VMs on the system can be managed by a Virtualized Machine Monitor, or VMM (also known as hypervisor or host). The VMM can be a software or firmware layer component responsible for hosting and managing virtual machines. The VMM manages the system's processor, memory, and allocates other resources for each VM.

A "normal execution environment" or a normal application execution environment may refer to an execution environment for applications installed on a communication device. In some embodiments, a normal execution environment can be implemented as a virtual machine. An application can be compiled and executed in the virtual machine when the application is opened, and the virtual machine can be destroyed once the application is closed. Access to an application executing in a normal execution environment may not necessarily require any special privileges.

Details of some embodiments of the present invention will now be described.

I. Account Parameters

The cloud-based transactions system according to some embodiments provides a set of functionalities to manage the deployment and usage of account parameters for transactions conducted using a portable communication device.

Account parameters (may also be referred to as "account credentials") are information relating to an account (e.g., a financial account, bank account, payment account, etc.) associated with a user that can be used to conduct transactions on the user's account. The account parameters can be provided or provisioned to a portable communication device to enable the portable communication device to conduct transactions on the user's account (e.g., by placing the portable communication device in proximity to a contactless reader of an access device such as a point-of-sale (POS) terminal).

Account parameters may include a semi-static set of data and a dynamic set of data, and some or all of the account parameters may be limited-use account parameters. The semi-static set of data may include an identifier that can be used to identify an account associated with the user (e.g., an account identifier such as a primary account number (PAN), an alternate account identifier such as an alternate PAN, or a token that is a substitute for an account identifier, etc.), an expiry date, and/or other account details or data that does not necessarily change for an extended period of time, or in some embodiments, for the lifetime of the account. The dynamic set of data may include one or more keys, information associated with the one or more keys, and/or other dynamic data that has a limited lifespan, and are repeatedly refreshed or replenished during the lifetime of an account. The dynamic set of data can be used for or relates to on-device generation of dynamic transaction cryptograms, or represent dynamic transaction data during payment transactions.

The dynamic set of data may be limited-use in the sense that the dynamic set of data can be used for only a limited time or a limited number of transactions, and may need to be renewed, refreshed, updated, or replenished when the dynamic set of data has exhausted its limited usage. For example, the dynamic set of data may include a limited-use key (LUK) that is used as an encryption key to generate a transaction cryptogram during a transaction. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds to enforce can be determined, for example, by an issuer of the account or by a cloud-based payments platform that provides the cloud-based transaction service.

The set of one or more limited-use thresholds may include at least one of a time-to-live indicating the duration of time for which the LUK is valid, a predetermined number of transactions for which the LUK is valid, and/or a cumulative transaction amount indicating the total transaction amount summed across one or more transactions for which the LUK is valid, or any combination thereof. For example, a LUK may be valid for a time-to-live of five days, and a transaction conducted using that LUK after five days have elapsed since the LUK was generated may be declined. As another example, a LUK may be valid for a predetermined number of five transactions, and a sixth transaction (and any subsequent transaction) conducted using that LUK may be declined. As a further example, a LUK may be valid for a cumulative transaction amount of five hundred dollars, and a transaction conducted using the LUK after that LUK has already been used for transactions totaling more than five hundred dollars may be declined.

It should be understood that the limited usage values described above are just examples, and that other usage limits can be used. For example, the number of transactions usage limit can be set to a number in the range of 2 to 10 transactions, or a number in the range of 5 to 50 transactions, etc., and the cumulative transaction amount can be set to a value in the range of $100 to $5,000, or a value in the range of $10 to $1000, etc.

It should also be noted that in some embodiments, the number of transactions limited-use threshold can be set to one transaction such each LUK is valid for only one transaction. However, in some embodiments, the network bandwidth available to a portable communication device may be limited, or the portable communication device may not always have uninterrupted network connectivity. As such, the number of transactions limited-use threshold can be set to more than one transaction (e.g., five transactions) in some embodiments, for example, to reduce the frequency and amount of LUK replenishments over time, and hence reduce the amount of network traffic used by the portable communication device over time.

In some embodiments, the set of one or more limited-use thresholds may also include an international usage threshold and a domestic usage threshold indicating separate limits for international transactions versus domestic transactions. For example, the number of transactions that a LUK may be valid for can be higher for domestic transactions than for international transactions, if international transactions are deemed to be more risky. The set of one or more limited-use thresholds may also include a low value transaction threshold and a high value transaction threshold indicating separate rate limits for low value transactions versus high value transactions. For example, the number of transactions that a LUK may be valid for can be higher for low value transactions (e.g., LUK valid for ten transactions under $20) than for high value transactions (e.g., LUK valid for five transactions over $20) such that low value transactions will trigger replenishment of the LUK less frequently than high value transactions.

In some embodiments, the set of one or more limited-use thresholds associated with an account may change when the LUK is replenished such that a new LUK replacing a previous LUK may have one or more different usage limits than the previous LUK. This may occur, for example, based on changes in the consumer spending habits, the location of the portable communication device, or the time of the year, etc. For example, a new LUK may have a higher usage limit if the user has a recent pattern of conducting many high value transactions, or when it is during the holiday season when transaction activity is expected to increase. As another example, a new LUK may have a lower usage limit if the location of the portable communication device indicates that the user may have traveled to a high risk country where fraud is prevalent.

In embodiments in which a LUK is associated with more than one limited-use thresholds, the usage of the LUK can be exhausted when any one of the limited-use thresholds is exceeded, or when some combination of the limited-use thresholds is exceeded. Hence, replenishment of the LUK may be triggered when any one of the limited-use thresholds is exceeded or is about to be exceeded, or when some combination of the limited-use thresholds is exceeded or is about to be exceeded.

In some embodiments, a limited-use threshold associated with a LUK of an account may have different usage limits configured in different components or entities of the cloud-based transaction system. In other words, different components or entities may have different usage limits for a particular limited-use threshold to trigger replenishment of the LUK. The components or entities that may be configured with different usage limits may include, for example, the portable communication device of the user, the cloud-based service provider, and/or the issuer/host system. According to some embodiments, the usage limit at the portable communication device can be set lower than the usage limit at cloud-based service provider, and the usage limit at the cloud-based service provider can be set lower than the usage limit at the issuer. For example, a LUK may have a time-to-live limited-use threshold, and the on-device usage limit to trigger replenishment of the LUK at the portable communication device can be set at 2 days, the service provider usage limit at the cloud-based service provider can be set at 4 days, and the issuer usage limit at the issuer can be set at 5 days. In this example, the portable communication device would normally initiate replenishment of the LUK after 2 days. However, if the portable communication device is turned off or has lost network connectivity, the cloud-based service provider can initiate replenishment of the LUK after 4 days, or the issuer can initiate the replenishment after 5 days, if the LUK has not been renewed prior to that to ensure the LUK does not remain stale.

In some embodiments, the different components or entities of the cloud-based transaction system may be configured with different limited-use thresholds that may trigger LUK replenishment. For example, the on-device set of one or more limited-use thresholds configured on the portable communication device may include a time-to-live and a number of transactions that will trigger LUK replenishment initiated by the portable communication device, while the cloud-based service provider and/or the issuer/host system may additionally or alternatively be configured with a cumulative transaction amount to trigger LUK replenishment initiated by the cloud-based service provider and/or the issuer/host system. In other words, different components or entities may monitor different types of conditions or limited-use thresholds to trigger replenishment of the LUK.

In some embodiments, the set of one or more limited-use thresholds may be account specific (e.g., where different accounts may have different usage limits), portable communication device specific (e.g., where different portable communication devices of the user may have different usage limits even if the underlying account is the same), and/or mobile application specific (e.g., where different mobile applications may have different usage limits even if the mobile applications are installed on the same portable communication device and/or if the underlying account is the same). In some embodiments, the LUK may also have other use restrictions such as which type of merchant, which particular merchant, or which geographical location where the LUK can be used. The particular rules or risk parameters for triggering the LUK replenishment and/or for setting the limited-use thresholds can be determined by the issuer or cloud-based transactions provider.

The dynamic set of data may also include a key index that is associated with the LUK. The key index may include information pertaining to the generation of the LUK. For example, the key index may be used as a seed to generate its corresponding LUK. The key index may include time information (e.g., a timestamp) indicating when the LUK is generated, and/or may include a replenishment counter value indicating the number of times that the LUK has been renewed or replenished for a particular account, mobile application, or portable communication device. In some embodiments, the replenishment counter value may indicate the number of times the LUK has been replenished within a predetermined time period, and the replenishment counter value may reset when each predetermined time period elapses. This predetermined time period may correspond, for example, to the smallest unit of time determinable from the time information, although other predetermined time periods can be used. As an example, if the time information included in the key index indicates down to which hour the current LUK is generated, the counter value may indicate the number of times the LUK has been replenished in the hour. In some embodiments, the LUK may include an application transaction counter value indicating the number of transactions that has been previously conducted by a mobile application of the portable communication device at the time the LUK is generated, or may include a pseudo random number generated by a cloud-based transaction service provider or by a suitable entity such as an issuer involved in processing the transaction. It should be understood that the key index may include one or more pieces of information pertaining to the generation of the LUK, and that one or more or all pieces of information included in the key index may be used as a seed to generate the LUK.

In some embodiments, the semi-static set of data may also include limited-use account parameters that have their own set of limited-use thresholds and/or own set of use restrictions. Although in some embodiments, an account identifier such as a PAN can be used and stored on the portable communication device, a PAN may be valid for the lifetime of an account and may be used for a wide range of different types of transactions (e.g., card present transactions, online transactions, etc.). As such, to further enhance the security of the portable communication device and to reduce the impact if the account parameters are compromised, in some embodiments, instead of using and storing a PAN in the portable communication device, an alternate account identifier (e.g., an alternate PAN) or a token that is a substitute for an account identifier may be used.

An account may have one or more alternate account identifiers and/or tokens associated with the account. Each alternate account identifier or token may be restricted to the type of transactions in which the alternate account identifier or token can be used. For example, an account may be associated with a first token that can only be used for online transactions and a second token that can only be used for cloud-based transactions, and an online transaction conducted using the cloud-based token will be declined. Other types of use restrictions may include restrictions on what type of merchant or which merchant and/or which geographical location that the alternate account identifier or token can be used.

An alternate account identifier or a token may also have its own set of limited-use thresholds (e.g., time-to-live, number of transactions, and/or cumulative transaction amount, etc.). In some embodiments, the limited-use thresholds of an alternate account identifier or a token may have higher usage limits than those of the dynamic set of data (e.g., LUK) such that the replenishment of the alternate account identifier or token occurs less frequently. For example, an alternate account identifier or a token may have a time-to-live of a year whereas the time-to-live of a LUK may be five days. As another example, an alternate account identifier or a token may be valid for up to two thousand transactions whereas a LUK may be valid for up to five transactions. It should be understood that in some embodiments, the usage limits of the alternate account identifier or token can also be set to be the same as those of the dynamic set of data (e.g., LUK), such that replenishment of the alternate account identifier or token occurs at the same time as the dynamic set of data.

II. Cloud-Based Transaction System Overview

In the cloud-based transaction system, issuers of accounts may configure service portfolio characteristics to define the risk parameters and hence the limited-use thresholds of account parameters for accounts belonging to a particular portfolio. The limited-use thresholds can be used to manage the triggers for refreshing or replenishing account parameters on a provisioned portable communication device. To ensure that the cloud-based transactions are processed according to the risk parameters specified in the service profile for an account, several core functions are implemented in the system to manage the deployment and usage of the account parameters. These functions may include provisioning, active account management, verification for payment, transaction processing, lifecycle management, and post-payment processing.

Provisioning may entail taking an enrolled account, creating account parameters such as an identifier to identify the enrolled account for cloud-based transactions (e.g., an alternate account identifier such as an alternate PAN or token) and an initial dynamic set of data to ensure the account parameters have only limited use after delivery to the portable communication device, and inheriting the service profile (e.g., limited-used thresholds) that has been established for the portfolio that the enrolled account belongs to.

Depending on the type of transactions supported, the dynamic set of data may include a LUK and/or other dynamic data such as a key index. The LUK, for example, can be used by the portable communication device during a transaction to calculate a transaction cryptogram or limited-use dynamic data such as a verification value to support legacy transactions that use verification values (e.g., dynamic card verification value (dCVV)).

After an account is provisioned onto the portable communication device, the relevant service profile details (e.g., limited-use thresholds) can be shared with the transaction processing software and entities in the system to ensure transaction authorization decisions are handled properly. Additionally, the service profile details (e.g., limited-use thresholds) can be provided to the on-device cloud-based transaction software of the mobile application installed on the portable communication device to ensure that the account parameters are managed appropriately on the portable communication device. As discussed above, different usage limits for triggering account parameters replenishment can be set at the different entities in the cloud-based transaction system, and thus the service profile may define different usage limits of each limited-use threshold to be set at the different entities that may initiate account parameters replenishment (e.g., portable communication device, cloud-based service provider, issuer, etc.).

After provisioning, the cloud-based transaction system may perform active account management to initiate the renewal or replenishment of the account parameters. The active account management processes can be triggered by transaction processing activity or initiated by the mobile application running on the portable communication device. If the service profile parameters for a particular account indicate that the account parameters on the device should be replaced (e.g., have exhausted their usage limits), the active account management capability recognizes this and attempts to connect to the portable communication device to replenish the account parameters. Additionally or alternatively, if the on-device service profile parameters managed by the mobile application indicate that account parameter replenishment is needed or is close to be being needed, then the mobile application can request account parameter replenishment.

To provide verification for payments, the cloud-based transaction system also has a capability to provide on-device verification functionalities to the payment processing network prior to or during a transaction to provide some level of verification that the transaction was initiated and intended by a proper user of the portable communication device. The on-device verification may include cardholder verification methods (CVMs) that can be used as verification for payment for provisioned accounts. As part of the service profile for a portfolio, specific rules for what can be used as CVM (e.g., screen lock, application passcode, etc.) can be established and shared with the provisioning, active account management, and transaction processing capabilities.

After an account is provisioned, the transaction processing capability of the system can provide awareness that a transaction being conducted is performed using a cloud-based account. When a cloud-based account is identified, the transaction processing capability of the cloud-based transaction system can ensure that the service profile parameters (e.g., limited-use thresholds) are verified, applied, and communicated to the issuer in transaction processing messages. This capability also ensures that any necessary active account management actions are initiated. For example, account identifying information provided during a transaction can be used to identifying an account as a cloud-based account if the account identifying information corresponds to an account identifier range (e.g., a PAN range) that is dedicated for cloud-based transactions, or if the account identifying information corresponds to an alternate PAN or token that is used only for cloud-based transactions.

After an account has been provisioned for cloud-based transactions, the lifecycle management functionality may allow the user or the issuer to manage the lifecycle of the provisioned account. Lifecycle management events such as suspension or deletion of an account may be consumer-initiated. For example, reporting a lost or stolen portable communication device and/or an associated card by the consumer may trigger suspension or deletion of an account from a portable communication device, or a user may elect to remove a provisioned account from the portable communication device. Lifecycle management events can also be issuer-initiated, for example, based on risk management or account reissuance activities. In some embodiments, other parties that may be involved in the processing of cloud-based transactions or managing cloud-based accounts, including merchants or multi-issuer mobile wallet providers, may also initiate lifecycle actions.

FIG. 1 illustrates a cloud-based transaction system 100, according to some embodiments. The core components of system 100 may include a cloud-based payments platform (CBPP) 180 and a mobile application platform (MAP) 170 to manage cloud-based transactions conducted using portable communication device 101. CBPP 180 may be referred to as a remote computer, and may be implemented using one or more computing devices or computers, such as one or more server computers, and can be associated with or be operated by a cloud-based service provider such as an issuer, payment processor, and/or other suitable entities. CBPP 180 may manage cloud-based accounts, provide verification functions for cloud-based transactions, manage lifecycle messages from issuer/host system 172 or MAP 170, as well as initiate lifecycle management events. CBPP 180 may also assist issuer/host system 172 with post payment functionalities to mitigate the risk against counterfeit account parameters, and limit the exposure on account parameters stored on the device. For example, CBPP 180 can be used to facilitate issuer/host system 172 requests for periodic post payment verification of payment transactions and/or validation of account parameters replenishment requests using post payment information.

CBPP 180 may also implement a set of key management functions that manages issuer master derivation keys (MDKs) from which the limited-use keys (LUKs) for cloud-based transactions are derived. CBPP 180 may implement a set of provisioning functions that manages the preparation and delivery of cloud-based account parameters (e.g., alternate account identifier or token, initial LUK and associated key index, etc.) to MAP 170 for the initial setup of the mobile application 112 on portable communication device 110. CBPP 180 may also manage the cloud-based accounts for processing by issuer/host system 172, and may perform active account management functions such as functions to generate account parameters based on requests or the risk profile of the cloud-based account per CBPP 180 risk management parameters. CBPP180 may also maintain the account status for each cloud-based account, and manage the replenishment or refreshing of the account parameters.

In some embodiments, CBPP 180 may also implement or be provided with access to a token service 182 and/or a token vault 184. Token service 182 can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. As indicated above, a token may have its own set of use restrictions, and token service 182 may manage the deployment and usage of the tokens according to their use restrictions. Token service 182 may be in communication with token vault 184 where the generated tokens are stored. Specifically, token vault 184 may maintain a mapping between a token and the real account identifier (e.g., PAN) represented by the token. During transaction processing, token vault 184 may be queried to retrieve the real account identifier or PAN associated with the token.

MAP 170 is used to facilitate communications between mobile application 112 executing on portable communication device 101 and other entities in cloud-based transactions system 100 such as CBPP 180 and/or issuer/host system 172, etc. MAP 170 may communicate with portable communication device 101 via a communications network 192 such as the Internet. In some environments, portable communication device 101 may not always have constant network connectivity, and thus one of the primary roles of MAP 170 is to intermediate requests between mobile application 112 and the other entities in the cloud-based transactions system 100 to ensure that requests and responses involving mobile application 112 are fulfilled as soon as network connectivity to portable communication device 101 is established. MAP 170 may be referred to as a remote computer, and may be implemented using one or more computing devices or computers such as one or more server computers, and can be associated with or be operated by the provider of mobile application 112. The provider of mobile application 112 can be, for example, an issuer, a bank, a third-party mobile wallet provider, a merchant, or other suitable entities. In some embodiments, MAP 170 can be associated with or be operated by the same entity as CBPP 180, or they can be separate. Although MAP 170 is illustrated as a separate logical entity in FIG. 1 because CBPP 180 is not expected to communicate directly with portable communication devices, it should be understood that in some embodiments, some or all of the functionalities of MAP 170 may be integrated as part of CBPP 180. Examples of MAP 170 may include mobile banking platforms and mobile wallet platforms.

In some embodiments, MAP 170 may implement authentication functionalities to authenticate portable communication device 101 when portable communication device 101 communicates with the other entities in cloud-based transaction system 100 via MAP170. The authentication functionalities may ensure that a portable communication device communicating with the system is an authorized portable communication device and/or a portable communication device that has not been hacked, infected with malware or virus, or otherwise been compromised. For example, MAP 170 may perform, request, or facilitate a device fingerprint of portable communication device 101 to capture the state of portable communication device 101 when portable communication device 101 communicates with MAP 170. The device fingerprint may, for example, capture information about portable communication device 101 such as the operating system and version, applications installed on portable communication device 101, memory usage, whether portable communication device 101 has been jail-broken, device identifiers such as a portable communication device identifier, and/or other suitable device characteristics.

MAP 170 may verify the device fingerprint of portable communication device 101 for each communication session established with portable communication device 101 or periodically (e.g., once every five communication sessions, once a month, etc.). If the device fingerprint of a portable communication device indicates that the portable communication device is not an authorized device for an account (e.g., the portable communication device requesting replenishment of account parameters is a different device than the original device that was used to enroll the account), or if the device fingerprint indicates that the portable communication device may potentially be hacked, MAP 170 may prevent the portable communication device from communicating with the system and alert the issuer that the portable communication device may have been compromised.

MAP 170 may perform enrollment functions to enroll a mobile cardholder into a cloud-based transactions program, and a set of provisioning functions that facilitates the preparation and delivery of the account parameters, configuration, and cloud-based payments device threshold parameters to mobile application 112. MAP 170 may perform account parameters replenishment functions to facilitate the account parameter replenishment process for the cloud-based account provisioned on portable communication device 101, and lifecycle management functions that manage lifecycle messages from issuer/host system 172, CBPP 180, and/or mobile application 112. MAP 170 may also perform post-payment functions to mitigate the risk against counterfeit account parameters, and to limit the exposure on account parameters stored on portable communication device 101, such as facilitating periodic post payment verification of payment transactions or the use of post payment information to validate account parameters replenishment requests.

In cloud-based transactions system 100, portable communication device 101 can be used to conduct cloud-based transactions facilitated by CBPP 180 and/or MAP 170. The components in portable communication device 101 may include device hardware 103, a mobile operating system (OS) 114, and an applications environment 110 in which mobile application 112 may reside. Device hardware 104 may include a contactless interface 108 that can interact with a contactless reader 162 of an access device 160. Examples of contactless interface 108 may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interface 108 may include an optical interface (e.g., a display screen) to present payment information in the form of an image such as a quick response (QR) code, or bar code, etc. to contactless reader 162 of access device 160 when contactless reader 162 includes an optical code scanner or reader.

Applications environment 110 of portable communication device 101 may host a mobile application 112 provided by a mobile application provider. For example, if the provider of mobile application 112 is an issuer, mobile application 112 may be a mobile banking application or a separate mobile payment application. If the provider is a mobile wallet provider such as a mobile network operator or third-party wallet provider that supports multiple issuers, mobile application 112 may be a mobile wallet application. For merchants, mobile application 112 may be a merchant's own mobile application from which consumers can conduct e-commerce or point of sale transactions with that merchant, or may be a mobile wallet application that supports multiple merchants.

According to some embodiments, mobile application 112 may include on-device cloud-based transaction software 113 (e.g., can be in the form of a software developer kit (SDK)) integrated into mobile application 112 to support cloud-based transaction functionalities. The on-device cloud-based transaction software 113 may perform functions to facilitate cloud-based transactions such as to take the account parameters (e.g., LUK and associated key index), generate transaction cryptograms, and deliver them to mobile operating system 114 for transmission over contactless interface 108. The on-device cloud-based transaction software 113 may also manage the initial service profile parameters (e.g., limited-use thresholds) that are provided after an account has been provisioned to ensure that requests for account parameter replenishment and other account parameter management activities are initiated.

Mobile application 112 may perform functions to manage the risk profile of the cloud-based account, maintain the account status, and replenish account parameters for each cloud-based account based on the on-device threshold management parameters. Mobile application 112 may also manage lifecycle messages from issuer/host system 172 or lifecycle messages from MAP 170. Mobile application 112 may perform a set of functions to enroll a mobile cardholder into a cloud-based transactions program, and a set of functions that manages the receiving and configuration of the cloud-based account parameters and cloud-based payments device threshold parameters received from MAP 170. Mobile application 122 may also provide consumer device cardholder verification method (CDCVM) functions for cloud-based transactions, and perform a set of functions that processes and responds to messages in support of post-payment processing to limit the exposure of account parameters stored on the portable communication device. For example, post-payment processing may include periodic post-payment verification of payment transactions or using post-payment information to validate account parameters replenishment requests.

In secure element based implementations, a contactless application (e.g., a mobile wallet or payment application for contactless transactions) using a contactless interface to communicate with a contactless reader of an access device would have to be coded for and be executed on a secure element in order to gain access to the contactless interface. In some embodiments, portable communication device 101 may include a mobile operating system (OS) 114 that implements a set of card emulation application programming interfaces (APIs) 116 such as host card emulation (HCE) APIs to allow mobile application 112 to gain access to contactless interface 108 without requiring the use of a secure element. For example, card emulation APIs 116 may be coded for and be executed from mobile OS 114 of portable communication device 101, and may include programming function calls to allow mobile application 112 to receive, process, and respond to transaction communications such as Application Protocol Data Unit (ADPU) commands sent from contactless reader 162. In this manner, portable communication device 101 is able to conduct contactless transactions without requiring access to a secure element on portable communication device 101.

Once portable communication device 101 and mobile application 112 have been provisioned with the account parameters, portable communication device 110 can conduct cloud-based transactions by interacting with contactless reader 162 of access device 160 (e.g., at a merchant point-of-sale (POS) location). Contactless reader 162 may include one or more RF transceivers that can send and receive communications using NFC or other radio frequency or wireless communication protocols such as Bluetooth, BLE, Wi-Fi, iBeacon, etc. In some embodiments, contactless reader 162 may include an optical code scanner or reader to conduct transactions using QR codes, bar codes, etc. Access device 160 may also include a POS acceptance device 164 and/or electronic cash register 166.

To conduct a cloud-based transaction, a user of portable communication device 101 may place portable communication device 101 in proximity to contactless reader 162 of access device 160, or display an image such as a QR code or bar code on a screen of portable communication device 101 for scanning by contactless reader 162 of access device 160. Portable communication device 101 may provide access device 160 with an identifier (e.g., an account identifier such as a PAN, an alternate account identifier such as an alternate PAN, or a token, etc.) to identify the account of the user and additional information such as the limited-use account parameters or information derived from the limited-use account parameters (e.g., transaction cryptograms generated from an LUK). For example, in some embodiments, an account identifier or token, and additional information (e.g., a transaction cryptogram, account parameters, etc.) can be transmitted to access device 160 in APDU responses that are responsive to a series of APDU commands received from access device 160. In some embodiments, an account identifier or token, and the additional information can be encoded in a QR code or bar code that is scanned and processed by access device 160 to retrieve the encoded information. Access device 160 or a merchant computer coupled to access device 160 may then generate an authorization request message including the account identifier or token, and additional information such as a transaction cryptogram and other transaction data, and forward the authorization request message to acquirer 174 associated with the merchant. The authorization request message can then be sent by acquirer 174 to payment processing network 194.

Payment processing network 194 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Upon receiving the authorization request message, payment processing network 194 may forward the authorization request message received from acquirer 174 to the corresponding issuer/host system 172 of the account of the user of portable communication device 101. After issuer/host system 172 receives the authorization request message, the authorization request message may be parsed, and the information in the authorization request message may be verified. For example, issuer/host system 172 may verify that the transaction cryptogram was generated by a valid LUK, and that the set of one or more limited-use thresholds associated with the LUK has not been exceeded. In some embodiments, some or all of the information in the authorization request message can also be sent to CBPP 180 for verification and processing. For example, if issuer/host system 172 does not have the capability to verify the transaction cryptogram, the payment processing network 194 or issuer/host system 172 may forward the transaction cryptogram to CBPP 180 for verification.

An authorization response message is then sent back to payment processing network 194 to indicate whether the current transaction is authorized (or not authorized). Payment processing network 194 then forwards the authorization response message back to acquirer 174. In some embodiments, payment processing network 194 may decline the transaction even if issuer/host system 172 has authorized the transaction, for example, depending on a value of a fraud risk score or depending if limited-use account parameters are verified by CBPP 180. Acquirer 174 then sends the authorization response message to the merchant computer and/or access device 160. The authorization response results, which may include transaction data for the transaction can be displayed by access device 160, or be printed out on a physical receipt.

At the end of the day, a clearing and settlement process can be conducted by payment processing network 194. A clearing process is a process of exchanging financial details between an acquirer and an issuer to facilitate posting to a user's payment account and reconciliation of the user's settlement position. It should be understood that any of the acquirer 174, payment processing network 194, issuer/host system 172, CBPP 180, and/or MAP 170 may be referred to as a remote computer, and may include one or more computing devices such as one or more computers or server computers to enable the entity to communicate with the other entities in system 100, and/or to perform one or more of the functions described herein.

III. Enrollment and Provisioning

Figure 2:
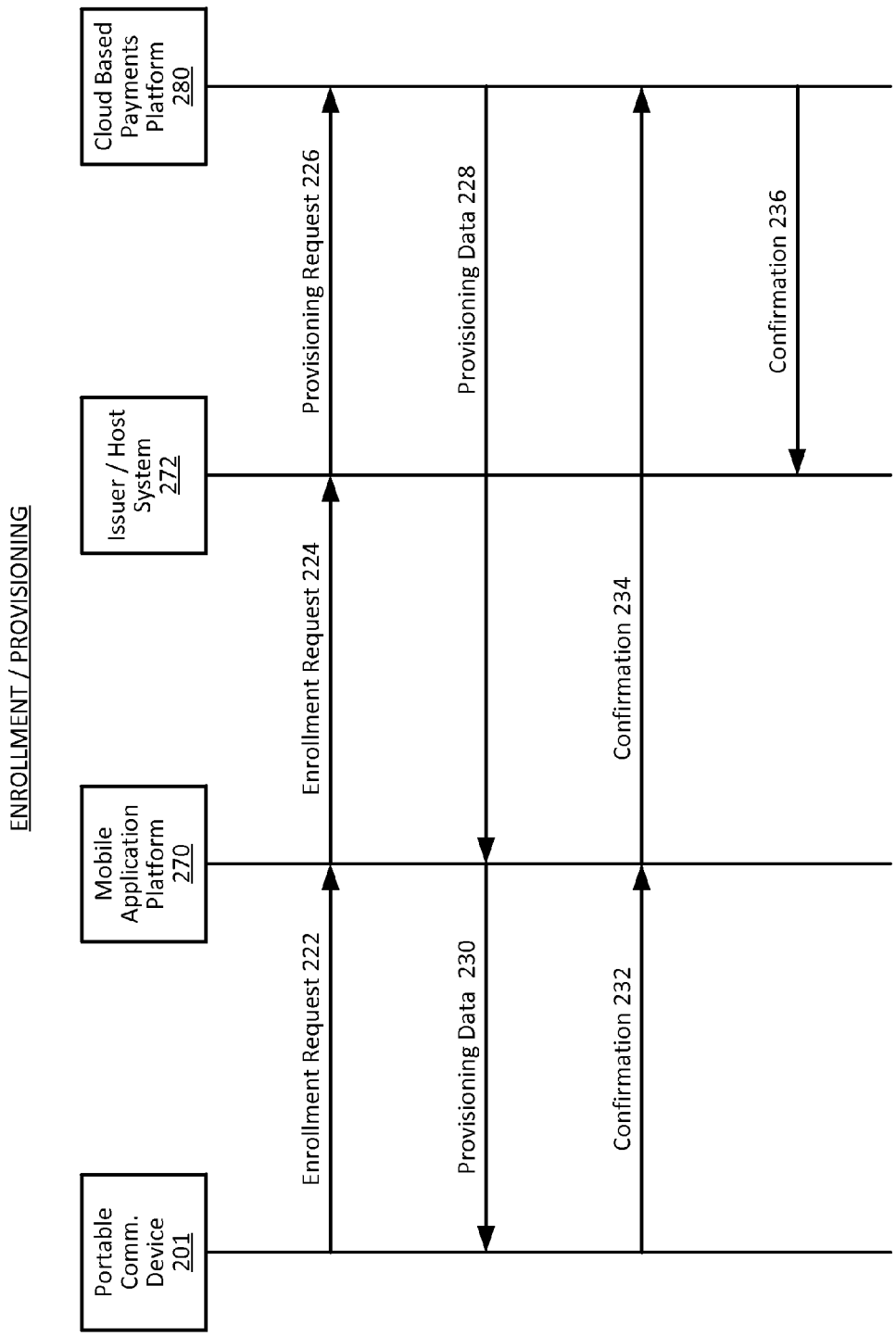
FIG. 2 illustrates a communication flow diagram of an example of an enrollment and provisioning process, according to some embodiments.

FIG. 2 illustrates a communication flow diagram of an example enrollment and provisioning process, according to some embodiments. The enrollment and provisioning process can be initiated from portable communication device 201 installed with a mobile application programmed with cloud-based transaction capabilities. The mobile application may be pre-installed on portable communication device 201 during manufacturing or by a retailer, or by a user downloading the mobile application from an application store or from an issuer or cloud-based transaction service provider and installing the mobile application on portable communication device 201. The user may launch the mobile application and initiate an enrollment request 222 from the mobile application to add an account to the cloud-based transaction service. Enrollment request 222 is sent from portable communication device 201 to MAP 270, and may include information that can be used to identify the user and the account of the user, as well as device information about portable communication device 201.

According to some embodiments, to facilitate communications with portable communication device 201, MAP 270 (or issuer/host system 272, or CBPP 280) may generate a device identifier from the device information or assign a device identifier to portable communication device 201 during the enrollment and provisioning process. The device identifier is provided to the mobile application on portable communication device 201, and can be used by the mobile application to identify portable communication device 201 to the other entities in the cloud-based transaction system in subsequent interactions with the system.

When MAP 270 receives enrollment request 222, MAP 270 may process the request, capture the device information about portable communication device 201, and route enrollment request 224 with the relevant information to issuer/host system 272. Issuer/host system 272 may perform identification and verification (ID&V) of the user and the user's account, and send a provisioning request 226 to CBPP 280. Provisioning request 226 may include account identifying information such as a PAN to identify the user's account. In embodiments in which an alternate account identifier or a token is used, CBPP 280 or issuer/host system 272 may generate an alternate account identifier, or invoke a token service to generate a token that is used as a substitute for an account identifier. Upon receiving provisioning request 226, CBPP 280 may use a master derivation key (MDK) associated with issuer/host system 272 to generate the initial set of account parameters (e.g., LUK) for provisioning to portable communication device 201. In some embodiments, issuer/host system 272 may provide CBPP 180 with the MDK if the MDK is maintained or managed by issuer/host system 272, or issuer/host system may generate the LUK and provide CBPP 180 with the generated LUK. In either case, whether the LUK is generated by CBPP 180 or by issuer/host system 272, the LUK can be generated based on a key index that acts as a seed for the generation of the LUK, and the key index can be shared between CBPP 180 and issuer/host system 272 to facilitate processing of transactions using the LUK.

CBPP 280 then packages provisioning data 228, which may include an alternate account identifier or a token, an initial set of account parameters such as a LUK and key index, and other information relevant for executing and/or processing of a transaction (e.g., set of one or more limited-use thresholds associated with the LUK), and sends provisioning data 228 to MAP 270. MAP 270 can then forward the information as provisioning data 330 to portable communication device 201. The mobile application then stores the account parameters and relevant information on portable communication device 201 to enable portable communication device 201 to be used for conducting contactless transactions on the user's account.

In should be noted that in some embodiments, the different entities in the system (e.g., portable communication device 201, CBPP 280, and issuer/host system 272) can be provided with different usage limits for the set of one or more limited-use thresholds during the enrollment and provisioning process, and the respective entities can trigger subsequent account parameters replenishment at different usage limits.

Once provisioning data 330 has been successfully provisioned onto portable communication device 201, portable communication device 201 may send an acknowledgement or confirmation 332 to MAP 270. MAP 270 may also send a confirmation 334 to CBPP 280, which in turn forwards confirmation 336 to issuer/host system 272 to complete the enrollment and provisioning process.

It should be understood that the enrollment and provisioning process described above is just an example, and that the messaging sequence in some embodiments may have different variations. In some embodiments, the roles of CBPP 280 and issuer/host system 272 can be interchanged. For example, CBPP 280 may receive enrollment request 324 from MAP 270 and send provisioning request 326 to issuer/host system 372. As another example, MAP 270 may send confirmation 334 to issuer/host system 272, and issuer/host system may send confirmation 336 to CBPP 280.

IV. Transaction Execution

Once a portable communication device has been provisioned with the appropriate account parameters, the portable communication device can be used to execute a contactless transaction, for example, by placing portable communication device in proximity to a contactless reader of an access device. Depending on the capabilities of the access device, a contactless transaction conducted using the techniques described herein can be processed as if the transaction is being performed with an integrated chip card (referred to as "integrated chip based transaction"), or as if the transaction is being performed with a magnetic stripe card (referred to as "magnetic stripe based transaction"). In some embodiments, the contactless transaction times using the card emulation techniques described herein may be similar to those of secure element based implementations. For example, according to some embodiments, a contactless transaction using card emulation may take less than 500 milliseconds to complete.

In some embodiments, execution of a contactless transaction using a portable communication device can be carried out by providing or exchanging messages (e.g., Application Protocol Data Unit (APDU) messages) between a mobile application running on the portable communication device and a contactless reader of an access device over a contactless medium such as radio frequency waves. The messages can be in the form of APDU commands sent from the contactless reader to the portable communication device, and APDU responses sent from the mobile application to the contactless reader in response to the APDU commands. To provide additional security, the mobile application may be configured to only respond to APDU commands received from the contactless interface or contactless controller of the portable communication device. In other words, the mobile application can be configured to ignore or reject APDU commands received from other applications or components, and/or ADPU commands that the mobile application does not recognize. In some embodiments, if the mobile application receives an unrecognized APDU command from the contactless interface or contactless controller of the portable communication device, the mobile application can respond to the command with a default status word.

In some embodiments, when the mobile application interacts with an external entity (e.g., MAP, CBPP or issuer/host system via the MAP, or a contactless reader of an access device) for which the mobile application may change its state or its stored information, the mobile application processes the interaction in an atomic manner. In other words, the mobile application may process either all of the functions required by the interaction or none of them. In this manner, the mobile application may keep a recognized state as seen from external entities.

During installation of the mobile application, the mobile application may register its proximity payment system environment (PPSE) name as well as all Application Identifiers (AIDs) covered by the mobile application to ensure that transactions using those AIDs are routed to the mobile application (e.g., this can be achieved through a declaration in the manifest of the mobile application to the mobile operating system). For example, in some embodiments, the mobile application can be registered to receive APDU commands for one or more AIDs of a PPSE with a name such as "2PAY.SYS.DDF01."

In some embodiments, the mobile application can be registered to receive and process APDU commands for multiple AIDs (e.g., AIDs defined for a particular issuer, payment processor or processing network, service provider, etc.), and in some scenarios, the multiple AIDs can be associated with a single account. A single account may have multiple AIDs associated with it, for example, if a transaction conducted on that account can be processed by different payment processing networks and/or if the account can have different services, features, product-types, and payment capabilities associated with the account. For example, a single account may have a common debit AID and a payment processing network specific AID (e.g., a Visa AID) associated with the single account. As another example, a single account may support different payment products, and each payment product can have its own AID. The multiple AIDs can be communicated to the access device to allow an access device to select a preferred AID to choose how the transaction is processed (e.g., which payment processing network) and/or what services or features to associate with or provide for the transaction. The multiple AIDs can be populated in the directory entry for the PPSE, and communicated to an access device for this purpose.

The mobile application on the portable communication device may receive, store, and/or support generation of information related to the account to enable the mobile application to respond with the necessary information to a contactless reader as well as provide cardholders with information about the account via the portable communication device's user interface. Some or all of this information can be provided to the mobile application during the enrollment and provisioning process. The account related information may include card art or other visuals that identifies the account to the consumer, account identifying information that can identify the account to the user (e.g. nickname or last 4 digits of the account), the state of the account (e.g. active, suspended etc.), account configuration information, transaction flow parameters (e.g., information that is provided to a contactless reader during a transaction), the current set of account parameters (e.g., LUK and key index) and its associated set of one or more limited-use thresholds and corresponding usage limits, and a transaction verification log, etc. The account configuration information may include the AID(s) of the account, which consumer verification method(s) (CVM(s)) (e.g., online PIN, consumer device CVM, signature, etc.) are supported by the account (or by the respective AID if multiple AIDs are present) and their priority, whether the account supports magnetic stripe based transactions, and a derivation key index (DKI) associated with the issuer master key used during verification of the transaction cryptograms. For mobile applications supporting multiple accounts for the same or different account AIDs, the mobile application may also support the concept of which account is currently the active account and be able to populate responses to the contactless reader with the data according to the currently active account.

The mobile application may also implement one or more counters to track the transaction activity of the mobile application. For example, the mobile application may implement a sequence counter (SC) to count how many times the mobile application has successfully requested new account parameters for a specific account. The mobile application may also implement an application transaction counter (ATC) to count how many times the mobile application has been used to initiate a transaction.

During a transaction, the mobile application may receive, store, and/or dynamically build information such as transaction flow parameters related to the contactless transaction in order to return the necessary information to the contactless reader for the transaction to be successfully executed. Some of the transaction flow parameters may be received, stored, and/or built before the contactless transaction is initiated, while some transaction flow parameters (e.g., transaction cryptogram) can be dynamically built at the time of transaction. For mobile applications supporting multiple AIDs, different transaction flow parameters can be stored and/or generated per AID. Example details of the transaction flow parameters (e.g., including the transaction processing information and/or account data referred to below), and example details of the communication exchanges between the mobile application and the contactless reader will be described with reference to FIG. 3 for an integrated chip based transaction, and with reference to FIG. 4 for a magnetic stripe based transaction.

Integrated Chip Based Transaction

Figure 3:
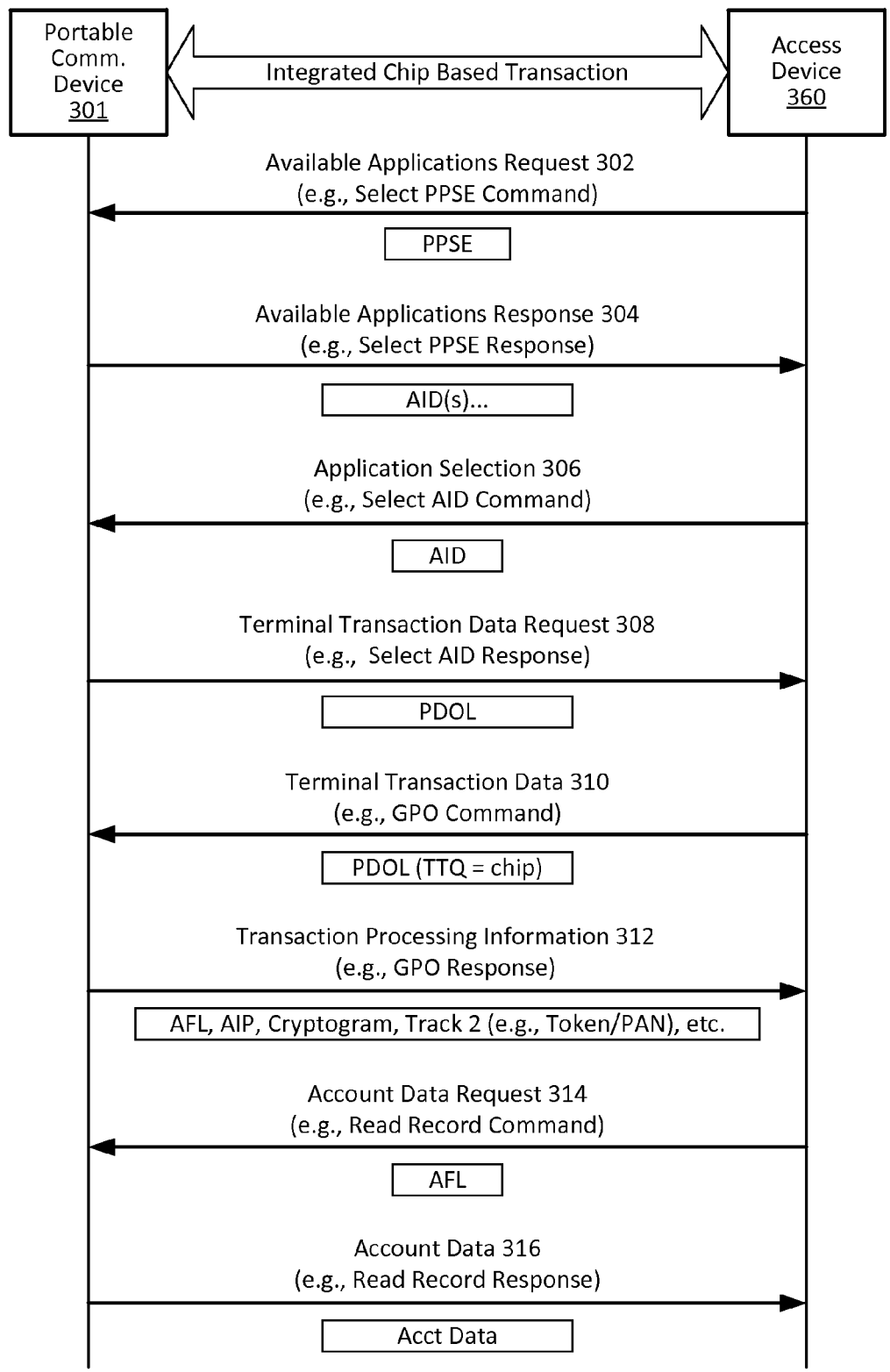
FIG. 3 illustrates a communication flow diagram of an example of executing an integrated chip based transaction, according to some embodiments.

FIG. 3 illustrates an example communication flow between a portable communication device 301 and an access device 360 during an integrated chip based transaction, according to some embodiments. In some embodiments, the communications can be in the form of ADPU commands and responses. However, it should be understood that other messages, messaging protocols, or formats can be used to exchange the relevant information to conduct the transaction. The communications can be carried out between a mobile application running on portable communication device 301 and a contactless reader of access device 360. In some embodiments, the mobile application may communicate with the contactless reader using card emulation APIs of the mobile operating system of portable communication device 301, and thus the transaction can be carried out without requiring the use of a secure element (although a secure element can be used).

When access device 360 detects the presence of portable communication device 301 in proximity to a contactless reader of access device 360, access device 360 may initiate a transaction by sending an available applications request 302 to portable communication device 301 to request information on which payment application(s) (e.g., a list of AID(s)) may be available on the mobile application of portable communication device 301. In some embodiments, the available application(s) request 302 may be in the form of a select PPSE command. The available applications request 302 may include a payment environment identifier (e.g., a PPSE name such as "2PAY.SYS.DDF01") to identify the payment environment supported by access device 360 and the mobile application.

Upon receiving the available applications request 302, the mobile application of portable communication device 301 may identify and process the request by recognizing the payment environment identifier (e.g., PPSE name) included in the request, and respond by sending an available applications response 304 back to access device 360. The available applications response 304 may include a list of available AIDs, and may include the payment environment identifier (e.g., PPSE name) as the dedicated file name. In some embodiments, the available applications response 304 may be in the form of a select PPSE response and may include PPSE file control information (FCI). For example, the available applications response 304 may include a directory entry for each available AID. If the mobile application supports only one AID (irrespective of the number of accounts related to that AID), the mobile application may respond with a single directory entry for the supported AID. If the mobile application supports an account with multiple AIDs, the mobile application may respond with a directory entry for each of the supported AIDs. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available application(s) response 304 may also include other data such as FCI issuer discretionary data.

When access device 360 receives the available applications response 304, access device 304 may select a suitable application from the list of applications received in the available applications response 304 (e.g., by selecting an AID from the available AID(s) received in the available application(s) response 304). In some embodiments, the selected AID can be the highest priority AID available on the mobile application that is supported by access device 360. Access device 360 may send an application selection 306 with the selected AID to the mobile application of portable communication device 301 to continue the transaction. In some embodiments, the application selection 306 can be in the form of a select AID command.

Upon receiving the application selection 306, the mobile application of portable communication device 301 may send a terminal transaction data request 308 to request transaction data from access device 360 which may be needed to execute the transaction using the selected application/AID. In some embodiments, the terminal transaction data request 308 may be in the form of a select AID response and may include AID file control information (FCI) with the selected AID as the dedicated file name. The terminal transaction data request 308 may include a list of transaction data identifiers to request the appropriate data from access device 360, and the list of transaction data identifiers can be in the form of a processing options data object list (PDOL). The transaction data requested by the mobile application for the transaction may include terminal transaction qualifiers (TTQ), authorized amount, other amount, terminal country code, terminal verification results, transaction currency code, transaction data, transaction type, and/or an unpredictable number. The terminal transaction data request 308 may also include other data such as FCI issuer discretionary data, application program identifier, and language preference.

After receiving the terminal transaction data request 308, access device 360 may send, to the mobile application of portable communication device 301, the terminal transaction data 310 requested by the mobile application. In some embodiments, the terminal transaction data 310 may be sent in the form of a get processing options (GPO) command, and may include the requested terminal transaction data in a processing options data object list (PDOL). In some embodiments, the terminal transaction data 310 (e.g., terminal transaction qualifiers (TTQ)) may include a transaction type indicator indicating whether access device 360 supports integrated chip based transactions or magnetic stripe based transactions. Thus, in the integrated chip based transaction illustrated in FIG. 3, access device 360 may send a transaction type indicator in the terminal transaction data 310 to indicate that access device 360 supports integrated chip based transactions. In some embodiments, the terminal transaction data 310 (e.g., terminal transaction qualifiers (TTQ)) may also include a consumer verification method (CVM) requirement indicator to indicate whether a CVM is required by access device 360 for the transaction, and also one or more CVM type indicators indicating the types of CVM supported by access device 360. Examples of CVMs that may be supported by access device 360 can include online PIN, signature, and/or consumer device CVM (CD-CVM) such as a passcode used on portable communication device 301 to unlock the screen or mobile application.

Once the mobile application of portable communication device 301 receives terminal transaction data 310, the mobile application may increment its Application Transaction Counter (ATC), generate dynamic transaction processing information using at least some of the received terminal transaction data 310, and send a set of transaction processing information 312 including the generated dynamic transaction processing information to access device 360. In some embodiments, the transaction processing information 312 can be sent in the form of a GPO response. In some embodiments, the transaction processing information 312 may include one or more application file locators (AFLs) that can be used as file address(es) by access device 360 to read account data stored on portable communication device 301, and an application interchange profile (AIP) that can be used to indicate the capabilities of the mobile application.

For an integrated chip based transaction, the transaction processing information 312 may include a transaction cryptogram dynamically generated using the LUK, track-2 equivalent data, and addition data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK.

The card verification results (CVR) may include information about the CVM verifying entity and the CVM verified type for the transaction. The CVM verifying entity is used to indicate which entity is performing the verification of the CVM for the transaction. The verification entity may be the access device (or terminal), a co-residing secure application, a trusted execution environment application, the mobile application itself, a remote server (e.g., the cloud), or the mobile operating system. The CVM verified type is used to indicated the CVM method used for the transaction. The CVM method may be a passcode, biometric (e.g., fingerprint), pattern lock (e.g., for a screen lock), signature, or online PIN. In some embodiments, if the terminal transaction data 310 received from access device 360 indicates that the CVM supported by access device 360 is an online PIN or a signature, the CVM verifying entity in the CVR can be set to the access device (or terminal) to indicate that access device 360 is the verifying entity, and the CVM verified type can be set accordingly (e.g., online PIN or signature).

If the terminal transaction data 310 received from access device 360 indicates that the CVM supported by access device 360 is a CDCVM, the CVM verifying entity and the CVM verified type can be set according to the configuration parameters of the account. For example, if the account supports CVM using a passcode that is verified by the mobile operating system of portable communication device 301, the CVM verifying entity can be set to the mobile operating system, and the CVM verified type can be set to indicate that the CVM is a passcode. In some embodiments, a CDCVM performed indicator can be included in the card transaction qualifiers (CTQ) to indicate whether the CVM verifying entity has successfully verified the user using the CDCVM indicated by the CVM verified type.

If the terminal transaction data 310 received from access device 360 indicates that a CVM is not required, the CVM verifying entity and the CVM verified type can be set to indicate that no CVM was verified. In some embodiments, the CVR may include additional data such as a threshold indicator that indicates whether one or more limited-use thresholds associated with the LUK has been exceeded.

The form factor indicator (FFI) may include information about portable communication device 301, such as a form factor indicator version number indicating the version of the form factor indicator being used, a consumer payment device form factor indicator indicating the device type of portable communication device 301, and consumer payment device features indicators indicating what payment features are supported by portable communication device 301. The consumer payment device form factor may indicate that portable communication device 301 is a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether portable communication device 301 is capable of using a passcode (can be separate from a PIN that is used during transactions), has a signature panel, has a hologram, has support for card verification values (e.g., CVV2), capable of two-way messaging to exchange identifying information between the issuer and the user, and/or has support for using cloud-based credentials (e.g., LUK, token, etc.). The form factor indicator (FFI) may also include a payment transaction technology indicator indicating that portable communication device 301 supports contactless transactions (e.g., NFC).

It should be understood that in some embodiments, the transaction processing information 312 being sent from portable communication device 301 to access device 360 may include some or all of the information describe above, and in some embodiments, may include additional information not specifically described.

After access device 360 receives the transaction processing information 312, access device 360 may send an account data request 314 to the mobile application of portable communication device 301 to read additional account data that may be stored on portable communication device 301. In some embodiments, the account data request 314 may be in the form of a read record command, and may include an application file locator (AFL) indicating the location of the account data that access device 360 is attempting to read. The AFL included in the account data request 314 may correspond to an AFL in the transaction processing information 312 that was provided to access device 360 from portable communication device 301.

After access device 360 receives the transaction processing information 312, access device 360 may send an account data request 314 to the mobile application of portable communication device 301 to read additional account data that may be stored on portable communication device 301. In some embodiments, the account data request 314 may be in the form of a read record command, and may include an application file locator (AFL) indicating the address or location of the account data that access device 360 is attempting to read. The AFL included in the account data request 314 may correspond to an AFL in the transaction processing information 312 provided from portable communication device 301.

In response to receiving the account data request 314 from access device 360, portable communication device 301 may send the account data 316 stored at the location indicated by the AFL to access device 360. In some embodiments, the account data 316 may be sent in the form of a read record response. The account data 316 may include, for example, application usage control that indicates the issuer's restrictions on the usage and services allowed for the application, the cardholder's name, customer exclusive data, issuer country code, token requester ID (e.g., if a token is used), and/or other account related data that is accessible at the AFL location.

It should be understood that in some embodiments, the account data 316 being sent from portable communication device 301 to access device 360 may include some or all of the information describe above, and in some embodiments, may include additional information not specifically described.

In some embodiments, there can be more than one pair of account data request 314 and account data 316 communication exchange between access device 360 and portable communication device 301, for example, if additional account related data stored is needed by access device 360 to complete the transaction. Once access device 360 has received the requisite data from the transaction processing information 312 and/or one or more account data 316 transmissions, some or all of the data elements in the transaction processing information 312 and/or one or more account data 316 transmissions can be used by access device 360 to generate a transaction authorization request message to request authorization of the transaction from the issuer. For example, in some embodiments, the transaction authorization request message may include at least the track-2 equivalent data and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

Magnetic Stripe Based Transaction

Figure 4:
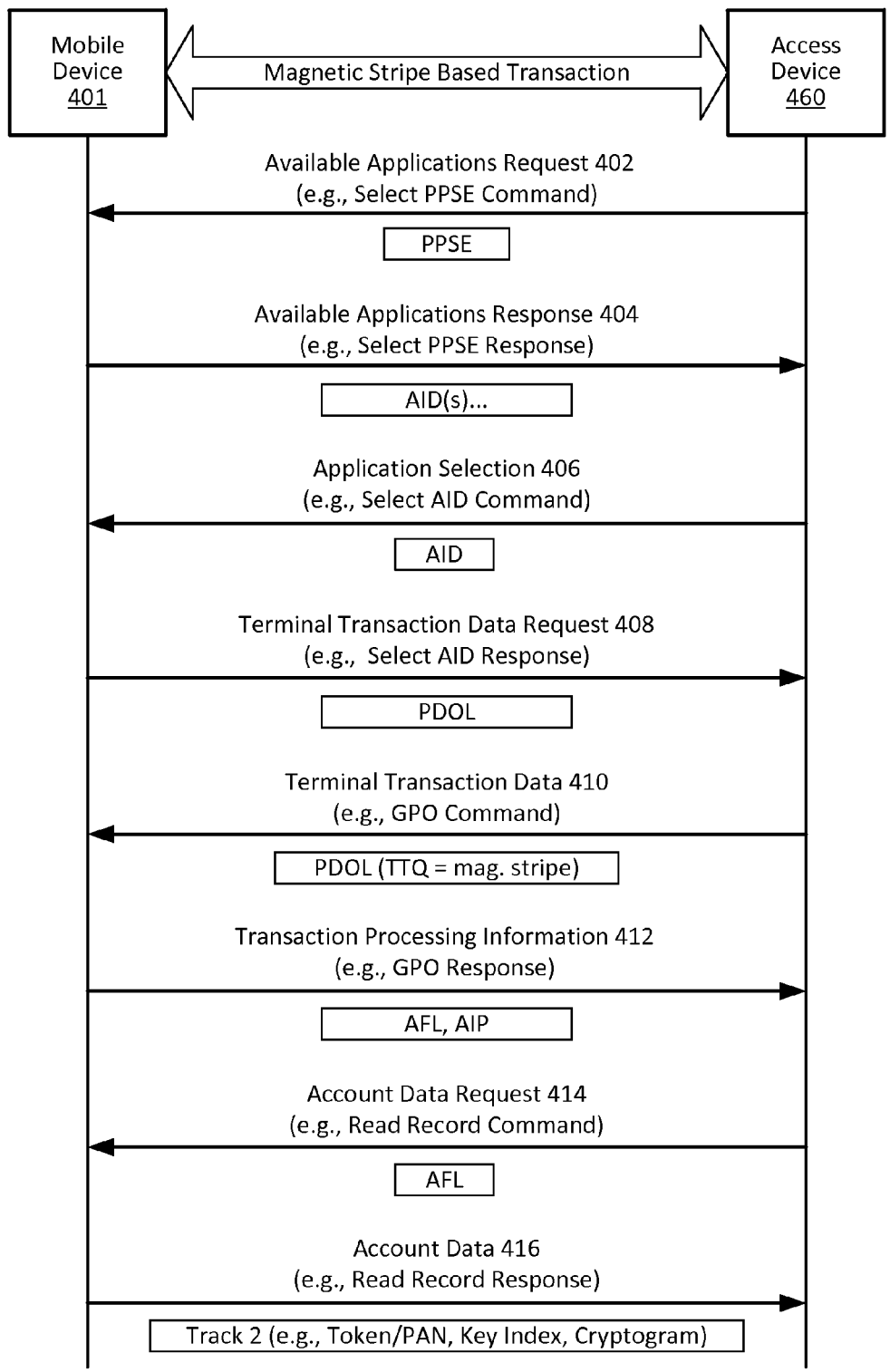
FIG. 4 illustrates a communication flow diagram of an example of executing a magnetic stripe based transaction, according to some embodiments.

FIG. 4 illustrates an example communication flow between a portable communication device 401 and an access device 460 during a magnetic stripe based transaction, according to some embodiments. In some embodiments, the communications can be in the form of ADPU commands and responses. However, it should be understood that other messages, messaging protocols, or formats can be used to exchange the relevant information to conduct the transaction. The communications can be carried out between a mobile application running on portable communication device 401 and a contactless reader of access device 460. In some embodiments, the mobile application may communicate with the contactless reader using card emulation APIs of the mobile operating system of portable communication device 401, and thus the transaction can be carried out without requiring the use of a secure element (although a secure element can be used).

For a magnetic stripe based transaction, the available applications request 402, the available application response 404, the application selection 406, and the terminal transaction data request 408 communications and the relevant data elements included in the communications are similar to that of an integrated chip card based transaction as described above with reference to FIG. 3, and thus a detailed description of which need not be repeated.

In response to receiving the terminal transaction data request 408 from the mobile application of portable communication device 401, access device 460 may send the requested terminal transaction data 410 to portable communication device 401. The terminal transaction data 410 provided to portable communication device 401 in a magnetic stripe based transaction is similar to that of the integrated chip card based transaction as described above with reference to FIG. 3, with the exception that the transaction type indicator provided in the terminal transaction data 410 (e.g., terminal transaction qualifiers (TTQ)) may indicate that access device 360 supports magnetic stripe based transactions.

Once the mobile application of portable communication device 401 receives terminal transaction data 410 and determines that access device 460 supports magnetic stripe based transactions, the mobile application may increment its Application Transaction Counter (ATC), and send a set of transaction processing information 412 to access device 360. In some embodiments, the transaction processing information 412 can be sent in the form of a GPO response. In some embodiments, the transaction processing information 412 may include one or more application file locators (AFLs) that can be used as file address(es) by access device 460 to read account data stored on portable communication device 401, and an application interchange profile (AIP) that can be used to indicate the capabilities of the mobile application. In some embodiments, the one or more AFLs provided to access device 460 during a magnetic stripe based transaction can be different than the AFL(s) provided during an integrated chip based transaction such that the mobile application maintains different locations to store separate sets of data for use in magnetic stripe based transactions versus integrated chip based transactions. The mobile application may also generate dynamic transaction processing information that may or may not use at least some of the received terminal transaction data 410, and store the generated information at a location accessible by the one or more application file locators (AFLs). The dynamic transaction processing information may include, for example, a transaction cryptogram generated by using the LUK.

After access device 460 receives the transaction processing information 412, access device 460 may send an account data request 414 to the mobile application of portable communication device 401 to read account data that may be stored on portable communication device 301. In some embodiments, the account data request 414 may be in the form of a read record command, and may include an application file locator (AFL) indicating the location of the account data that access device 460 is attempting to read. The AFL included in the account data request 414 may correspond to an AFL in the transaction processing information 412 that was provided to access device 460 from portable communication device 401.

In response to receiving the account data request 414 from access device 460, portable communication device 401 may send the account data 416 stored at the location indicated by the AFL to access device 460. In some embodiments, the account data 416 may be sent in the form of a read record response. The account data 416 may include, for example, track-2 equivalent data and the cardholder name, etc. In some embodiments, for a magnetic stripe based transaction, the transaction cryptogram generated by using the LUK and/or the key index associated with the LUK can be embedded in the track-2 equivalent data.

It should be understood that in some embodiments, the account data 416 being sent from portable communication device 401 to access device 460 may include some or all of the information describe above, and in some embodiments, may include additional information not specifically described.

In some embodiments, there can be more than one pair of account data request 414 and account data 416 communication exchange between access device 460 and portable communication device 401, for example, if additional account related data stored is needed by access device 460 to complete the transaction. Once access device 460 has received the requisite data from the transaction processing information 412 and/or one or more account data 416 transmissions, some or all of the data elements in the transaction processing information 412 and/or one or more account data 416 transmissions can be used by access device 460 to generate a transaction authorization request message to request authorization of the transaction from the issuer. For example, in some embodiments, the transaction authorization request message may include at least the track-2 equivalent data and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

Track-2 Equivalent Data

According to some embodiments, depending on the type of transaction being execute (e.g., integrated chip based transaction or magnetic stripe based transaction), different data elements can be included in the track-2 equivalent data provided from the mobile application of the portable communication device to the access device. Table 1 shows an example of a track-2 equivalent data format with an embedded transaction cryptogram that can be used in either a magnetic stripe based transaction or an integrated chip based transaction.

TABLE 1

| Track-2 equivalent data with embedded transaction cryptogram Data Element |
| --- |
| Account Identifier (e.g., PAN, alternate PAN, token) |
| Field Separator = 'D' |
| Expiry Date |
| Service Code |
| Key Index |
| Transaction Cryptogram |
| Padding 'F' |

The key index is associated with the LUK that was used in the generation of the transaction cryptogram for the particular transaction, and may include information pertaining to the generation of the LUK as described herein. For example, the key index may be a seed that was used to generate the LUK, and may include time information (e.g., a timestamp) indicating when the LUK was generated, and/or may include a replenishment counter value indicating the number of times that the LUK has been renewed or replenished for a particular account, mobile application, or portable communication device. In some embodiments, the key index may include an application transaction counter value indicating the number of transactions that has been previously conducted by a mobile application of the portable communication device at the time the LUK is generated, or may include a pseudo random number generated by a cloud-based transaction service provider or by a suitable entity such as an issuer involved in processing the transaction.

The transaction cryptogram embedded in the track-2 equivalent data may be a cryptogram generated by using the LUK as an encryption key. In some embodiments, the transaction cryptogram that is embedded in the track-2 equivalent data may be different than the transaction cryptogram that is provided in the transaction processing information 312 (e.g., GPO response). For example, the transaction cryptogram embedded in the track-2 equivalent data (may be referred to as a "decimalized transaction cryptogram") may have a reduced-length (e.g., reduced to six digits), and/or may be generated by encrypting a static data (e.g., a predetermined numeric string) instead of terminal transaction data.

In some embodiments in which the transaction is conducted using an optical contactless interface, an optical image such as a QR code or a bar code can be generated to encode the track-2 equivalent data format shown in Table 1, and the optical image encoding the track-2 equivalent data can be displayed on a portable communication device, and be presented to an optical scanner or reader of an access device to conduct the transaction.

Table 2 shows an example of a track-2 equivalent data format without an embedded transaction cryptogram that can be used in an integrated chip based transaction.

TABLE 2

| Track-2 equivalent data without embedded transaction cryptogram Data Element |
| --- |
| Account Identifier (e.g., PAN, alternate PAN, token) |
| Field Separator = 'D' |
| Expiry Date |
| Service Code |
| PIN Verification Field |
| Track 2 Discretionary Data |
| Padding 'F' |

For an integrated chip based transaction, a transaction cryptogram is already provided to the access device in the transaction processing information 312 (e.g., GPO response), and thus it may be unnecessary to include a transaction cryptogram in the track-2 equivalent data for an integrated chip based transaction. Hence, the track-2 equivalent data format shown in Table 2 can be used for an integrated chip based transaction, although the track-2 equivalent data format shown in Table 1 may also be used.

In some embodiments, the key index associated with the LUK can be embedded in the track-2 discretionary data in the track-2 equivalent data format shown in Table 2. The key index, for example, may include time information and/or a replenishment counter value, an application transaction counter value, or a pseudo random number, or any of the examples described herein. In some embodiments, the key index may act as a seed for generating the transaction cryptogram. By including the seed in the track-2 discretionary data that is passed to the issuer, the issuer can verify the seed, and in some embodiments, regenerate the transaction cryptogram using the seed to verify the transaction cryptogram.

It should be understood that the track-2 equivalent data formats describe above are examples, and that in some embodiments, the track-2 equivalent data may omit some of the data elements, and/or may include additional data elements not specifically shown.

V. Transaction Verification Log

According to some embodiments, the mobile application may update a transaction verification log maintained by the mobile application at the end of a transaction to include information about the transaction in the transaction verification log. The mobile application may recognize the end of a transaction by recognizing that all transaction processing information and/or account data that may be needed by the access device to complete the transaction has been provided to the access device (e.g., recognizing that the last record defined in the AFL has been returned successfully or if no AFL, when the GPO response has been returned successfully).

Figure 5:
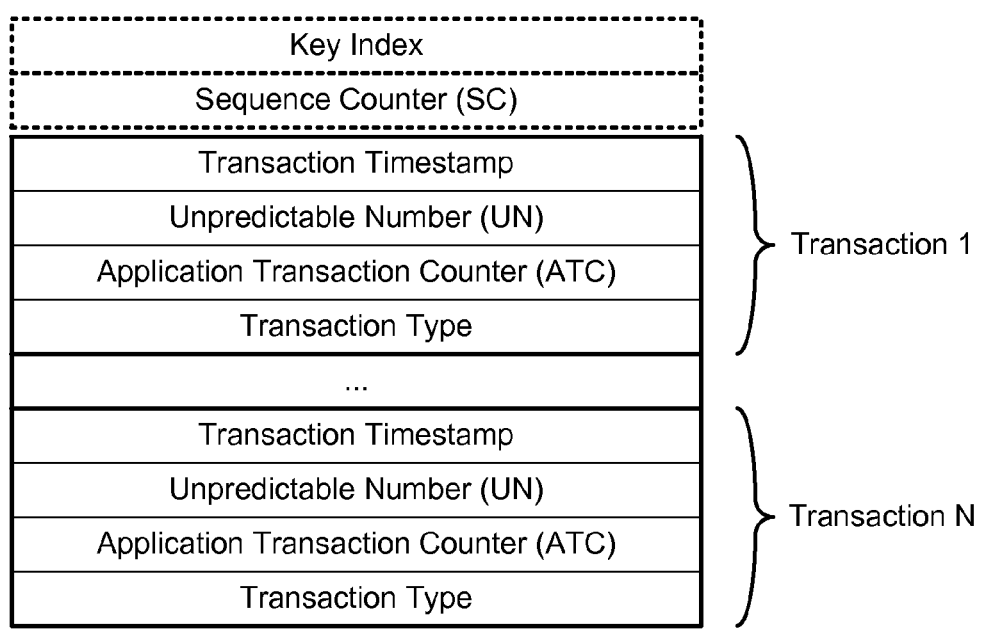
FIG. 5 illustrates an example of a transaction verification log, according to some embodiments.

FIG. 5 illustrates examples of data elements that can be include in a transaction verification log, according to some embodiments. The mobile application may maintain a transaction verification log per LUK or per set of account parameters. In some embodiments, the portable communication device may maintain a number of transaction verification logs for several LUKs or sets of account parameters, or optionally, once the current LUK or account parameters have been renewed or replenished, the transaction verification log corresponding to the previous LUK or account parameters can be deleted to save memory space on the portable communication device.

The transaction verification log may be associated with and/or may include the key index corresponding to the LUK or set of account parameters used in the logged transactions, and a sequence counter value associated with the key index or set of account parameters indicating the number of times the LUK or set of account parameters have been replenished. For each transaction conducted using the particular LUK or particular set of account parameters, the transaction verification log may include a transaction timestamp indicating the time of the corresponding transaction, an unpredictable number (UN) provided from the access device during the transaction (if available), an application transaction counter (ATC) value associated with the corresponding transaction (e.g., a value indicating the number of transactions that has been conducted using the mobile application at the time of the transaction), and a transaction type indicator indicating whether the corresponding transaction was conducted as an integrated chip based transaction or a magnetic stripe based transaction. The transaction timestamp may be the UTC time as determined by the portable communication device at the time of the transaction. In some embodiments, additional information such as the location of the portable communication device at the time of the corresponding transaction can be included in the transaction verification log. It should be understood that in some embodiments, the transaction verification log may include fewer data elements, and/or may include other data elements not specifically shown.

Figure 6:
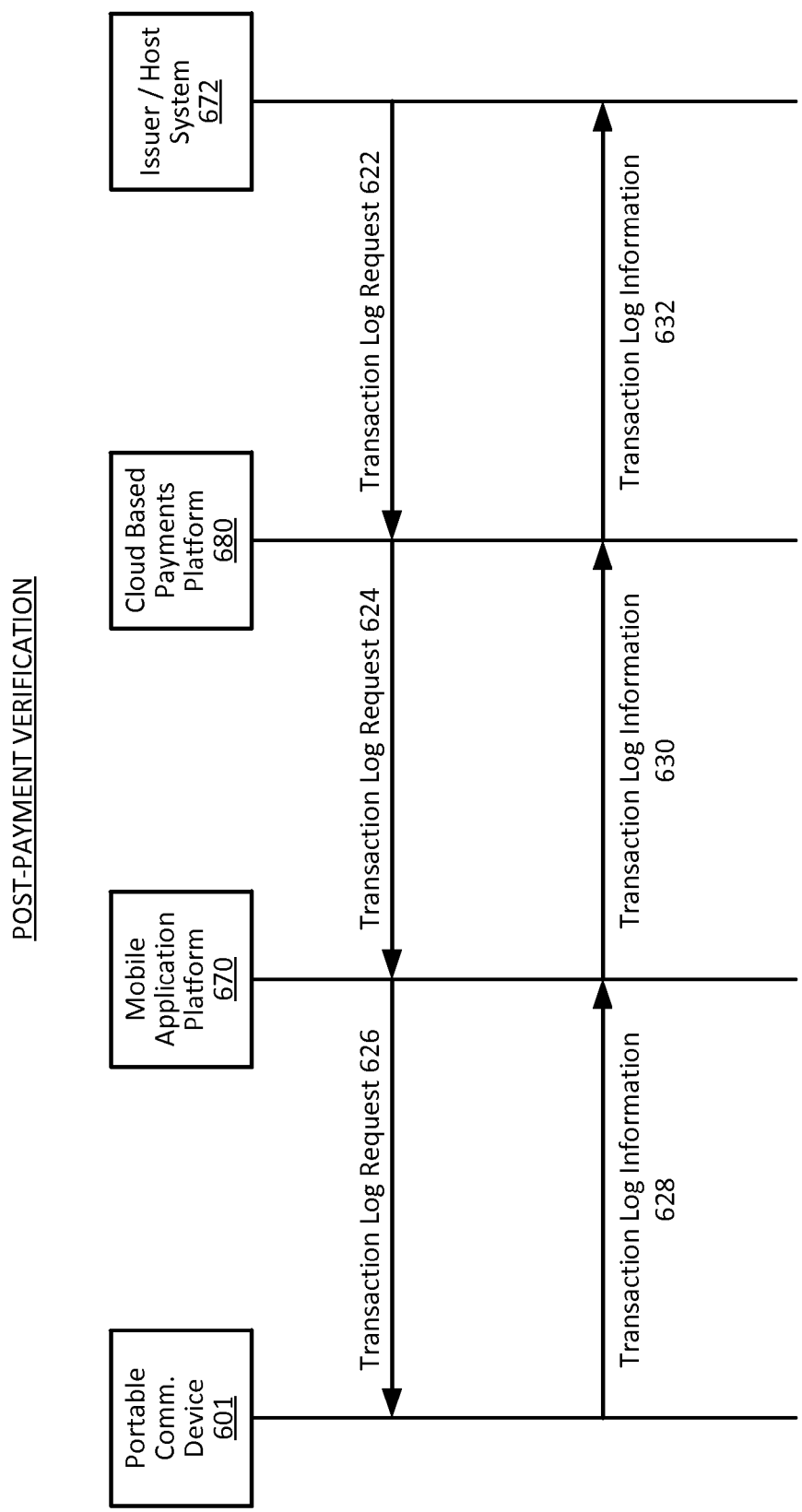
FIG. 6 illustrates a communication flow diagram of an example of a post-payment verification process, according to some embodiments.

The transaction verification log can be used for various purposes such as post payment verification and account parameters replenishment. FIG. 6 illustrates a communication flow diagram of an example of a post-payment verification process, according to some embodiments. The post-payment verification process can be initiated by an issuer/host system 672 when issuer/host system 672 decides to check the account, for example, when a transaction flagged as being suspicious or potentially fraudulent is received, or when issuer/host system 672 checks the account randomly or periodically as a fraud-prevention measure.

Issuer/host system 672 may initiate the post-payment verification process by sending, to CBPP 680, a transaction log request 622 to request the transaction verification log associated with an account. The transaction log request 622 may include information such as an account identifier that can be used by CBPP 680 to identify the account. CBPP 680 may identify the account in question and the mobile application that the account is registered to, and forward this information as transaction log request 624 to MAP 670. MAP 670 may identify and authenticate the portable communication device associated with the account and mobile application, and send transaction log request 626 to the identified mobile application of portable communication device 601.

Upon receiving the transaction log request 626, the mobile application of portable communication device 601 may retrieve the transaction verification log from the memory of the portable communication device, and package the data into transaction log information 628 for transmission to issuer/host system 672. The transaction log information 628 is derived from the transaction verification log stored on the portable communication device, and may include some or all of the information contained in the transaction verification log such as the per transaction details for each transaction such as the transaction timestamp, application transaction counter value, transaction type indicator, unpredictable number if available, and/or any combination thereof; the key index associated with the LUK or account parameters used for the transactions; the sequence counter associated with the LUK or account parameters; and/or any combination thereof. Alternatively or additionally, the transaction log information derived from the transaction verification log may include an authentication code (e.g., a message authentication code, hash value, etc.) computed over some or all of the information in the transaction verification log. For example, the authentication code may be computed over the per transaction details, or over the key index and/or sequence counter together with the per transaction details. In some embodiments, the authentication code can be generated by using the LUK as an encryption key.

After deriving the relevant transaction log information 628 from the transaction verification log, the mobile application on portable communication device 601 sends the transaction log information 628 to MAP 670. MAP 670 forwards the information as transaction log information 630 to CBPP 680, and CBPP 680 forwards the information as transaction log information 632 to issuer/host system 672. In some embodiments, CBPP 680 may perform verification of the received transaction log information, for example, if CBPP 680 tracks the transaction activity of the account, and may additionally or alternatively provide the verification result in the transaction log information 632 transmitted to issuer/host system 672.

When issuer/host system 672 receives the transaction log information 632, issuer/host system 672 may compare the information against the suspicious transaction, and/or compare the information against the transaction activity for the current LUK or set of account parameters. If the transaction log information 632 indicates the suspicious transaction was conducted by the mobile application of portable communication device 601 and/or the transaction log information 632 matches the transaction activity, issuer/host system 672 completes the post-payment verification process and maintains the account in active status.

If the transaction log information 632 indicates the suspicious transaction did not originate from the mobile application of portable communication device 601 or if the transaction log information 632 does not match the transaction activity at the issuer, issuer/host system 672 may suspend the account, and send a suspend notification to CBPP 680. CBPP 680 may suspend the account in its own system and forward the suspend notification to MAP 670. MAP 670 then forwards the suspend notification to the mobile application of portable communication device 601. In response to receiving the suspend notification, the mobile application may delete the current set of account parameters from the mobile application and display a message to request the user to contact the issuer. VI. Account Parameters Replenishment When a set of account parameters (e.g., LUK) expires due to the age of the account parameters or usage of the account parameters exhausting the associated set of one or more limited-use thresholds, a subsequent transaction conducted using the expired set of account parameters may be declined. In order to be able to continue to conduct transactions using the mobile application of the portable communication device, the mobile application may need to update, renew, refresh, or replenishment the set of account parameters available to the mobile application. In some embodiments, the transaction verification log may also be used during the account parameter replenishment process to verify that the mobile application or portable communicate device requesting new account parameters is the same application or device that had previously received and used the prior set of account parameters.

To facilitate the account parameters replenishment process, the mobile application of the portable communication device may track the usage of the set of account parameters (e.g., LUK), and maintain an account parameters status that indicate whether one or more limited-use thresholds associated with the account parameters or LUK has been exhausted or is about to be exhausted. For example, the mobile application may track how many transactions have been conducted using the set of account parameters or LUK, how much time has elapsed since the set of account parameters or LUK was generated, and/or the cumulative transaction amount over all transactions that were conducted using the set of account parameters or LUK. At the end of each transaction, the mobile application may update the usage of the set of account parameters or LUK being tracked by the mobile application, and compare the usage against the on-device set of one or more limited-use thresholds. In some embodiments, if the mobile application determines that the usage of the current set of account parameters or LUK has exhausted the on-device set of one or more limited-use thresholds or used beyond the usage limit, the mobile application may initiate an account parameters replenishment request. In some embodiments, the mobile application may initiate an account parameters replenishment request if the mobile application determines that the next transaction conducted using the current set of account parameters or LUK will exhaust the set of one or more limited-use thresholds. This can be done, for example, to help ensure that a valid set of account parameters or LUK is constantly available to the mobile application such that the next transaction conducted with the mobile application does not get declined.

Figure 7:
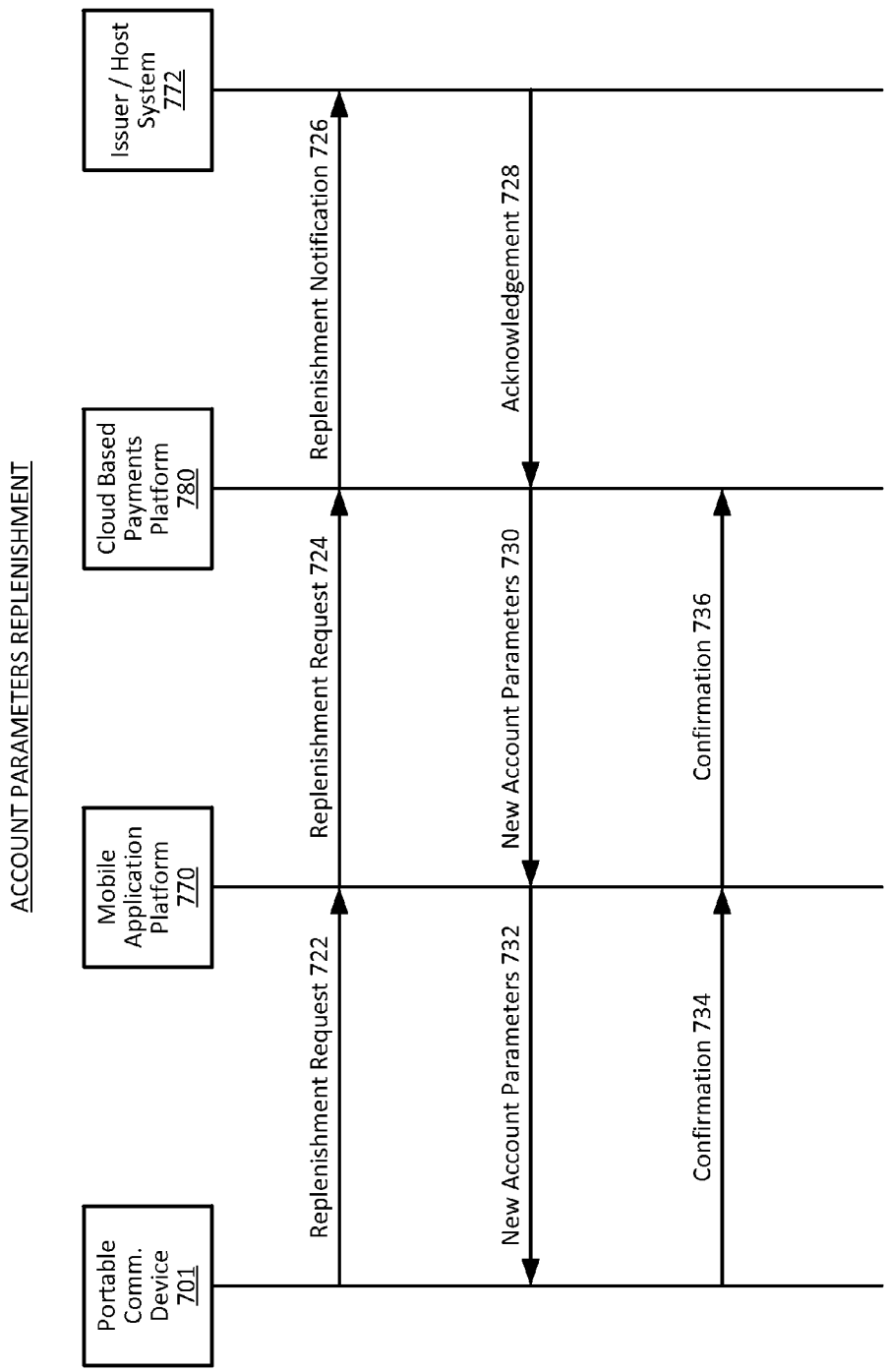
FIG. 7 illustrates a communication flow diagram of an example of an account parameters replenishment process, according to some embodiments.

FIG. 7 illustrates a communication flow diagram of an example of an account parameters replenishment process, according to some embodiments. In the example shown in FIG. 7, the account parameters replenishment process is initiated by the mobile application of portable communication device 701, and may be referred to as a replenishment pull process. When the mobile application determines that the set of one or more limited-use thresholds associated with the current set of account parameters have been exhausted or is about to be exhausted, the mobile application of portable communication device 701 may send an account parameters replenishment request 722 to MAP 770 to replenish the set of account parameters or LUK available to the mobile application.

The account parameters replenishment request 722 may include information identify the relevant account, mobile application, and/or portable communication device 701, and may include transaction log information derived from the transaction verification log stored on the portable communication device. The transaction log information provided in the account parameters replenishment request 722 may include some or all of the information contained in the transaction verification log such as the per transaction details for each transaction conducted using the current set of account parameters or LUK (e.g., transaction timestamp, application transaction counter value, transaction type indicator, unpredictable number if available, and/or any combination thereof). The transaction log information may include the key index associated with the current set of account parameters or LUK, and/or the sequence counter associated with the current set of account parameters or LUK. Alternatively or additionally, the transaction log information derived from the transaction verification log and provided in the account parameters replenishment request 722 may include an authentication code (e.g., a message authentication code, hash value, etc.) computed over some or all of the information in the transaction verification log. For example, the authentication code may be computed over the per transaction details, or over the key index and/or sequence counter together with the per transaction details. In some embodiments, the authentication code can be generated by using the LUK as an encryption key.

When MAP 770 received the account parameters replenishment request 722, MAP 770 forwards the request as account parameters replenishment request 724 to CBPP 780. Upon receiving the account parameters replenishment request 724, CBPP 780 may verify the transaction log information or request issuer/host system 772 to verify the transaction log information. If the transaction log information matches the transaction activity at CBPP 780 or issuer/host system 772, CBPP 780 may then generate a new set of account parameters (e.g., new key index and new LUK) to replenish the current set of account parameters at the mobile application. CBPP 780 may send a replenishment notification 726 to issuer/host system 772 to notify the issuer that a new set of account parameters is being replenished to the mobile application. In some embodiments, the replenishment notification 726 may include the new set of account parameters (e.g., new key index and new LUK) such that issuer/host system 772 may perform its own update. Issuer/host system 772 may respond by sending an acknowledgment 728 to CBPP 780.

After the new set of account parameters are generated, CBPP 780 may send the new set of account parameters 730 to MAP 770. The new set of account parameters 730 may include a new key index, a new LUK, etc., and in some embodiments, may also include a new set of one or more limited-use thresholds associated with the account parameters or LUK that may have different usage limits than the previous thresholds. MAP 770 then forwards the data as the new set of account parameters 732 to the mobile application of portable communication device 701.

When the mobile application of portable communication device 701 receives the new set of account parameters (e.g., new LUK and new key index associated with the LUK), the mobile application delete the previous set of account parameters and associated transaction verification log details and usage tracking, and store the new set of account parameters. If the new set of account parameters has different usage limits for the set of one or more limited-use thresholds, the one or more limited-use thresholds can be updated with the new usage limits. The mobile application also increments the sequence counter for each successful account parameters replenishment. Once the mobile application has updated the set of account parameters, the mobile application of portable communication device 701 may send a confirmation 734 to MAP 780, and MAP 780 may forward this as confirmation 736 to CBPP 770 to confirm that the account parameters replenishment process was successful.

In some embodiments, if issuer/host system 772 is responsible for account parameters generation, instead of sending the replenishment notification 726 to issuer/host system 772, CBPP 780 may forward account parameters replenishment request 724 to issuer/host system 772, and have issuer/host system 772 generate the new set of account parameters. (e.g., new key index and new LUK) In such embodiments, issuer/host system 772 may provide the new set of account parameters to CBPP 780 and/or to MAP 770 for forwarding to the mobile application on portable communication device 701.

According to some embodiments, the account parameters replenishment process can be initiated by CBPP 770 and/or issuer/host system 772. An account parameters replenishment process that is not initiated by the mobile application may be referred to as a replenishment push process. For example, the account parameters replenishment process can be triggered by transaction activity monitored by CBPP 770 and/or issuer/host system 772. In some embodiments, CBPP 770 and/or issuer/host system 772 may maintain their own set of one or more limited-use thresholds, which may or may not have the same usage limits as the on-device limited-use thresholds maintained at the mobile application. CBPP 770 and/or issuer/host system 772 may track the usage of the current set of account parameters (e.g., LUK).

When CBPP 770 determines that the set of one or more limited-use thresholds at the CBPP 770 associated with the current set of account parameters have been exhausted or is about to be exhausted, CBPP 770 may send a push message to MAP 780 to request the mobile application to replenish its current set of account parameters. When issuer/host system 772 determines that the issuer set of one or more limited-use thresholds associated with the current set of account parameters have been exhausted or is about to be exhausted, issuer/host system 772 may send a push message to CBPP 770 and/or MAP 780 to request the mobile application to replenish its current set of account parameters.

Upon receiving a push message to replenish the set of account parameters from CBPP 770 or issuer/host system 772, MAP 780 may forward the push message to the mobile application of portable communication device 701. In some scenarios, portable communication device 701 may be powered off or the mobile application may not be active at portable communication device 701 at the time CBPP 770 and/or issuer/host system 772 initiates the replenishment process. In such scenarios, MAP 780 may queue the push message for deliver to the mobile application at a later time, and may periodically attempt to reach the mobile application until MAP 780 establishes communication with the mobile application. When the mobile application receives the push message requesting the mobile application of portable communication device 701 to replenish the account parameters (e.g., LUK and associated key index), in response, the mobile application of portable communication device 701 may send an account parameters replenishment request with the relevant transaction log information to MAP 780. The replenishment process may continue in a similar manner as the replenishment push process described above with reference to FIG. 7. In some embodiments, CBPP 770 and/or issuer/host system 772 may generate the new set of account parameters and provide them to MAP 780 together with the push message such that MAP 780 may provide the new set of account parameters to the mobile application when communication with the mobile application is established.

Although the above description of the account parameters replenishment process may have been described with reference to replenishing the LUK and the key index associated with the LUK, it should be understood that the account parameters replenishment process can be used, for example, to replenish other account parameters or related information such as to replenish a token that is used as a substitute for an account identifier. In some embodiments, a token can be replenished at the same time as the LUK and key index, or separately from the LUK and key index.

VII. Cryptograms for Transactions

According to some embodiments, because no secure element is required to be present to protect account credentials stored on the potable communication device, the account parameters for conducting cloud-based transactions may have a limited lifespan such that even if a given set of account parameters is compromised, the stolen account parameters would be of little use as they may have expired or will expire shortly. For example, instead of using a static key stored in a secure element to generate cryptograms during transactions as in some secure element implementations, the cloud-based transaction system uses limited-use keys in the generation of transaction cryptograms.

In some embodiments, two types of transaction cryptogram may be used—one for track-2 data used in magnetic stripe based transactions, and one for integrated chip based transactions. For both types of transaction cryptogram, the transaction cryptogram is generated using a limited use key (LUK). The difference between the two types of transaction cryptograms is the input data used for generating the cryptogram and/or the final format of the transaction cryptogram that is transmitted to the access device to conduct the transaction. For an integrated chip based transaction, the input data used to generate the cryptogram may include dynamic data (e.g., data that changes for each transaction) received from the contactless reader of an access device during the transaction (e.g., terminal transaction data), while the input data for a magnetic stripe based transaction may be static data (e.g., data that does not change from one transaction to another such as a predetermined numeric string). This means that in some embodiments, for a magnetic stripe based transaction, either the CBPP or the mobile application itself can generate the transaction cryptogram as the generation of the transaction cryptogram does not rely on data from the contactless read of an access device; and for an integrated chip based transaction, the mobile application provides generation of the transaction cryptogram.

It should also be noted that in some embodiments, the input for generating the transaction cryptogram in a magnetic stripe based transaction can alternatively or additionally include dynamic data received from the contactless reader of an access device during the transaction (e.g., terminal transaction data). Furthermore, the input for generating the transaction cryptogram in an integrated chip based transaction can alternatively or additionally include static data.

In addition to being used in transaction cryptogram generation, in some embodiments, the LUK can be used to generate an authentication code when the mobile application communicates with the other components or entities of the cloud-based transaction system. For example, an authentication code or hash code can be generated over the transaction verification log details using the LUK as a key during the account parameters replenishment process.

Figure 8:
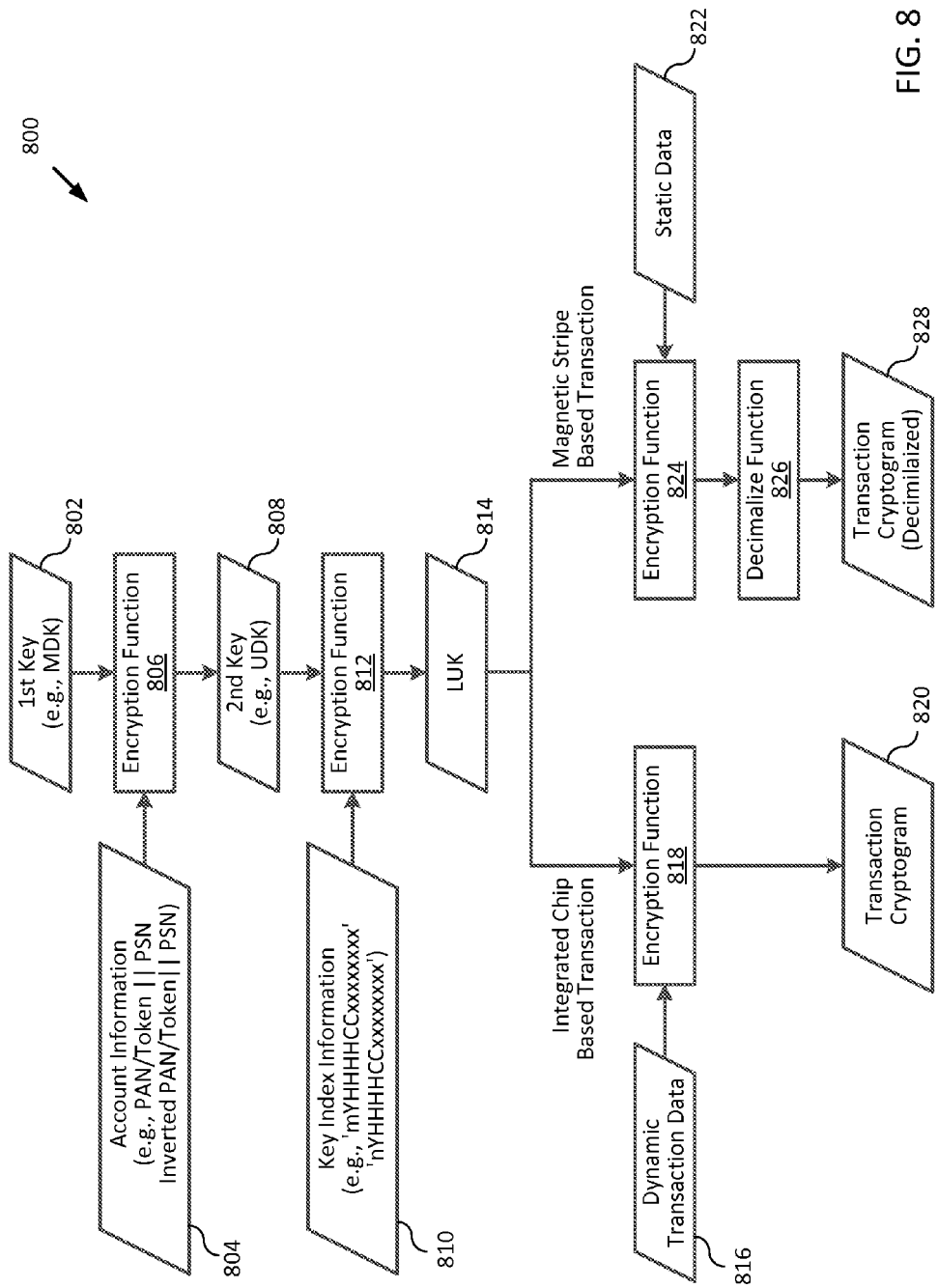
FIG. 8 illustrates an example of a process for generating a transaction cryptogram, according to some embodiments.

FIG. 8 illustrates a block diagram of an example of a process 800 for generating a transaction cryptogram, according to some embodiments. Any one of the encryption functions 806, 812, 818, and/or 824 can be the same or be different than any of the other encryption functions. For example, any one of the encryption functions 806, 812, 818, and/or 824 may be implemented as triple data encryption standard (TDES), data encryption standard (DES), advanced encryption standard (AES), or other suitable encryption algorithms.

Process 800 can be divided into two parts—the first part relates to the LUK generation (blocks 802 to 814), and the second part relates to the transaction cryptogram generation (blocks 816-828). The first part relating to the LUK generation can be performed once to generate a LUK (e.g., by CBPP or issuer/host system), and the second part relating to the transaction cryptogram generation can be performed multiple times using the LUK generated from the first part (e.g., by the mobile application) until the LUK has exceeded its set of one or more limited-use thresholds, at which time, the first part relating to the LUK generation can be performed again to replenish, renew, or refresh the LUK.

Process 800 may begin by encrypting account information 804 with a first encryption key 802 using an encryption function 806 to generate a second encryption key 808. The first encryption key 802 may be a base key that is associated with the issuer of the user's account, and the base key may be associated with a group of accounts. For example, the first encryption key 802 may be associated with a group of accounts within a BIN or PAN range designated for the cloud-based transaction service. In some embodiments, the first encryption key 802 may be a master derivation key (MDK) associated with the issuer of the account associated with the account information 804, and the first encryption key 802 can be maintained at the CBPP or at the issuer/host system.

The account information 804 may include account identifying information such as an account identifier (e.g., a PAN), an alternate account identifier (e.g., an alternate PAN), or a token that is a substitute for an account identifier, and may additionally include user identifying information such as a sequence number (e.g., a PAN sequence number (PSN)) that identifies the particular user of the account (e.g., when multiple users use the same account). For example, the account information 804 that is used as the input to encryption function 806 can be a concatenation of the account identifying information and the user identifying information, or an inverted version of the concatenation.

In some embodiments, the second encryption key 808 being generated from the account information 804 may include multiple portions that are each generated from different variations of the account information 804. For example, the second encryption key 808 may be divided into two portions. The first portion of the second encryption key 808 may be generated by encrypting the account information 804 using the first encryption key 802. The second portion of the second encryption key 808 may be generated by inverting the account information 804 and encrypting the inverted account information using the first encryption key 802. The encryption function 806 used to generate the second encryption key 808 may be, for example, triple data encryption standard (TDES) or other suitable encryption algorithms, and may use an initial chaining vector of binary zeros. In some embodiments, the second encryption key 808 generated from the account information 804 may correspond to a unique derivation key (UDK) for the account.

Process 800 may continue by encrypting key index information 810 with the second encryption key 808 using an encryption function 812 to generate the limited-use key (LUK) 814. The key index information 810 may be derived from a key index that includes information pertaining to the generation of the LUK 814, and that may be used as a seed to generate LUK 814. For example, the key index may include time information indicating when the LUK 814 is being generated. In some embodiments, the time information can be represented as the numeric string 'YHHHH', where 'Y' (0-9) represents the least significant digit of the current year, and 'HHHH' (0001-8784) represents the number of hours since the start of January $1^{st}$ of the current year expressed as digits (e.g., first hour of January $1^{st}$=0001). In some embodiments, the key index may also include a replenishment counter value indicating the number of times that the LUK 814 has been renewed or replenished in a predetermined time period (e.g., number of times LUK 814 has been generated in each hour). For example, the replenishment counter value can be represented as the numeric string 'CC' (00-99). At the beginning of each hour, 'CC' starts at 00 and is incremented by 1 each time LUK 814 is generated. In some embodiments, the key index may include an applications transaction counter value, or a pseudo random number generated by the CBPP or the issuer.

According to some embodiments, the key index information 810 that is provided as input to the encryption function 812 may be generated by padding the key index with one or more numeric values. For example, the key index can be padded with a numeric value (e.g., 1 or 2 shown as 'm' or 'n' in FIG. 8) at the beginning of the key index and/or a numeric value (e.g., 80000000 shown as 'xxxxxxxx' in FIG. 8) at the end of the key index. In some embodiments, the LUK 814 being generated from the key index information 810 may include multiple portions that are each generated from different variations of the key index information 810. For example, the LUK 814 may be divided into two portions. The first portion of LUK 814 may be generated by padding the key index with a first value to generate a first padded key index (e.g., 1YHHHHCC80000000), and encrypting the first padded key index using the second encryption key 808. The second portion of LUK 814 may be generated by padding the key index with a second value to generate a second padded key index (e.g., 2YHHHHCC80000000), and encrypting the second padded key index using the second encryption key 808. The encryption function 812 used to generate the LUK 814 may be, for example, TDES or other suitable encryption algorithms, and may use an initial chaining vector of binary zeros. It should be understood that the numeric values described herein are just examples, and that in some embodiments, other numeric values can be used.

After the LUK 814 is generated (e.g., by the CBPP or the issuer), the LUK 814 and the key index that includes information pertaining to the generation of LUK 814 may be provided to a portable communication device to facilitate generation of transaction cryptograms for transactions conducted using the portable communication device. The LUK may be associated with a set of one or more limited-use thresholds that limit the number of transactions that can be conducted using the LUK 814, such as those described herein. During execution of a transaction, the transaction cryptogram and/or the key index can be provided from the portable communication device to an access device, and the transaction may be authorized based on verification of the transaction cryptogram and whether the LUK 814 used to generate the transaction cryptogram has exceeded one or more of the LUK's limited-use thresholds.

As discussed above, in some embodiments, two types of transaction cryptograms can be generated. For a magnetic stripe based transaction, the transaction cryptogram 828 may be a reduced-length transaction cryptogram (may also be referred to as a decimalized transaction cryptogram). Transaction cryptogram 828 may be generated by encrypting static data 822 (e.g., can be a predetermined numeric string such as '0000000000000001') using the LUK 814 as an encryption key in encryption function 824 to form an encrypted static data or encrypted numeric string represented in hexadecimals (0-F). The encryption function 824 may be, for example, TDES or other suitable encryption algorithms, and may use an initial chaining vector of binary zeros. The encrypted static data (or encrypted numeric string) may then be decimalized by using decimalize function 826 to generate the transaction cryptogram 828.

In some embodiments, the transaction cryptogram 828 may be divided into two data blocks. The decimalize function 826 used to generate the two data blocks of the transaction cryptogram 828 may include extracting numeric digits (0-9) from the encrypted static data or encrypted numeric string to form the first data block; and for the second data block, extracting hexadecimal digits (A-F) from the encrypted static data or encrypted numeric string, and converting each extracted hexadecimal digit into a numeric digit by subtracting ten from the corresponding hexadecimal digit to form the second data block. The first data block is then concatenated with the second data block to form the transaction cryptogram 828. In some embodiments, the decimalized transaction cryptogram 828 may have six digits, and may be embedded with the key index (e.g., 'YHHH-HCC') in the track-2 equivalent data provide in a transaction authorization request message to request authorization for a transaction from the issuer.

For an integrated chip based transaction, the transaction cryptogram 820 may be generated by encrypting dynamic transaction data 816 using the LUK 814 as an encryption key in encryption function 818. The dynamic transaction data 816 may include, for example, some or all of the terminal transaction data 310 provided from the access device to the mobile application of the portable communication device during execution of the transaction. In some embodiments, the dynamic transaction data 816 may include the following data elements: authorized amount, other amount, terminal country code, terminal verification results, transaction currency code, transaction date, transaction type, and unpredictable number; and/or may include the application interchange profile (AIP), application transaction counter (ATC), and issuer application data (IAD). In some embodiments, some data elements may be omitted, and/or additional data elements not specifically described can be included. The data set that makes up the dynamic transaction data 816 is provided as input to the encryption function 818. In some embodiments, the transaction cryptogram 820 can be generated by enciphering the dynamic transaction data 816 using a first portion of the LUK 814, deciphering the enciphered dynamic transaction data using a second portion of the LUK 814, and then re-enciphering the deciphered dynamic transaction data using the first portion of the LUK 814.

It should be noted that according to some embodiments, in addition to the transaction cryptogram 820, the decimalized transaction cryptogam 828 can also be used and generated in an integrated chip based transaction, and the decimalized transaction cryptogram 828 can be inserted into the track-2 equivalent data.

Figure 9:
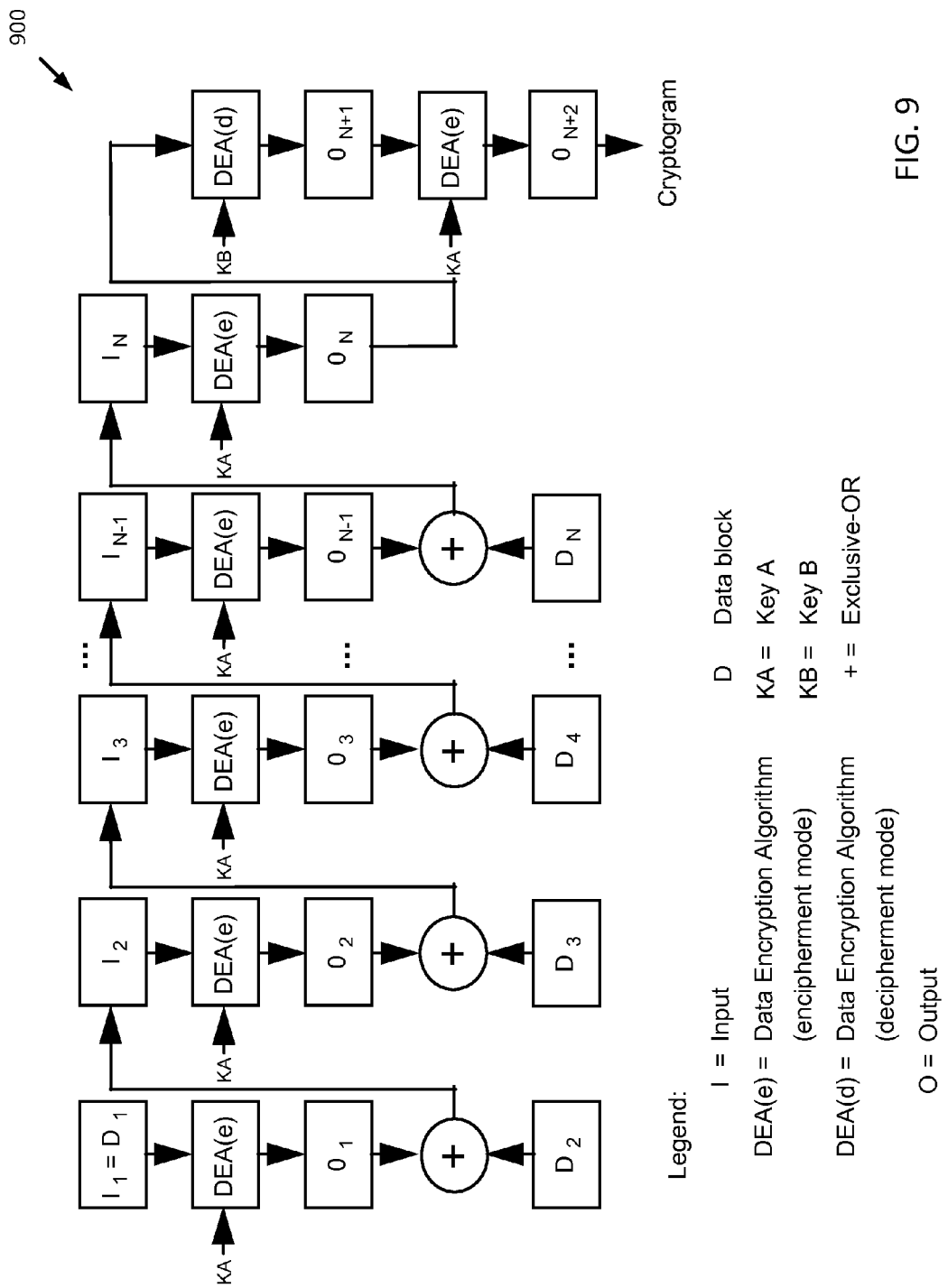
FIG. 9 illustrates an example of an encryption function, according to some embodiments.

FIG. 9 illustrates a block diagram of an example of encryption function 900, according to some embodiments. In some embodiments, encryption function 900 can be used as encryption function 818. For example, the data set that makes up the dynamic transaction data 816 may be concatenated together (e.g., in the order described above), and then divided into a set of data blocks $D_1$ to $D_N$ of equal length (e.g., 8-byte data blocks). If the dynamic transaction data 816 does not divide equally into the length of the data blocks, the missing least significant bits in the last data block $D_N$ can be zero filled. The first key KA may correspond to a first portion of the LUK 814 (e.g., most significant 8 bytes), and the second key KB may correspond to a second portion of the LUK 814 (e.g., least significant 8 bytes) An iterative enciphering process may be applied to the set of data blocks $D_1$ to $D_N$. The iterative enciphering process may include encrypting a first data block $D_1$ using key KA as the encryption key in a data encryption algorithm (DEA(e)). The result of the encryption is then exclusive-ORed with the next data block $D_2$. The result of the exclusive-OR operation is then used as the input for the next iteration of the enciphering process. The enciphering process continues until all data blocks $D_1$ to $D_N$ has been processed, and the output $I_N$ of the last exclusive-OR operation with the last data block $D_N$ is encrypted to form the output of the iterative enciphering process $O_N$. The output of the iterative enciphering process $O_N$ may then be deciphered using key KB as the decryption key in data decryption algorithm (DEA(d)). The output of the deciphering process $O_{N+1}$ is then re-enciphered using key KA as the encryption key in a data encryption algorithm (DEA(e)) to generate the output $O_{N+2}$. According to some embodiments, the output $O_{N+2}$ can be used as the transaction cryptogram 820.

It should be noted that in some embodiments, the encryption function 900 described with reference to FIG. 9 can be used to generate the authentication code that is used in the post-payment verification process and/or the account parameters replenishment process, for example, by applying the encryption function 900 over at least the transaction verification log stored on the portable communication device. In some embodiments, the encryption function 900 described with reference to FIG. 9 can also be used for any of the encryption functions 806, 812, 818, and/or 824.

VIII. Exemplary Methods

Figure 10:
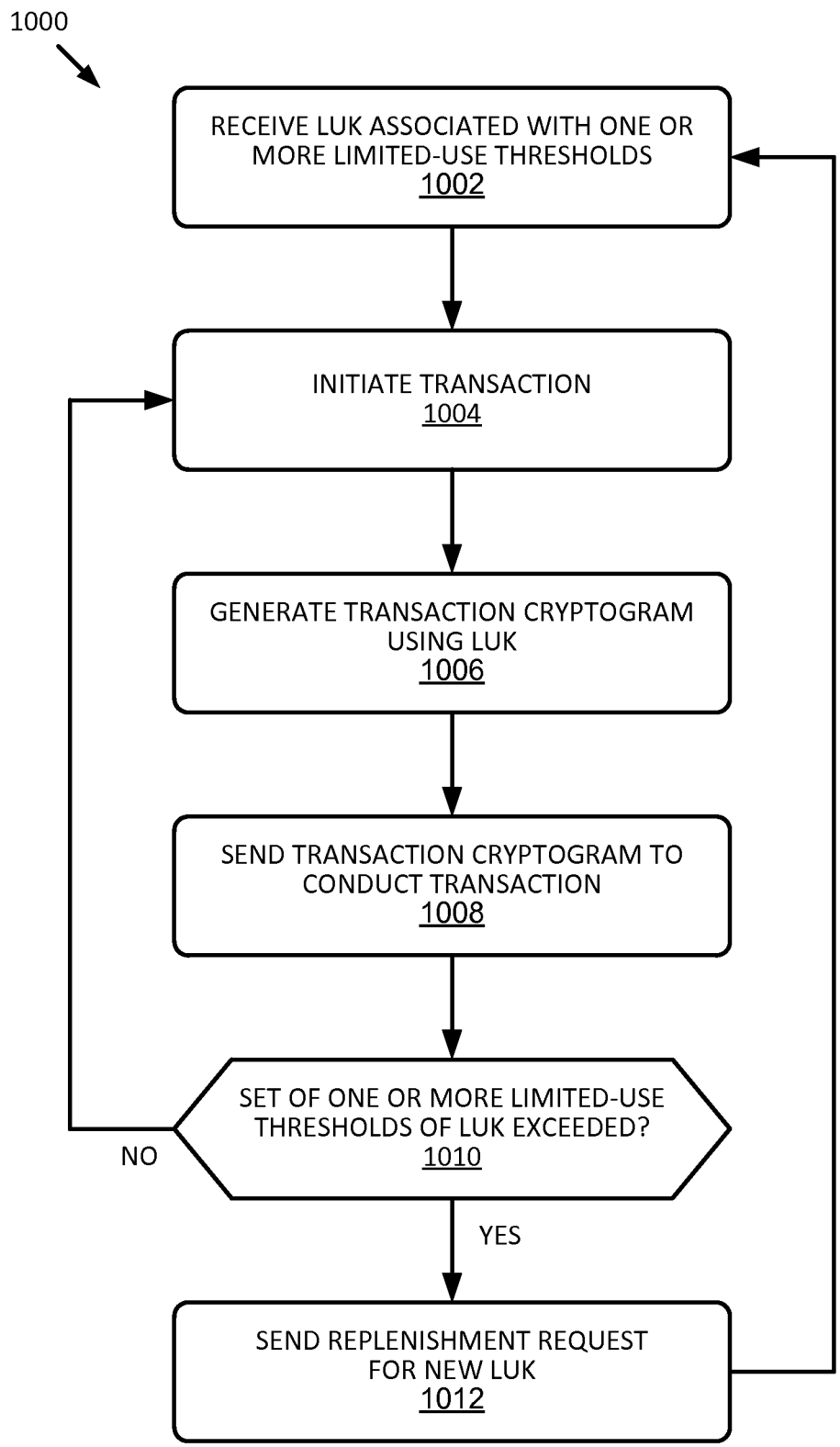
FIG. 10 illustrates a flow diagram of an example of a method for enhancing the security of a portable communication device, according to some embodiments.

FIG. 10 illustrates an exemplary flow diagram of a method 1000 for enhancing the security of a communication device (e.g., a portable communication device) when conducting a transaction using the communication device, according to some embodiments. Process 1000 can be performed, for example, by a mobile application executing on a portable communication device, and can be performed without using a secure element (although a secure element can be used in some embodiments).

At block 1002, a communication device may receive a limited-use key (LUK) that is associated with a set of one or more limited-use thresholds that limits the usage of the LUK. The LUK may be received from a remote computer (e.g., a remote computer associated with MAP, CBPP, or issuer/host system). In some embodiments, the set of one or more limited-use thresholds may include at least one of a time-to-live indicating a time duration that the LUK is valid for, a predetermined number of transactions that the LUK is valid for, and/or a cumulative transaction amount indicating the total transaction amount that the LUK is valid for. In some embodiments, the set of one or more limited-use thresholds may include an international usage threshold and a domestic usage threshold.

According to some embodiments, the communication device may also receive, with the LUK, a key index that includes information pertaining to generation of the LUK. For example, the key index may include time information indicating when the LUK is generated, a replenishment counter value indicating the number of times the LUK has been replenished, a pseudo-random number that is used as a seed to generate the LUK, a transaction counter value indicating the number of transactions that has been previously conducted by a mobile application of the communication device at the time the LUK is generated, and/or any combination thereof.

At block 1004, a transaction (e.g., a payment transaction, access transaction, or other transaction that is performed using an account) can be initiated, for example, by placing the communication device in proximity to a contactless reader of an access device such as a POS terminal. At block 1006, the communication device may generate a transaction cryptogram using the LUK. At block 1008, the communication device may send the transaction cryptogram to the access device to conduct the transaction. In some embodiments, the commination device may also send a token (e.g., a substitute for an account identifier) instead of a real account identifier to the access device to conduct the transaction. In some embodiments, process 1000 does not use a secure element to store the token or the LUK in the communication device. The transaction can be authorized based on at least whether usage of the LUK has exceeded the set of one or more limited-use thresholds and/or verification of the transaction cryptogram.

At block 1010, after conducting the transaction, process 1000 may determine if the set of one or more limited-use thresholds associated with the LUK has been exhausted or exceeded (or is about to be exhausted or exceeded). If it is determined that the set of one or more limited-use thresholds associated with the LUK has not been exhausted or exceeded (or is not about to be exhausted or exceeded), process 1000 may continue to block 1004 to conduct another transaction.

If it is determined that the set of one or more limited-use thresholds associated with the LUK has been exhausted or exceeded (or is not about to be exhausted or exceeded), the communication device may send a replenishment request for a new LUK to the remote computer at block 1012. The replenishment request may be sent in response determining that the set of one or more limited-use thresholds associated with the LUK has been exhausted, or in response to determining that a next transaction conducted with the LUK will exhaust the set of one or more limited-use thresholds. In some embodiments, the replenishment request may be sent in response to receiving a push message requesting the communication device to replenish the LUK The replenishment request may include transaction log information derived from a transaction log (e.g., a transaction verification log) stored on the communication device. In some embodiments, the transaction log stored on the communication device may include, for each transaction conducted using the LUK, a transaction timestamp indicating the time of the corresponding transaction, an application transaction counter value associated with the corresponding transaction, and/or a transaction type indicator indicating whether the corresponding transaction is a magnetic stripe based transaction or an integrated chip based transaction. In some embodiments, the transaction log information sent to the remote server may include an authentication code computed over at least the transaction log using the LUK. If the transaction log information in the replenishment request matches the transaction log information at the remote computer, process 1000 may continue to block 1002, and communication device may receive a new LUK and a new key index associated with the new LUK.

Figure 11:
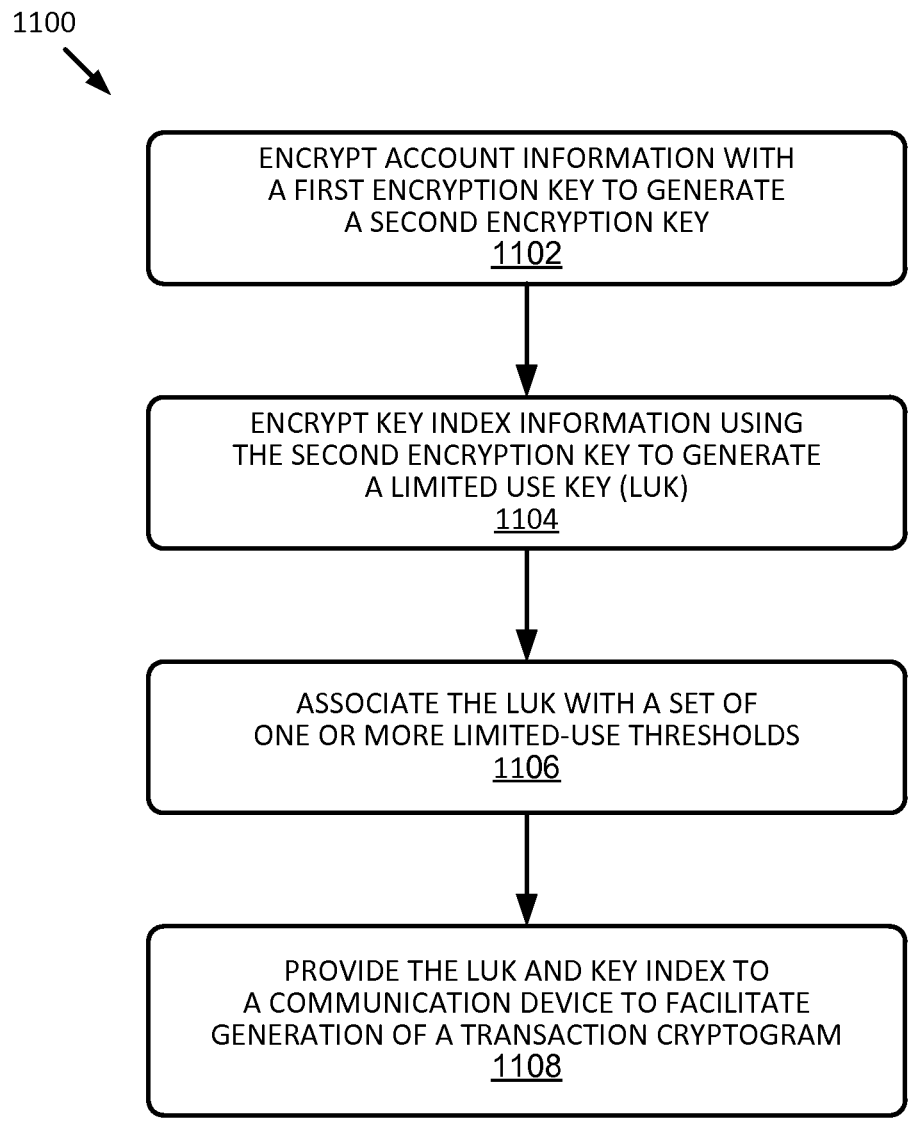
FIG. 11 illustrates a flow diagram of an example of another method for enhancing the security of a portable communication device, according to some embodiments.

FIG. 11 illustrates an exemplary flow diagram of a method 1100 for enhancing the security of a communication device when conducting a transaction using the communication device, according to some embodiments. Process 1100 can be performed, for example, by a computer associated with CBPP or issuer.

At block 1102, account information associated with an account is encrypted using a first encryption key to generate a second encryption key. In some embodiments, the account information may include an account identifier such as a PAN, an alternate account identifier such as an alternate PAN, or a token that is a substitute for an account identifier. In some embodiments, the first encryption key may be a master derivation key associated with the issuer of the account. According to some embodiments, encrypting the account information to generate the second encryption key may include encrypting the account information using the first encryption key to generate a first portion of the second encryption key, inverting the account information, and encrypting the inverted account information using the first encryption key to generate a second portion of the second encryption key. In some embodiments, the second encryption key may be a unique derivation key for the account At block 1104, key index information is encrypted using the second encryption key to generate a limited-use key (LUK). The key index information may include a key index having information pertaining to generation of the LUK. For example, the key index information may include a counter value indicating the number of times that the LUK has been renewed or replenished in a predetermined time period and/or time information indicating when the LUK is generated. In some embodiments, encrypting the key index information to generate the LUK may include padding the key index with a first value to generate a first padded key index information, and encrypting the first padded key index information to generate a first portion of the LUK. Encrypting the key index information to generate the LUK may also include padding the key index with a second value to generate a second padded key index information, and encrypting the second padded key index information to generate a second portion of the LUK.

At block 1106, process 1100 associates the LUK with a set of one or more limited-use thresholds that limits the usage of the LUK. At block 1108, the LUK and the key index are provided to a communication device (e.g., a portable communication device) to facilitate the generation of a transaction cryptogram for a transaction conducted using the communication device. The transaction may be authorized based on the LUK and the transaction cryptogram (e.g., whether usage of the LUK has exceeded the set of one or more limited-use thresholds and/or verification of the transaction cryptogram).

In some embodiments, when the transaction is an integrated chip based transaction, the transaction cryptogram may be generated by enciphering transaction information (e.g., dynamic transaction information such as terminal transaction data received from an access device during a transaction) using a first portion of the LUK, deciphering the enciphered transaction information using a second portion of the LUK, and re-enciphering the deciphered transaction information using the first portion of the LUK.

When the transaction is a magnetic stripe based transaction, the transaction cryptogram may be generated by encrypting a predetermined numeric string using the LUK, and decimalizing the encrypted predetermined numeric string. In some embodiments, decimalizing the encrypted predetermined numeric string may include extracting numeric digits from the encrypted predetermined numeric string to form a first data block, extracting hexadecimal digits from the encrypted predetermined numeric string and converting each extracted hexadecimal digit into a numeric digit to form a second data block, and concatenating the first data block and the second data block to form the transaction cryptogram. The transaction cryptogram and/or the key index can be embedded in track-2 equivalent data of an authorization request message.

IX. Cloud-Based Payments Platform (CBPP)

This section describes additional details of some of the functionalities that can be performed by the cloud-based payments platform (CBPP) (e.g., CBPP 180). In some embodiments, these functionalities may include key management, active account management and account parameters replenishment, payment and payment transaction processing, verification for payment, provisioning, lifecycle management, and post-payment verification. Communications between CBPP and mobile application platform (MAP) can be established using secure channels such as those adhering to transport level security (TLS) protocol, time bound secure sockets layer (SSL) protocol, or hypertext transfer protocol secure (HTTPS) protocol. Communications between CBPP and the issuer/host system can be established using secure channels adhering to the security requirements of issuer.

Key Management

The issuer of an account may use a dedicated set of keys (e.g., MDKs) per bank identification number (BIN) range or per primary account number (PAN) range for cloud-based payment transactions in order to avoid situations where the same keys are used for both secure element based and cloud-based transactions. A MDK can be used as a base key to generate the LUKs that are provided to a portable communication device. In some embodiments, CBPP may provide its own set of issuer MDK keys (specific for the cloud-based environment) which are stored in its own hardware security modules. In some embodiments, instead of using its own set of MDKs to generate LUKs, CBPP may make calls to the issuer/host system to retrieve LUKs stored in hardware security modules of the issuer/host system.

Active Account Management and Account Parameter Replenishment

The cloud-based payments techniques described herein do not require the use of a secure element to securely store data such as a unique derived key (UDK). As such, the portable communication device may not have access to all the capabilities associated with a secure element, such as the capability to generate application cryptogram (AC) for transactions using only securely stored information. In order to mitigate the risk of account parameters being compromised, limited-use account parameters can be generated by CBPP periodically and replenished in the mobile application of the portable communication device as well as refreshed in the issuer/host system in order to maintain the account in the active state.

For the active account management process to be initiated, CBPP may receive a request for account parameters generation from MAP or the issuer/host system. For example, MAP may request a new set of account parameters such as a limited-use key and associated key index from CBPP in response to a request for account parameters data update from the mobile application. As another example, the issuer/host system may check, during transaction processing, if the current set of account parameters is still valid (e.g., being used within its limited-use thresholds such as the number of allowed transactions, the time-to-live, etc.). In case the threshold for a given risk setting gets exceeded, the issuer/host system may alert CBPP that a new set of account parameters is to be updated in the mobile application.

In response to a request, CBPP may generate a set of account related data. The account related data may include semi-static account information and dynamic account parameters that changes with each replenishment such as a LUK that may be used by the mobile application to generate a transaction cryptogram (e.g., an application cryptogram (AC)) when the portable communication device is presented to contactless reader of access device. The account parameters may be account specific (e.g., different account parameters for different accounts of the user), portable communication device specific (e.g., different account parameters for different portable communication devices of the user, even when the underlying account is the same), and/or mobile application specific (e.g., different account parameters for different mobile applications, even when the different mobile applications are within the same portable communication device).

The set of account related data may also include risk management parameters (e.g., limited-use thresholds such as number of consecutive transactions allowed and time-to-live) that will indicate to issuer/host system how it is supposed to use the transaction data. The risk parameters may be account specific (e.g., all cloud-based transactions conducted with an account are consolidated for assessment of risk parameters), portable communication device specific (e.g., all cloud-based transactions conducted with a particular portable communication device are consolidated for assessment of risk parameters), mobile application specific (e.g., all cloud-based transactions conducted via a particular mobile application are consolidated for assessment of risk parameters), and/or account parameters specific (e.g., each set of account parameters has its own set of risk parameters).

In some embodiments, the issuer/host system may implement its own set of risk limits or limited-use thresholds that is applied per account to have a consolidate view of all transactions performed on the account, because the same account can be provisioned in different mobile applications which may have their own risk limits, while all transactions conducted by the different mobile applications using that account may be authorized by the same issuer/host system. The risk management parameters can be pre-defined in both the mobile application and the issuer/host system, or can be managed separately by other systems, so that CBPP may not need to generate them. The set of account related data may also include device threshold management parameters that are used to trigger the update of account parameters in the mobile application as well as to update risk management parameters the in issuer/host system when possible.

The mobile application may store or receive from the cloud a number of risk management parameters (e.g., limited-use thresholds) that trigger the update of the current set of account parameters. When account parameters are close to the point when they become out of date (e.g., when it is that a next transaction conducted with the LUK will exhaust the set of one or more limited-use thresholds), the mobile application may request an update from CBPP via MAP to replenish account parameters. The device threshold management parameters monitored by the mobile application may include, for example, a number of transactions with a given set of account parameters that can be performed before the account parameters need to be updated (e.g., five transactions). Mobile application may send an alert to the mobile wallet platform before this limit gets exceeded in order to let portable communication device be used for one or more transactions before they start to get declined (e.g., the alert can be sent after four transactions to allow portable communication device to be used for one more transaction). Hence, if the account parameters are valid for a predefined number of transactions in the CBPP risk management parameters, then the number of transactions for the on-device threshold management parameters managed by mobile application can be configured with a threshold lower than the value in CBPP to trigger replenishment.

The device threshold management parameters may also include a time-to-live for a given set of account parameters before they need to be updated (e.g., five days). Mobile application 114 can notify the mobile wallet platform before this limit gets depleted in order to request a new set of account parameters (e.g., after four days). Hence, if account parameters have an expiration time in the CBPP, then the value of the time-to-live for on device threshold management parameters managed by mobile application can be configured with a threshold before that specified time in the CBPP to trigger replenishment. In some embodiments, the device threshold management parameters may also include but not limited to: a use transaction amount for the mobile application to make a decision whether account parameters should be updated or not (e.g., smaller transaction amounts may not require an immediate update of the account parameters); a cumulative transaction amount as the trigger for account parameters update based on the sum of individual transaction amounts; and/or a domestic versus international risk settings in order to trigger updates for international transactions more often in case they are considered more risky.

Since the account parameters are intended for limited use, additional risk management parameters specific to the cloud-based environment may be implemented and performed by the issuer/host system. These risk management parameters can either be provided to the issuer/host system by CBPP during active account management process, or they can be defined and managed separately. For example, the issuer/host system may verify that the current set of account parameters (e.g., LUK and associated key index) can be used for only a limited number of times (e.g., five times) before the issuer/host system raises an alert to request CBPP to generate a new set of account parameters to be replenished in the mobile application. The issuer/host system may also check that the current set of account parameters can only be used for a limited period of time (e.g., five days) before a new set of account parameters need to be generated by CBPP and sent to the mobile application.

Additional risk management parameters checks such as individual transaction amounts and cumulative total transaction amounts can also be performed by the issuer/host system. For example, smaller transaction amounts may not require an immediate update of the account parameters while high value transactions may require updates more often. As another example, when the cumulative total transaction amount based on the sum of individual transaction amounts gets exceeded, issuer/host system may notify CBPP that a new set of account parameters needs to be generated and replenished in mobile application. Domestic versus international risk settings may also be checked to trigger updates for international transactions more often in case they are considered more risky.

After CBPP receives a request for account parameters to be updated from either the MAP or the issuer/host system, CBPP can proceed with data generation for a given account. CBPP may use its own set of issuer MDK keys (specific for cloud-based environment) which it stores in its own hardware security modules and generate the LUK derived from the MDK using a newly generated key index, or CBPP may retrieve LUKs derived from the MDK using the newly generated key index from issuer/host system's hardware security modules.

After generating or otherwise retrieving the new set of account parameters, CBPP may send the account parameters to the entities that have requested it. MAP may receive the new set of account parameters and device threshold management parameters, and further send it to the mobile application. In some embodiments, the set of risk parameters or limited-use thresholds for a given account may change over time, and the new set of account parameters may have different thresholds than the previous set of account parameters. The threshold limits may change, for example, based on consumer spending habits, or if the consumer is travelling abroad. The issuer/host system may also receive the new set of account parameters from CBPP. In some embodiments, CBPP may be disconnected from the issuer/host system or may not be real-time connected. In this case, the issuer/host system may use a time stamp in the authorization message to determine when the data has been generated. In particular, the key index may be generated to contain the notion of the date when the account parameters were generated.

After MAP and the issuer/host system receive the new set of account parameters and device threshold management parameters from CBPP, they may perform certain actions. MAP may deliver and apply the new set of account parameters to the mobile application over a communication network. After the set of account parameters gets replenished in the mobile application, the old set of set of account parameters becomes obsolete and can be deleted from the mobile application. If MAP is unable to communicate to the mobile application immediately, it may keep trying to do so until communication to the mobile application is established; otherwise the issuer/host system may start declining transactions that are performed with the old set of account parameters from that point of time. In some embodiments, MAP may receive a confirmation from the mobile application that the account parameters have been updated in order to notify the issuer/host system to start using the new set of account parameters. The issuer/host system may also update risk management parameters for a given set of account parameters as soon as it gets an update. In case the issuer/host system received an update from CBPP directly real-time or with a certain delay, it may refresh risk management parameters for the new set of account parameters, for example, if the issuer/host system receives a confirmation form CBPP that the new set of data has been successfully applied to the mobile application. In case the issuer/host system doesn't receive an update directly from CBPP, the issuer/host system may receive the new set of account parameters in the first transaction conducted with portable communication device after the update. At that moment, the processing authorization system may activate the new risk management parameters for the new set of account parameters and apply a different policy or obsolete the old set of account parameters.

The issuer/host system may operate in sync with CBPP and consequently with MAP to ensure that the transaction data processing process is synchronized with the account parameters generation process. The data generation system and data host processing system may also use algorithms, time stamps and other mechanisms to ensure that the data in the issuer/host system and the mobile application are consistent, up to date, and abide by the same risk model.

Payment and Payment Transaction Processing

When the payment transaction is initiated at an access device and then processed by the processing authorization system, the mobile application and the issuer/host system may take additional actions to process the cloud-based transaction. When the payment transaction occurs, and the portable communication device and contactless reader exchange data, the mobile application may use the LUK or together with it associated key index stored in the mobile application to generate a transaction cryptogram (e.g., an application cryptogram (AC)). From the reader perspective, the transaction may look like a regular contactless transaction. For an integrated chip based transaction, the access device map provide an unpredictable number (UN) that is used for the transaction cryptogram generation. For a magnetic stripe based transaction, the transaction cryptogram may be generated by the mobile application without using input from access device. In some embodiments, a dynamic card verification value (dCVV) may be omitted.

After the mobile application sends the transaction cryptogram and other transaction data to the access device, the mobile application may check that the account parameters are still valid by checking the on-device threshold management parameters (e.g., on-device limited-use thresholds). The mobile application may alert MAP when the device threshold management parameters are exceeded and request a new set of account parameters from CBPP. The mobile application may check that even if the account parameters have not been updated in the mobile application, that the old set of account parameters can still be used in subsequent transactions in order to let the issuer/host system makes the authorization and risk decision.

After the interaction between the mobile application and the access device takes place, the transaction data is passed by the merchant and acquirer to the issuer/host system. When the issuer/host system receives the transaction data in the authorization request message, the issuer/host system may validate the transaction cryptogram and other transaction data, convert an alternate account identifier or token assigned into a real account identifier (e.g., a real PAN) if necessary, perform risk parameter checks, and verify the account is in a good standing. The issuer/host system may verify that the data in particular the transaction cryptogram and key index are still valid for a given account by checking risk management parameters. CBPP may be alerted when risk management parameters are exceeded and request a new set of account parameters from CBPP to be replenished in mobile application via the MAP. Even if the account parameters have not been updated in the mobile application, the issuer/host system may verify that the old set of account parameters can still be used in the subsequent transactions in case the issuer believes that this risk is acceptable for a given account, BIN or PAN range or specific transaction environment (e.g., domestic vs. international).

Although the account parameters may have been exceeded from the point of view of the issuer/host system because they haven't been updated in the mobile application, the issuer/host system may allow the transaction and provide some level of tolerance. CBPP may be notified that the issuer/host system may start declining further transactions if the account parameters are not updated in mobile application. Thresholds are set for each of the risk management parameters in the issuer/host system such as the number of transactions and time to live that would allow CBPP to be notified in advance before the actual risk management parameters are exceeded. This may give additional time to CBPP to generate a new set of account parameters and let MAP to replenish the account parameters in mobile application.

Verification for Payment

To conduct a transaction, the consumer may activate the portable communication device before presenting portable communication device to contactless reader in order to proceed with the transaction. In some embodiments, activation of the portable communication device may involve the consumer entering input for a consumer device cardholder verification method (CDCVM) on the user interface of the portable communication device. Depending on the mobile application configuration, the CDCVM may be at the device level (e.g., screen lock) or at the mobile application level (e.g., application password/passcode). The mobile application may be set up to use a CDCVM on every transaction, or on every transaction greater than a certain transaction amount. If the mobile application is configured to use the CDCVM, the consumer may be prompted to enter an input corresponding to the CDCVM for authentication before or during the mobile payment transaction. If a CDCVM is used on a transaction and the CDCVM was obtained before presentment of the portable communication device to contactless reader, the transaction may proceed to completion. If a CDCVM is used on a transaction and the CDCVM was not obtained before presentment of the portable communication device to the contactless reader, the transaction process may depend upon the merchant access device version.

CBPP may provide a set of functions where issuer can set the CDCVM, and this CDCVM configuration information (e.g., screen lock, passcode, etc.) is provisioned to the mobile application. CBPP may support the issuer CDCVM requirements, and allow the issuer to configure the CDCVM data in the provisioning data. In some embodiments, the issuer/host system may determine if an input corresponding to a CDCVM was entered. Where an input corresponding to a CDCVM is captured by the device, the result can be passed to the issuer/host system in the authorization message for transaction processing.

Provisioning

CBPP may provide a set of provisioning functions that allow cloud-based account data to be sent to MAP. CBPP may manage the data per cloud-based account and ensure the data is sent to MAP per request. CBPP may perform data preparation before sending to MAP, and support a provision function where an issuer could initiate a request to replenish or update the cloud-based account data. CBPP may provide a provisioning function to provision account parameters data to MAP per account holder, and prepare and package the data before sending to MAP. For example, CBPP may provide a function to provision the semi-static data portion (e.g., account identifier or token) and the dynamic data portion (e.g., LUK and key index) to MAP. CBPP may maintain a state machine per account and provide push or pull functionality to/from MAP for initiating a provisioning/replenishment request. CBPP may provide a replenishment function to provision account parameter data to MAP per account holder. CBPP may provide a provisioning/replenishment functionality with push features from the issuer. CBPP may provide provisioning/replenishment functionality that supports a single account which could be initiated by MAP or the issuer/host system. In some embodiments, CBPP may provide updated account parameters as part of a provisioning/replenishment request only if invoked by the mobile application.

Life Cycle Management

Lifecycle management is a set of functions which perform account lifecycle events. CBPP may receive and process lifecycle event messages from MAP or from the issuer/host system. For some cases, the lifecycle request can be initiated by the consumer as in the case of deleting an account from the mobile application or blocking an account from the issuer to handle fraud activity. CBPP 180 may perform lifecycle management functions per account, and provide account lifecycle events such as adding, deleting, suspending, and resuming suspended accounts. In some embodiments, account lifecycle events may include replacing or blocking accounts, and/or managing lost or stolen accounts. CBPP may provide an interface for MAP and/or the issuer/host system to perform a lifecycle update of a consumer account. The query may trigger provisioning or replenishment of new account parameters. In some embodiments, CBPP may act on the lifecycle events such as deleting or suspending accounts upon such a request immediately. CBPP may provide notification of all lifecycle events to impacted systems, such as the issuer/host system and MAP.

Post-Payment Processing

Post payment verification may mitigate the risk against counterfeit account parameters. It may also reduce the exposure on account parameters stored on the portable communication device, e.g. the issuer/host system can perform periodic verification, which limits the exposure associated with account parameters stored on the portable communication device. CBPP may define a protocol to exchange post payment verification messages. The post payment verification protocol may be based on real time interfaces and may follow transport level security (TLS). Either issuer/host system and/or CBPP can trigger the post payment verification message exchange. CBPP may provide options for issuers to configure the post payment verification parameters, which triggers the post payment verification message exchange with CBPP. For example, an issuer may configure the parameters such that CBPP triggers the post payment verification on transactions above a threshold (e.g., $100). Issuer may configure the parameters such that CBPP triggers the post payment verification on every renewal of account parameters or after a number of renewals (e.g. after five renewals). In some embodiments, an issuer may configure the parameters such that the issuer/host system initiates the post payment verification. In this case, CBPP facilitates messages exchange between the issuer/host system and the mobile application.

In some embodiments, CBPP may refrain from taking any action based on the results of verification, and may instead informs the issuer/host system about suspicious activity. The issuer/host system may decide an appropriate action based on their process and risk profile of the account. CBPP may support post-payment processing handling using a transaction verification log to verify whether the appropriate device made a payment. CBPP may support post-payment processing handling using the transaction verification log to verify whether the appropriate device is initiating the request for account parameters replenishment, e.g., by verifying that the transaction log for a given set of account parameters stored on the portable communication device matches the transactions at the issuer/host system. CBPP may provide options to configure thresholds to triggers post payment verification messages from CBPP. CBPP may take life cycle management action based on the results of post payment verification. If verification fails, then CBPP may inform the issuer/host system about the suspicious activity. CBPP may provide additional information, such as location information about a transaction or unique device identifiers, in the transaction verification log.

X. Mobile Application Platform (MAP)

This section describes additional details of some of the functionalities that can be performed by the mobile application platform (MAP) (e.g., MAP 170). According to some embodiments, MAP may manage the mobile application and intermediate communications between CBPP and the mobile application. MAP may support cloud-based payment interactions such as enrolling into a cloud-based payment service, provisioning cloud-based payment accounts, active account management (i.e., account parameter replenishment, account lifecycle management, and post payment transaction verification log requests. MAP and CBPP may communicate using a secure transport channel such as time bound SSL or HTTPS. MAP and CBPP may exchange secure web service message by using Web Services Security (WSS).

To communicate with the mobile application, MAP may authenticate the user, the portable communication device, and/or the mobile application using single or multifactor authentication to establish a secure channel between the mobile application and MAP. In support of this, MAP may establish an account with the consumer with a unique username and password. The password can be stored and verified by MAP. The consumer can create their mobile application credential (username/password) via the enrollment process. In some embodiments, this username and password may be different or the same as the portable communication device verification or CDCVM.

Enrollment and Account Provisioning

MAP may forward account and consumer enrollment data received from the mobile application to CBPP or the issuer/host system for validating enrollment requests and performing issuer defined identification and verification processes. The issuer may be involved in the enrollment process (e.g., the issuer makes the accept/decline enrollment decision or delegates the decision to a third party under pre-defined conditions). In both cases, the issuer may be in control of the criteria and specifically defines account verification methods and the consumer authentication methods. MAP may support the receipt of an enrollment request and associated enrollment data from the mobile application.

MAP may route the enrollment request and associated data to CBPP and/or the issuer/host system. Upon successful enrollment, MAP may initiate a provisioning request with CBPP. If provisioning is successful by CBPP, MAP may receive the data from CBPP to configure the new cloud-based payment account in the mobile application. MAP may receive a provisioning confirmation or failure notification from the mobile application. MAP may route the confirmation or failure notification from the mobile application to CBPP and/or the issuer/host system. If provisioning is not successful by CBPP, MAP may receive an enrollment failure notification from CBPP, and MAP may route the provisioning failure notification to the mobile application. The mobile application may display an appropriate message to the consumer.

Active Account Management

In order to mitigate the risk of the account parameters being compromised, account parameters are periodically generated by CBPP (or by the issuer/host system) and replenished in the mobile application as well as refreshed in the issuer/host system in order to maintain the account in the active state. For the active account management process to be initiated, CBPP may receive a replenishment request for new account parameters from the mobile application through MAP. CBPP may also act upon a replenishment request received from the issuer/host system. MAP acts as a broker and routes the communications to and from the mobile application and to and from CBPP for active account management interactions.

In a pull implementation, MAP receives an account parameter replenishment request from the mobile application. Before initiating the request message exchange from the mobile application, MAP may establish a secure communication channel. After receiving the replenishment request, MAP forwards the replenishment request message to CBPP. After processing the replenishment request, CBPP sends new account parameters to MAP, which then forwards them to the mobile application. If necessary, MAP may re-establish a secure connection with mobile application. If MAP is not successful in sending the account parameters replenishment response from CBPP to the mobile application after a pre-determined number of attempts in a time window, MAP may notify CBPP that the account parameter replenishment delivery attempt was not successful.

In a push implementation, CBPP (or the issuer/host system) initiates the process to update the account parameters. CBPP sends a push message to MAP to initiate the replenishment push. MAP then sends the push message to the mobile application. The mobile application then generates the account parameter replenishment request per the pull flow described above. Before initiating the exchange of sensitive information, MAP may perform user, portable communication device, and/or application level authentication per security requirements. If MAP is not successful in sending the account parameters replenishment response from CBPP to the mobile application after a pre-determined number of attempts in a specified time window, MAP may notify CBPP that the account parameter replenishment attempt was not successful.

Upon the mobile application receiving and processing the new set of account parameters from either the push or pull implementations, mobile application may generate a status or confirmation notification to MAP, which then forwards the status or confirmation notification to CBPP.

Lifecycle Management

When a consumer initiates account deletion, MAP may facilitate a delete message exchange from the mobile application to CBPP and the issuer/host system. MAP may delete the account data associated with the account from its database, and forward the delete message from the mobile application to the CBPP.

When an issuer initiates account deletion, MAP may facilitate a delete message exchange from CBPP or the issuer/host system to the mobile application. The issuer/host system may send a delete request to CBPP or to MAP. MAP may forward the delete message from the issuer/host system or CBPP to mobile application. MAP may send an acknowledgement to CBPP or the issuer/host system after receiving the acknowledgment from mobile application. MAP may ensure that account delete request is sent to the appropriate mobile application installed on the appropriate portable communication device. MAP may delete the data associated with the deleted account from its records to ensure that the previously provisioned account for the particular consumer's mobile application profile is no longer an active cloud-based payments account.

When the issuer/host system or CBPP initiates account suspension, MAP may facilitate a suspend message exchange from CBPP or the issuer/host system to mobile application. The issuer/host system may send a suspend request to CBPP or to MAP. MAP may forward the suspend message from the issuer/host system or CBPP to mobile application. MAP may send an acknowledgement to CBPP or the issuer/host system after receiving the acknowledgment from the mobile application. MAP may ensure that account suspend request is sent to the appropriate mobile application installed on the appropriate portable communication device.

When the issuer/host system or CBPP initiates account resumption, MAP may facilitate a resume message exchange from CBPP or the issuer/host system to the mobile application. The issuer/host system may send a resume request to CBPP or directly to MAP. MAP may forward the resume message from the issuer/host system or CBPP to the mobile application. MAP may send an acknowledgement to CBPP or the issuer/host system after receiving the acknowledgment from the mobile application. MAP may ensure that an account resume request is sent to the appropriate mobile application installed on the appropriate portable communication device.

Post-Payment Processing

Post payment interactions can help issuers mitigate the risk of account parameters being compromised and hence can help limit the exposure of the account parameters stored on the portable communication device. MAP may support the receipt of information that gets captured from the on-device transaction verification log (e.g., corresponding to a particular the key index) for the purposes of ensuring the veracity of account parameters replenishment requests. The issuer/host system working in conjunction with CBPP has the option of initiating a request, through MAP, for transaction verification log data captured and stored by the mobile application. The mobile application may respond, via MAP, to the request with the requested transaction verification log data. This data can then be verified by the issuer/host system in order to confirm if a particular transaction was originated by the queried portable communication device. Examples of the data elements that may be used for this purpose may include, for each transaction conducted using the set of account parameters, the transaction time (e.g., contactless interaction time), application transaction counter (ATC) that counts the number of transactions conducted from mobile application, transaction amount, and/or terminal unpredictable number (UN) received from the access device during the transaction.

For the purposes of using transaction verification log to ascertain whether a transaction was conducted from a certain portable communication device, MAP may receive a request for mobile application transaction verification log data from the CBPP originated by the issuer/host system. For the purposes of using the transaction verification log to provide a degree of assurance to CBPP that the request is originating from the appropriate portable communication device, MAP may use information provided from the transaction verification log in account parameter replenishment requests from the mobile application. MAP may identify and authenticate the portable communication device before transmitting or receiving post payment interaction messages to and from the mobile application.

XI. Mobile Application

Figure 12:
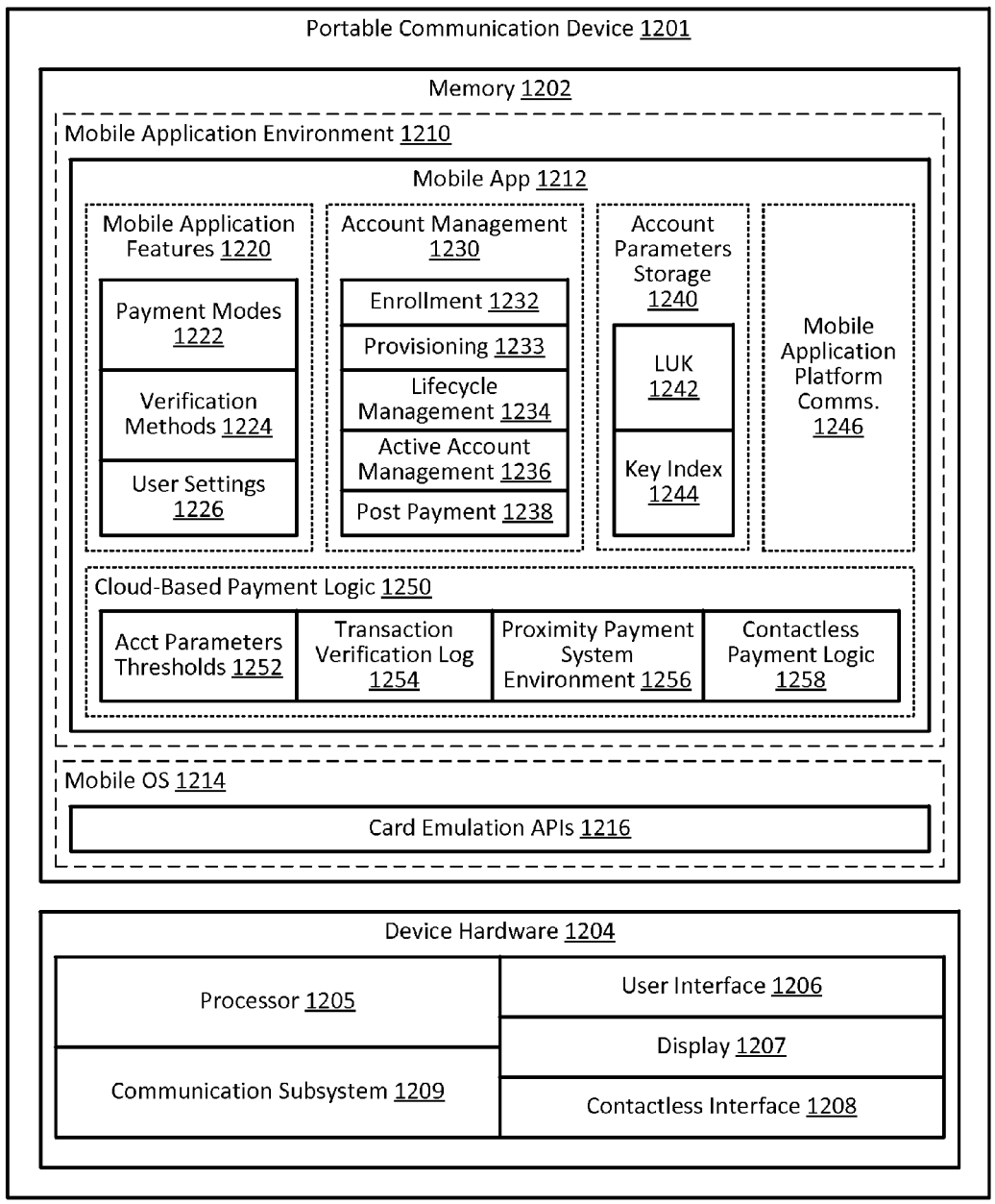
FIG. 12 illustrates a block diagram of an example of a portable communication device, according to some embodiments.

This section describes additional details of some of the functionalities that can be performed by the portable communication device and the mobile application installed on the portable communication device used to conduct cloud-based transactions. FIG. 12 illustrates a detailed block diagram of a portable communication device 1201, according to some embodiments. Portable communication device

1201 may include device hardware 1204 and memory 1202. Device hardware 1204 may include a processor 1205, a communications subsystem 1209, a use interface 1206, a display 1207 (which may be part of user interface 1206), and a contactless interface 1208. Processor 1205 can be implemented as one or more integrated circuits (e.g., one or more single core or multicore microprocessors and/or microcontrollers), and is used to control the operation of portable communication device 1201. Processor 1205 can execute a variety of programs in response to program code or computer-readable code stored in memory 1202, and can maintain multiple concurrently executing programs or processes. Communications subsystem 1209 may include one or more RF transceivers and/or connectors that can be used by portable communication device 1201 to connect with external networks (e.g., communication network 192) and communicate with other devices. User interface 1206 can include any combination of input and output elements to allow a user to interact with and invoke the functionalities of portable communication device 1201. In some embodiments, display 1207 may be part of user interface 1206.

Contactless interface 1208 may include one or more RF transceivers to interact with a contactless reader of an access device. In secure element based implementations, only the secure element may have access to contactless interface 1208. In the cloud-based payments techniques described herein, contactless interface 1208 can be accessed by the mobile OS 1214 without requiring the user of a secure element. In some embodiments, display 1207 can also be part of contactless interface 1208, and is used, for example, to perform transactions using QR codes, bar codes, etc.

Memory 1202 can be implemented using any combination of any number of non-volatile memories (e.g., flash memory) and volatile memories (e.g., DRAM, SRAM), or any other non-transitory storage medium, or a combination thereof media. Memory 202 may store a mobile OS 1214 and a mobile application environment 1210 where one or more mobile applications reside including mobile application 1212 (e.g., a mobile wallet application, mobile payment application, etc.) to be executed by processor 1205. Mobile OS 1214 may implement a set of card emulation APIs 1216 that can be invoked by mobile application 1212 to access contactless interface 208 to interact with an access device.

For cloud-based payments implementations, the payment system environment (e.g., PPSE) and mobile payment application functionalities are consolidated into mobile application 1212, whereas secure element based implementations may provide some or all of these functionalities from a secure element. Mobile application 1212 may include cloud-based payments logic 1250. Cloud-based payments logic 1250 may include contactless payment logic 1258, proximity payment system environment (PPSE) logic 1256, transaction verification log 1254, and account parameters thresholds 1252 (e.g., set of one or more limited-use thresholds associated with LUK 1242). Contactless payment logic 1258 may include functionalities that enable contactless communications to carried out to conduct a contactless transaction with a contactless reader of an access device. PPSE logic 1256 is used to inform the access device which payment product is available on mobile application 1212. The access device then uses this information to select the payment account to initiate a contactless transaction. Transaction verification log 1254 can be used for post-payment support. Mobile application 1212 may maintain transaction verification log 1254 (can be hidden from the consumer) retaining transaction details for transactions initiated from mobile application 1212. Mobile application 1212 may also use the transaction verification log 1254 to support active account management processes and post payment interactions. Account parameters thresholds 1252 (e.g., limited-user thresholds) are initially configured and can potentially be updated with different thresholds to inform mobile application 1212 when to initiate a request for updated account parameters (e.g., time-to-live, number of transactions, cumulative transaction amount, etc.).

Mobile application 1212 may also include account parameter storage 1240 and mobile application platform (MAP) communications logic 1246. Account parameter storage 1240 stores the account parameters (e.g., account identifier or alternate account identifier or token, LUK 1242, key index 1244, etc.) that are used to initiate a cloud-based payment transaction. MAP communications logic 1246 is used to enable secure communications with a mobile application platform (MAP) in order to request, send, and receive information to manage a user's cloud-based payment accounts. This may include logic to consume and process information for account management logic 1230.

Account management logic 1230 includes logic to process information for the cloud-based payments services such as enrollment logic 1232, provisioning logic 1233, active account management logic 1236, lifecycle management logic 1234, and post payment interactions logic 1238. Enrollment logic 1232 includes logic for a consumer to initiate the enrollment of an account to the cloud-based payment service. Provisioning logic 1233 includes logic to process the issuer data to configure the account into mobile application 1212, including the provisioning of the initial account parameters. Active account management logic 1236 can be used to initiate a request with MAP to update the account parameters when account parameter thresholds have been exceeded. Lifecycle management logic 1234 may include logic to initiate and process account lifecycle events such as consumer initiated delete, issuer-initiated delete, issuer-initiated suspend, and/or issuer-initiated resume, etc. Post payment interactions logic 1238 is used to support payment verification. Post payment interactions logic 1238 may include logic to receive and respond to requests from MAP for transaction verification log 1254. Post payment interactions logic 238 can also be used to support account parameters replenishment, and may include logic to extract required information from transaction verification log 1254 to send to MAP as part of an account parameter replenishment request.

Mobile application 1212 may also include mobile application features 1220. Mobile application features 1220 may include consumer verification methods (CVM) logic 1224, payment modes 1222, and user settings 1226. CVM logic 1224 may include logic required to confirm a mobile application passcode or on-device verification method (e.g., screen lock), or other verification information method supported by mobile application 1212. Payment modes 1222 may include logic to support various ways of setting up mobile application 1212 and portable communication device 1201 to be ready to initiate a transaction, and may include support for Manual Mode and/or Always-On Mode.

Manual Mode is a state where mobile application 1212 is configured to be accessible for making a payment after the consumer has explicitly chosen to (1) open mobile application 1212, (2) entered user input for a consumer verification method if required, and (3) selected an account to make a contactless payment transaction and for a single transaction or limited time. For Manual Mode, a decision can be made whether a consumer device cardholder verification method (CDCVM) will be required prior to making payment. If a CDCVM is used, then the two-tap scenario for high-value transactions may not be necessary. Conversely, to reduce barriers to use, if an issuer decides to opt for not asking for a CDCVM in Manual Mode, then the consumer will be able to conduct transactions once the conditions for Manual Mode operation are met. In this latter scenario, mobile application 1212 may support entry of CDCVM if a CDCVM is requested during a high value payment.

Always-On Mode is a state where an account on portable communication device 1212 (a default account) is intended to be continuously accessible to a contactless reader. A portable communication device with an account set in this state allows a consumer to initiate a contactless payment transaction by the presentation of the portable communication device to a contactless reader. Always-On Mode may also support device verification (referred to below Always-On with On-Device Verification Mode). This setting allows for additional security. For example, the user may have to unlock the portable communication device's user interface or display screen before mobile application 1212 responds to a contactless reader attempting to initiate payment transaction.

Mobile Application Security

To provide additional security, mobile application 1212 may obfuscate and protect stored keys by an accepted mechanism, such as key wrapping. Code and data in the mobile application 1212 may be obfuscated in order to protect the code against reverse engineering. Communications between mobile application 1212 and MAP that contain sensitive information can be exchanged after the channel has been secured by MAP (e.g. using TLS). Mobile application 1212 may adhere to appropriate industry standards; such as FIPS-140-2. Error codes sent to the OS logging framework may disclose only information that will not be of aid to an attacker. Event logs and debugging information may avoid exposing directly or indirectly any credentials. Logged information can also be encrypted. Mobile application 1212 and MAP may provide mechanisms to detect, resist, and report if the portable communication device is in debug mode. Device state including jail breaking, rooting, malware, mobile application runtime integrity, etc. can be checked prior to personalization and provisioning of mobile application 1212, and when a new account parameter are sent to mobile application 1212. If any compromises are detected, mobile application 1212 can be deactivated, and the deactivation reason relayed back to MAP. The mobile application security capabilities can be inherently built in mobile application 1212, and dependencies on the portable communication device and OS platform security capabilities can be minimized. For a rooted or stolen device to gain access, device fingerprinting and tools that support device analysis and attestation can be used.

In some embodiments, MAP may authenticate the consumer and/or portable communication device 1201 using single or multifactor authentication. The storage/memory used to store the keys in mobile application 1212 may go through a certification process. For example, root credential can be generated. The input for generating root credential can be created from high entropy attributes such as hard to clone functions (UFs) resident on the portable communication device and time-bound attributes received and stored from backend system. Subsequent credentials hosted in key store can be extracted from a generated key encryption key (KEK). User credentials can be used as an input to generate a Root Credential and KEK. Obfuscated permutation logic can be provided as input to generating a Root Credential and KEK. Obfuscated permutation logic can be based on xx-morphic (polymorphic, metamorphic) mechanisms. Credential store can be time-bound and mutable. Extracted data-at-rest key from key store can be encrypted and decrypted from yet another KEK when resident as data-in-use. Binary attributes for application logic processing the key can be provided as input (bind) to generate KEK for protecting data-in-use. Data-in-use keys can be scrubbed through application logic processing keys. The following Protection Profiles (PP) can be established: PPs for KEK1 protected Key Store, PPs for KEK1 & 2 generation logic, PPs for KEK2 protected data-in-use key, and/or PPs for data-in-use key scrubbing.

Code and data in mobile application 1212 can be obfuscated in order to protect the code against reverse engineering. The application logic that also drives key extraction can be certificated for tamper resistance for ensuring protection of keys. The application logic hosting credentials used to authenticate and the credentials themselves can be certificated for tamper resistance. Tamper resistance/detection mechanisms can be implemented to preserve the integrity of the code/application logic. User credentials can be used as an input to encrypting sensitive parts of code logic. Obfuscated permutation logic can be provided as input to generating a KEK. Obfuscated permutation logic can be based on xx-morphic (polymorphic, metamorphic) mechanisms. Code and application logic can be time-bound and mutable. The following Protection Profiles (PP) can be established: PPs for tamper resistance/detection, PPs for obfuscation generation logic, PPs for ensuring measured initialization, and/or PPs for update Mobile Application Launch and Account Preparation On each consumer-initiated manual launch (i.e., through a hard or soft key, or from the device's mobile application environment 1210), mobile application 1212 may check and report to MAP if portable communication device 1201 is in debug mode. Mobile application 1212 may check that the payment accounts provisioned in mobile application 1212 are active and available, and check if the account parameter thresholds 1252 have been exceeded and determine if an account parameter replenish request is required. Mobile application 1212 may check the device state, including jail breaking, rooting, malware, mobile application runtime integrity, and if new account parameters are sent to mobile application 1212. If device or application compromise is detected, mobile application 1212 may be deactivated and the deactivation reason relayed back to MAP.

If a payment account managed by mobile application 1212 is in a suspended state then the consumer can benefit from being presented with information to take the necessary action or to contact their issuer. To make a payment account provisioned in mobile application 1212 ready for payment, the user may first select to pay using this payment account. This can be done in the following ways for each payment mode. In Manual Mode, the user launches mobile application 1212, selects the card or account to use for payment, navigates to payment screen for the selected card or account and selects to pay. In Always-On Mode, the user selects the card or account to be used for payment as the default payment account. For Always-On with On-Device Verification Mode, the user selects the card or account to be used for payment as the default payment account. Once a card or account is selected for payment, mobile application 1212 may configure PPSE 1256 with appropriate account details of the selected card or account. Once PPSE 1256 is configured, the selected card or account is ready for payment when the user taps portable communication device 1201 on an access device or otherwise communicate with the access device.

Mobile Application User Verification

In some embodiments, mobile application 1212 may support user verification when interacting with MAP and/or interacting with an access device. When interacting with MAP (e.g., provisioning or replenishment of account parameters stored in account parameters storage 1240), a unique username and password may be verified by MAP, depending on the context of that interaction and the requirements of the issuer. Mobile application 1212 may also provide a list of the cardholder verification methods supported by mobile application 1212 to an access device when interacting with the access device. Cardholder verification methods that are supported in the card environment, such as online PIN and signature, can also be supported by cloud-based payments.

Portable communication device 1201 may also have a specific category of cardholder verification methods, referred to as consumer device cardholder verification method (CDCVM). There are a number of different methods that can be used to provide the CDCVM for mobile application 1212, which can include the same username/password utilized in the authentication with MAP. The CDCVM method utilized by mobile application 212 may provide different levels of security.

Cloud-based CDCVM performed through connection to an online service may provide the highest level of security. This could be the same as the username/password used for authentication to MAP. However, if data connectivity is not present, this would result in a payment requiring CDCVM to fail. Hence, this option may be used in Manual Mode to prevent a payment transaction failing midway through the two-tap process due to no data connectivity On-device CDCVM performed at the portable communication device level through the operating system may provide a better consumer experience. An example is the method required to unlock the portable communication device screen. Mobile application 1212 receives an indication from portable communication device 1201 when the CDCVM has been successfully entered. Mobile application 1212 has no capability to change the on-device CDCVM. Mobile application CDCVM can be performed on opening and launching mobile application 1212. An example is entering a numeric code to open mobile application 1212. As a software-based CDCVM may be less secure than the other options, this method may be used in combination with a more secure option, such as with a cloud-based CDCVM, where the mobile application CDCVM is used when there is no data connectivity available.

User Settings

Mobile application 1212 may receive these options, or a subset thereof, in a suitable manner or assume a default for one or more of these options. These options describe the general behavior of mobile application 1212. For example, user settings 1226 may include payment modes such as Manual, Always-On, or Always-On with On-Device Verification. User settings 1226 may include whether the consumer can make changes to these initial preferences, how much time a consumer has to make a payment in each mode, how much time a consumer has to enter password in a two tap transaction (may be applicable to higher value transaction scenarios), within what time period mobile application 1212 should shut down if there has been no interaction from the consumer, etc. User settings 1226 may also support password change. The user may populate the consumer's chosen mobile application password by invoking a password change process and provide the current or default password and the consumer's newly chosen password. The consumer may choose this option to change previously chosen passcode/password. Mobile application 1212 may prompt the consumer to enter the current password and new password (depending on the implementation and the manner in which passwords are masked or not, the consumer may be prompted to input the new password twice to ensure correct entry). Mobile application 1212 may replace the old passcode/password with the new passcode/password. The location of the passcode/password may be stored remote or local to the device.

If the consumer has chosen to modify the Always-On Mode settings, the PPSE 1256 may be configured appropriately (e.g., the file control information (FCI) template can be updated with directory entry for the default payment account). This ensures that the default account is used when portable communication device 1212 is brought in proximity to an access device when conducting transactions.

If on-device verification setting is turned on, mobile application 1212 may ensure to not initiate a transaction until the verification method has been confirmed. The verification method in this case can be the one set by the user for unlocking the phone. Upon successful verification, the cardholder verification method (CVM) verified field in mobile application 1212 may be set. The successful verification in this setting is then conveyed to the access device and eventually to the issuer via the CVM verified field.

Mobile Application Interaction Events

The behavior of mobile application interaction events may depend on whether the mobile application 1212 is currently running when this event occurs, or whether the receipt of the event by the underlying mobile application environment 1210 is the trigger that caused mobile application 1212 to launch. Depending on the capabilities of the underlying mobile application environment 1210, mobile application 1212 may be able to differentiate between different events.

The receipt of a push notification by the underlying mobile application environment 1210 can be targeted towards mobile application 1212. Mobile application 1212 can be reached in band via MAP to replenish account parameters for the cloud-based account or push other data as may be deemed necessary by the issuer and/or MAP. The communication channel with MAP may also be used for issuers to send lifecycle management events such as suspend, resume, delete.

On shutdown, mobile application 1212 may ensure that the state of each payment account is in a suitable state. This may apply when mobile application 1212 is going through an expected shutdown sequence as well as when mobile application 1212 is unexpectedly terminated. The previous account verification applied during manual launch may be reversed, and payment account CDCVM verification indicators may be set to the negative. Mobile application 1212 may ensure that the consumer's chosen settings are reflected and that the payment accounts are in their regular idle states.

Mobile Application Shutdown/Clean Up

Mobile application 1212 may perform cleanup when it is closed unexpectedly (e.g., the portable communication device shuts off due to low battery power) or on purpose. In any payment mode, mobile application 1212 may save the payment mode, account parameters, associated thresholds, and default card settings so that they are available when mobile application 1212 is launched again. Mobile application 1212 may terminate any ongoing transaction, close any open session with the MAP, save transaction logs if shutdown was immediately preceded by a successful transaction, and free up any system and memory resources being used by mobile application 1212. In some embodiments, mobile application 1212 may choose to set or reset the "CDCVM successfully performed" flag, depending on how the CDCVM verification logic is implemented.

The implementation logic related to PPSE configuration may differ during shutdown/cleanup depending on the payment mode selected when mobile application 1212 is shut down. In Always-On Mode, mobile application 1212 may save the PPSE configuration so that the PPSE picks up the default card as the only active card for payment when mobile application 1212 is launched again. In Manual Mode, the PPSE configuration may not be saved upon shutdown. Instead, the PPSE may be re-populated when the consumer selects a card to pay the next time mobile application 1212 is launched. On mobile application 1212 shutdown, mobile application 1212 may ensure that the consumer's chosen settings are reflected and that the payment accounts are in their regular idle states.

Navigating from the Mobile Application

When the consumer presses the portable communication device's home button or back button to move out of mobile application 1212 and then come back to it, mobile application 1212 may continue running in the background and continue the operation being performed. Mobile application 1212 may apply restrictions for additional security, such as timeouts, to limit the time that it can continue running in the background. If a consumer puts mobile application 1212 in the background while a transaction is in progress, mobile application 1212 may continue the transaction processing.

Mobile Application Uninstall

As part of an uninstallation process, mobile application 1212 may clear any sensitive data such as keys, certificates, and account parameters. Mobile application 1212 may inform MAP so that CBPP and the issuer/host system can execute the necessary lifecycle management processes for accounts provisioned in mobile application 1212 at the time of uninstallation. Mobile application 1212 may close any open session with MAP, terminate the ongoing transaction if present, and release any system and memory resources being used by mobile application 1212.

Account Enrollment

Mobile application 1212 may include enrollment logic 1232 to enroll/add a payment account into the cloud-based payment program, unless the issuer has provided another channel to accomplish this. The issuer may be directly involved in the enrollment process (e.g., the issuer directly may make the accept/decline enrollment decision or delegates the decision to a third party under pre-defined conditions). In both cases, the issuer may be in full control of the acceptance criteria and specifically defines card account verification methods and consumer authentication methods.

Enrollment logic 1232 may allow a consumer to input card details to initiate a payment account enrollment. The details to capture may be determined by the issuer/host system and/or CBPP, but should be sufficient to uniquely identify and verify the payment account. The issuer/host system and/or CBPP can determine the method and information required to authenticate the consumer who owns that account. Mobile application 1212 may send payment account enrollment data to MAP, which will then send and manage the account enrollment and account verification process with the issuer/host system and/or CBPP.

If enrollment is successful, mobile application 1212 may receive from MAP the data for provisioning the new payment account for payment, including a payment account application ID (AID), PPSE AID, payment account issuer settings, payment account card art, account parameters, account parameter settings and thresholds, etc. If enrollment is successful, enrollment logic 1232 may provision the payment account based on the information received from MAP. Mobile application 1212 may also, as part of the configuration process, request the consumer to set an account verification method (e.g., a passcode), if it is not already set. Upon completing the account configuration, mobile application 1212 may display a message to the consumer that the enrollment was successful. Mobile application 1212 may support and configure the account parameter thresholds as defined by the issuer/host system and/or CBPP. The account parameter thresholds may include a number of transactions (i.e. cumulative number of transactions that would trigger a replenish request for a specific payment account), time to live (i.e. amount of time to elapse before mobile application 1212 would trigger a replenish request for a specific payment account), and/or cumulative transaction amount (i.e. total monetary amount across one or more transactions conducted on a specific account before mobile application 1212 would trigger a replenish request for that account). If enrollment is not successful, mobile application 1212 may receive and process a the failure notification and reason code, and display a message to the consumer that the enrollment was not successful and request the consumer take any appropriate action.

Payment Using Mobile Application

Mobile application 1212 enables the user to perform contactless transactions at a contactless access device via portable communication device 1201. Mobile application 1212 facilitates this by using the account parameters provided by CBPP to generate the data format to conduct payment transactions. To avoid consumer confusion as to where the payment will be allocated to, if there are multiple payment mobile applications installed on portable communication device 1212, the consumer may be required to choose which mobile application to use for the payment. There are a number of options how this can be achieved. The consumer may, at the consumer's discretion, be able to set a default payment mobile application in the mobile OS settings. The consumer may be able to set a default payment product in a specific mobile application's settings. The consumer may be able to manually select a payment product within that mobile application. To ensure the consumer choice is used, mobile application 1212 may present the selected payment account to the access device. Mobile application 1212 may support either integrated chip based transaction path or magnetic stripe based transaction path, depending on which type of transaction the access device supports. Integrated chip based transaction is the default path used with a chip card capable access device, and magnetic stripe based transaction is the default path used with a magnetic stripe only capable access device.

In some embodiments, mobile application 1212 may support multiple application identifiers (AIDs) for a single account. A single account may have multiple AIDs associated with it, for example, if a transaction conducted on that account can be processed by different payment processing networks and/or if the account has different services, features, product-types, and payment capabilities associated with the account. The multiple AIDs can be communicated to the access device to allow an access device to select a preferred AID to choose how the transaction is processed (e.g., which payment processing network) and/or what services or features can be associated with the transaction. The multiple AIDs can be populated in the directory entry for the PPSE, and communicated to an access device for this purpose.

For example, a single account may have a common debit AID and a payment processing network specific AID (e.g., a Visa AID) associated with the single account. These AIDs can be populated in the directory entry for the PPSE, and the PPSE File Control Information (FCI) for each directory entry may include an Issuer Identification Number (IIN) and an Issuer Country Code (ICC). In some embodiments, the CVM for the debit AID can be an online CVM (e.g., an online PIN), while the CVM for the payment processing network specific AID can be a signature.

A contactless payment can be initiated by the consumer tapping portable communication device 1201 to a contactless reader (e.g., a NFC reader), or otherwise communicating with the contactless reader (e.g., displaying a QR code or bar code) of the access device. The access device may request a cardholder verification method (CVM) for transactions above a threshold amount (e.g., transactions above $20). Mobile application 1212 can support a number of different CVMs, including the mobile specific consumer device cardholder verification method (CDCVM). Not all access devices may support CDCVM, and in those cases, an alternative CVM can be requested such as signature or online PIN.

An indication of successful CDCVM entry is sent during the payment transaction to the contactless reader. Mobile application 1212 may configure the appropriate data in the account parameters at the time of payment when the CDCVM has been successfully confirmed. Whenever the CDCVM is successfully entered, mobile application 1212 may store this information so the CDCVM verified indicator and CDCVM type indicator can be set and passed to the contactless reader during the payment transaction. This may prevent the access device from prompting the consumer for CDCVM entry at the access device. Mobile application 1212 may have the capability to provide indication of a successful CDCVM when requested by a access device during a two-tap payment transaction.

When mobile application 1212 is locked due to inactivity, mobile application 1212 may store this information so the CDCVM verified indicator can be set to negative. If a contactless payment is initiated in this state, the access device may prompt the consumer for CDCVM entry. Mobile application 1212 may provide the capability for CDCVM reset if it provides the consumer verification entry method for CDCVM. Mobile application 1212 may set a limit for number of consumer verification attempts, and locks mobile application 1212 if this limit is exceeded. For security purposes, issuers may request additional consumer verification before unlocking mobile application 1212. In some embodiments, mobile application 1212 may have a CDCVM that is not synchronized with the online PIN of a companion card.

In Manual Mode, the consumer may open or launch mobile application 1212 to enable payment functionality. When mobile application 1212 is opened, functionality can be enabled so the consumer can initiate a payment by tapping portable communication device 1201 to a contactless reader. Portable communication device 1201 may prevent the consumer from performing a transaction based on any accounts stored in mobile application 1212 if mobile application 1212 is not open and active as the foreground application.

If the CDCVM indicator is not positive (i.e. a valid CDCVM entry has not yet been entered), mobile application 1212 can request CDCVM entry on opening. If this implementation path is selected, this may ensure the consumer is not requested again for CDCVM entry during a payment transaction (i.e., avoid the two-tap scenario for high value payments). Conversely, if this implementation path is not selected, usability for the consumer may be improved by omitting the request for CDCVM entry for transactions below a high value limit, with the trade-off being the consumer will be asked for the CDCVM entry if a high value payment is being conducted.

If there is more than one payment card or account available in mobile application 1212, the card or account selected as the default will be the one used for a payment transaction, unless the consumer selects an alternative card or account as active for payment. Once mobile application 1212 is open, PPSE 1256 may be populated and portable communication device 201 can initiate a payment transaction. Mobile application 1212 may display a message to the consumer indicating portable communication device 1201 is "Ready to Pay." Mobile application 1212 may define a time limit for inactivity, which when exceeded, may lock mobile application 1212. This ensures the consumer remains in control of the payment functionality, and the Manual Mode does not morph into Always-On Mode through inactivity. Mobile application 1212 can also enable the consumer to select a preferred time limit in settings. Depending on whether CDCVM is required or not, mobile application 1212 can require CDCVM entry to unlock mobile application 1212 after being locked due to inactivity.

In Always-On Mode, contactless payment capability is available whenever the phone screen is active. The contactless capability (e.g., NFC) may be available even if the phone screen is still in a locked state. To ensure consumers are aware of this capability and can opt-in to its usage, mobile application 1212 may preclude setting Always-On Mode as the default mode. Whenever the phone screen is active, PPSE 1256 can be activated and populated, and portable communication device 1201 is able to initiate a payment transaction. When the consumer initiates a contactless transaction with the screen in a locked state, the contactless reader may request CDCVM entry. Where a device-level CDCVM is used, an icon indicator may be displayed on the notification bar, and the phone screen needs to be unlocked. Mobile application 1212 may then instruct the consumer to tap portable communication device 1201 to a contactless reader. Where a mobile application-level CDCVM is used, an icon indicator can be displayed on the notification bar. Mobile application 1212 may present the CDCVM entry screen to the consumer, and then instruct the consumer to tap portable communication device 1201 to a contactless reader once a successful CDCVM has been entered.

In Always-On with Device Verification Mode, contactless payment capability is available whenever the phone screen is active and unlocked. The contactless capability is not available when the phone screen is still in a locked state. Whenever the phone screen is unlocked, PPSE 1256 may be activated and populated, and portable communication device 1201 is able to initiate a payment transaction. If the consumer attempts to initiate a contactless payment with the screen in a locked state, the contactless reader will not be able to communicate with portable communication device 1201, and so nothing will happen on either the access device or on portable communication device 1201. When the consumer initiates a contactless payment with the screen in an unlocked state, the contactless reader may request CDCVM entry. Where a device-level CDCVM is used, mobile application 1212 may instruct the consumer to tap portable communication device 1201 to the contactless reader. Where a mobile application level CDCVM is used, mobile application 1212 may present the CDCVM entry screen to the consumer, and then instruct the consumer to tap portable communication device 1201 to the contactless reader once a successful CDCVM has been entered.

When mobile application 1212 and the access device have completed the communications to provide the data to complete the transaction, mobile application 1212 may display a message indicating that the payment has been sent. A contactless payment conducted using the integrated chip based transaction path may provide mobile application 1212 with some transaction data, such as transaction amount and merchant information. Mobile application 1212 can populate the payment sent message with this information. A contactless payment conducted using the magnetic stripe based transaction path does not provide mobile application 1212 with any transaction data. Following a payment, mobile application 1212 may check the account parameter thresholds, and determine if mobile application 1212 needs to send a request for replenishment of the account parameters.

Active Account Management

Active account management logic 1236 of mobile application 1212 initiates and manages the request to replenish account parameters when the account parameter thresholds have been exceeded. In order to mitigate the risk of the account parameters stored in account parameters storage 1240 from being compromised, account parameters can be periodically generated by CBPP and replenished in mobile application 1212 as well as refreshed in the issuer/host system in order to maintain the account in the active state. For the active account management process to be initiated, CBPP may receive a replenishment request for new account parameters from mobile application 1212 through MAP. CBPP 180 can also act upon a request received from the issuer/host system.

In some embodiments, active account management logic 1236 of mobile application 1212 can trigger the update or replenishment of the account parameters through an account parameters replenishment pull process. Active account management logic 1236 may attempt to initiate the account parameters replenishment flow at the time the consumer launches mobile application 1212, or after a transaction has been completed, and the account parameter thresholds 1252 have been exceeded. Upon receiving an updated set of account parameters, mobile application 1212 may process the account parameters payload and make the new account parameters available for payment. Upon successfully processing the new set of account parameters, mobile application 1212 may generate a notification to MAP. MAP may notify CBPP that the account parameters were successfully delivered to mobile application 1212. Note that updated account parameters can be accompanied with a new set of device threshold management parameters (e.g., different limited-use thresholds than the previous set of account parameters) that an issuer may want to use when the customer is in different environments (e.g. outside of the domestic market). Before initiating the exchange of sensitive information, MAP may perform user, device, and application level authentication.

The update or replenishment of the account parameters can also be performed with an account parameter replenishment push process. In this flow, CBPP initiates the process to update the account parameters. CBPP sends a push message to MAP to initiate the replenishment push. MAP may then sends a push message to mobile application 1212. Mobile application 1212 then generates the account parameter update request per the replenishment pull flow described above. Before initiating the exchange of sensitive information, MAP may perform user, device, and application level authentication. If a user level authentication is used because previous authentication has expired, then mobile application 1212 may cache the request until the consumer opens mobile application 1212 and performs a user level authentication. After the successful authentication, mobile application 1212 follows the same procedure as in the replenishment pull flow. If user level authentication is not needed because the previous authentication has not expired, mobile application 1212 can immediately follow the same procedure as in the replenishment pull flow.

Upon receiving an updated set of account parameters, active account management logic 1236 may check the validity of the new account parameters, make the new account parameters available for payment, reset the account parameters thresholds, reset the account parameters threshold configurations, and delete the old set of account parameters. In some embodiments, mobile application 1212 may allow a transaction to be initiated even if the account parameters have not been updated due to lack of network connectivity. The issuer/host system or payment processing network acting on behalf of the issuer may make the decision to approve or decline the transaction based on knowledge of the stale account parameters in combination with other issuer defined risk metrics.

Mobile application 1212 may include a number of cloud-based payments device account parameters thresholds 1252 or risk limits that trigger the update of the current set of account parameters. This may include a number of transactions, a time to live, and/or cumulative transaction amount, etc. If the account parameters are valid for a number of transactions in CBPP, then account parameter thresholds 1252 in mobile application 1212 can be configured with a lower threshold number of transactions (e.g., one less than the number of transactions in CBPP) to trigger replenishment. If account parameters have an expiration time in CBPP, account parameter thresholds 1252 in mobile application 1212 can be configured with a threshold amount of time sooner than the expiration time to trigger replenishment. Where available from the contactless reader, the transaction amount can be used by active account management logic 1236 to make a decision as to whether the account parameters should be updated. Smaller transaction amounts would not necessarily require an immediate update of the account parameters. This mechanism, however, may not be reliable in environments where mobile application 1212 does not consistently receive the transaction amount from the access terminal. Where available, a cumulative transaction amount can be used as the trigger for account parameters update. This limit is based on the sum of individual transaction amounts. This data may not be necessarily reliable from mobile application 1212 point of view unless the data gets synchronized with the issuer/host system to ensure that a given transaction has been approved. A domestic versus international risk setting can also be used to trigger updates for international transactions more often in case they are considered more risky.

Account Lifecycle Management

Mobile application 1212 may include lifecycle management logic 1234 to provide a user-initiated delete option for the user to delete a card or account from mobile application 1212 via lifecycle management logic 1234. Account lifecycle logic 1234 may delete account parameters stored in account parameters storage 1240 associated with that account, along with all other account configuration data or artifacts. Lifecycle management logic 1234 may initiate the process of account deletion in CBPP by initiating a delete request to CBPP through MAP.

Lifecycle management logic 1234 may enable an issuer-initiated delete mechanism for an issuer to delete an account. The issuer/hos system may send a delete request to CBPP, and in turn, CBPP may route the request to mobile application 1212. Lifecycle management logic 1234 may delete locally stored account parameters associated with the account, along with all other account configuration data or artifacts. Mobile application 1212 may send an acknowledgement to MAP indicating that the deletion was completed. Mobile application 1212 may also display a message to user informing that the account is deleted.

Lifecycle management logic 1234 may enable an issuer-initiated suspend mechanism for an issuer to suspend an account. The issuer/host system can send a suspend request to CBPP, and in turn, CBPP may route the request to mobile application 1212. Lifecycle management logic 1234 may suspend the card or account in mobile application 1212. In the suspended state, the account cannot be selectable in the mobile application settings to make a payment. Lifecycle management logic 1234 may send an acknowledgement to MAP after suspending the account. Mobile application 1212 may display a message to user informing that the account is suspended, and may also inform the consumer to contact the issuing bank.

Lifecycle management logic 1234 may enable an issuer-initiated resume mechanism for an issuer to resume an account when it has been suspended in mobile application 1212. The issuer/host system may send a resume request to CBPP, and in turn, CBPP may route the request to mobile application 1212. Lifecycle management logic 1234 may resume the card or account in mobile application 1212. After resuming, the card or account may be selectable in the mobile application settings for payment. Mobile application 1212 may send an acknowledgement to MAP after resuming the account, and display a message to user informing that the account has been resumed.

Post Payment Interactions

Post payment interactions or processing can help issuers mitigate the risk of account parameters being compromised and hence can help limit the exposure of the account parameters stored on portable communication device 1201. Information contained in a transaction verification log may be used to provide a reference point for CBPP to assist in assurance that account parameter replenishment requests are originating from the expected portable communication device. Mobile application 1212 may include post payment logic 1238 to extract information from transaction verification log 1254 in order to construct account parameter replenishment requests.

Furthermore, the issuer/host system working in conjunction with CBPP may have the option of initiating a request, through MAP, for transaction verification log data captured and stored by mobile application 1212 to verify transactions. Mobile application 1212 may respond, through MAP, to the request with the requested transaction verification log data. This data can then be verified by the issuer/host system in order to confirm if a particular transaction had originated from the queried portable communication device. Examples of the data elements that may be included in the transaction verification log may include, for each transaction, transaction time (e.g., contactless interaction time, transaction amount, and unpredictable number received from the access device during the transaction) as well as account parameters information such as the key index associated with the LUK that was used to conduct the transactions. For payment transaction verification, mobile application 1212 may receive and process request from MAP for transaction verification log data captured and stored by mobile application 1212. Mobile application 1212 may respond to the MAP request with the requested transaction verification log data. Mobile application 1212 may use the current account parameter's LUK or equivalent in the dynamic data portion of the account parameters to sign the requested transaction verification log data.

Transaction Verification Log

Mobile application 1212 can maintain transaction verification log 1254 to log all contactless interactions (e.g., NFC) where payment account parameters where shared with an access device, irrespective if the transaction was accepted or declined, or irrespective of whether mobile application 1212 has visibility to the outcome of the transaction (e.g., accepted or declined). Mobile application 1212 may store the transaction verification log data for the current and the previous set of account parameters per payment account. In some embodiments, the transaction verification log data for old set of account parameters can be deleted once mobile application 1212 receives a new set of account parameters. Transaction verification log 1254 may or may not be accessible or visible to the user.

XII. Embedding Cloud-Based Functionalities

The various cloud-based transaction functionalities described above can be integrated into a single mobile application 1212 provided by a cloud-based transaction service provider as shown in FIG. 12. However, in some scenarios, issuers, merchants, or other third-party mobile application providers may have their own mobile applications that a user may want to use. Accordingly, embodiments of the present invention provides issuers, merchants, or other third-party mobile transaction applications providers with the flexibility to integrate or otherwise make available cloud-based transaction functionalities in their custom applications. FIGS. 13-15 and 17 illustrate various techniques for embedding cloud-based transaction functionalities in issuers, merchants, or other third-party mobile applications that can be installed on a communication device.

Integrated SDK

Figure 13:
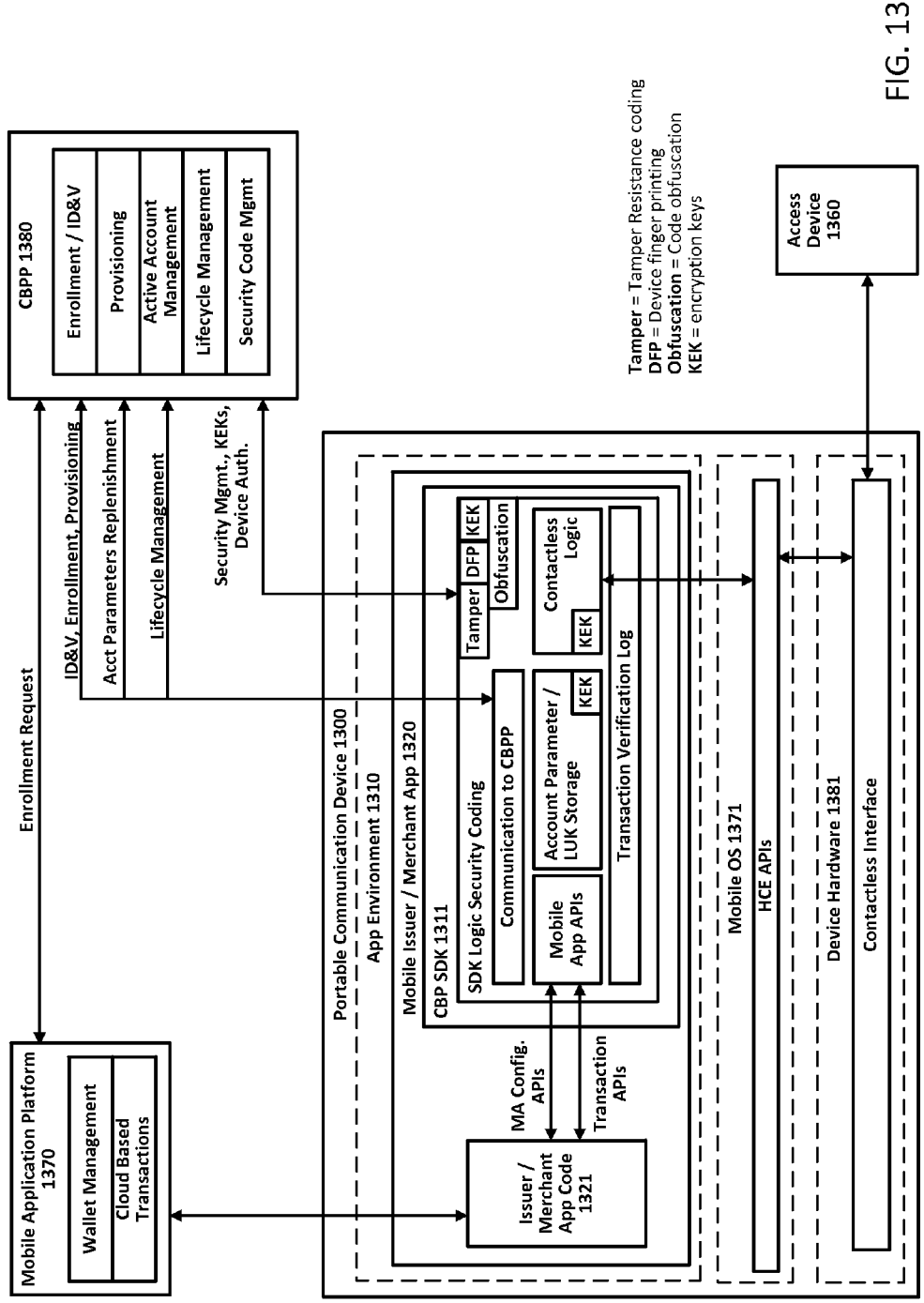
FIG. 13 illustrates a block diagram of a cloud-based transaction system in which a cloud-based transaction software development kit (SDK) is used, according to some embodiments.

FIG. 13 illustrates a block diagram of a cloud-based transaction system in which a cloud-based transaction software development kit (SDK) is used to enable cloud-based transaction functionalities in a mobile application, according to some embodiments. In some embodiments, cloud-based transaction SDK (CBP SDK) 1311 can be architected and developed by a cloud-based transaction service provider (e.g., a payment processor or issuer) with software libraries and logic to access services provided by CBPP 1380, including services described above such as services relating to account enrollment, authentication services such as identification and verification (ID&V), active account management including account parameters refresh and tokenization services, lifecycle management, security code management such as device fingerprint verification services, etc.

CBP SDK 1311 can be provided to issuers, merchants, or other third-party mobile application providers, and be integrated into their custom mobile application 1320. Mobile application 1320 incorporating CBP SDK 1311 can both be executed from within the same local application environment 1310 (e.g., a normal execution environment) on portable communication device 1300. For example, both mobile application 1320 and CBP SDK 1311 incorporated therein can be executed within a virtual machine instantiated for mobile application 1320. Thus, according to this technique, each mobile application may include its own integrated CBP SDK 1311, and if portable communication device 1300 includes multiple mobile applications, each mobile application incorporating a CBP SDK may be executed within its own virtual machine.

Mobile application 1320 may include mobile application code 1321 developed by an issuer, merchant, or other third-party, and CBP SDK 1311 developed by a cloud-based transactions service provider. Mobile application code 1321 may include user interface logic to allow a user to interact with mobile application 1320 (e.g., to initiate a transaction with access device 360). Mobile application code 1321 may also include communication logic to allow mobile application 1320 to communicate with MAP 1370 or with an issuer or merchant to access issuer or merchant services such as account enrollment.

CBP SDK 1311 may include communication logic to enable mobile application 1320 to communicate with CBPP 1380. CBP SDK 1311 may provide contactless logic that interfaces with host card emulation (HCE) APIs in mobile OS 1371 to conduct contactless transactions (e.g., including transaction cryptogram generation logic and functions such as those described with reference to FIGS. 3-4). CBP SDK 1311 may also provide account parameters and Limited Use Key (LUK) storage, and transaction verification logging of transaction information to support post payment functions such as account parameters replenishment. In some embodiments, CBP SDK 1311 may also provide activity logging of information such as geo-location information, loyalty or couponing information, etc. to support value added services.

To allow mobile application code 1321 to interface with CBP SDK 1311, CBP SDK 1311 may provide mobile application APIs that mobile application code 1321 can call to invoke the functionalities of CBP SDK 1311 and to access accounts parameters provisioned and managed by CBP SDK 1311. For example, mobile application code 1321 may call mobile application configuration APIs to provision accounts and request account credentials, or call transaction APIs to conduct a transaction.

In some embodiments, CBP SDK 1311 can be protected by a security framework to prevent modification or hacking of CBP SDK 1311. For example, CBP SDK 1311 may include tamper resistance coding such as data and application logic code obfuscation, white box cryptography coding, etc. CBP SDK 1311 may also include tamper detection protections such as periodic source code verification to ensure the SDK code has not been modified. The security framework may also provide secure data storage (e.g., for encryption keys), and device fingerprinting and/or device authentication functions.

By integrating CBP SDK 1311 with mobile application code 1321, mobile application 320 can access account parameters via CBP SDK 1311 to conduct cloud-based transactions (e.g., via HCE APIs provided by mobile OS 1371 and the contactless interface such as a contactless transceiver of portable communication device 1300). In some embodiments, account credentials provisioned and managed by CBPP 1380 can also be accessed by mobile application 1320 to conduct QR code transactions, Bluetooth low-energy (BLE) transactions, in-application payments, online and mobile commerce payments, etc.

In the techniques shown in FIG. 13, CBP SDK 1311 integrated as part of mobile application 1320 is responsible for performing account parameters management and for conducting cloud-based transactions. Thus, after account enrollment, CBP SDK 1311 may interact with CBPP 1380 to obtain an initial set of account parameters and LUK, and store the account parameters and LUK in the storage area managed by CBP SDK 1311. When mobile application code 1321 receives a request to conduct a transaction (e.g., in response to user interaction with mobile application 1320), mobile application code 1321 may send the request to CBP SDK 1311 by calling a transaction API function. CBP SDK 1311 may access the LUK stored therein, and generate a transaction cryptogram for the transaction using the LUK based on the techniques described herein. CBP SDK 1311 may then access the contactless interface (e.g., contactless transceiver) of portable communication device 1300 to transmit the transaction cryptogram to access device 1360 to conduct a transaction. CBB SDK 1311 may store transaction information relating to the transaction in a transaction verification log, which is used during account parameters and LUK replenishment.

In some embodiments, the LUK may be associated with a set of one or more limited-use thresholds that limits usage of the LUK. When CBP SDK 1311 detects the set of one or more limited-use thresholds has been exceeded or is about to be exceeded by a next transaction, CBP SDK 1311 may send a replenishment request for a new LUK to CBPP 1380. The replenishment request may include transaction log information derived from the transaction verification log (e.g., an authentication code computed over some or all of the information in the transaction verification log). If the transaction log information in the replenishment request matches the transaction log information at CBPP 1380, CBPP 1380 may send a new LUK to CBP SDK 1311, and CBP SDK 1311 may store the new LUK to be used in subsequent transactions.

Shared Application

Figure 14:
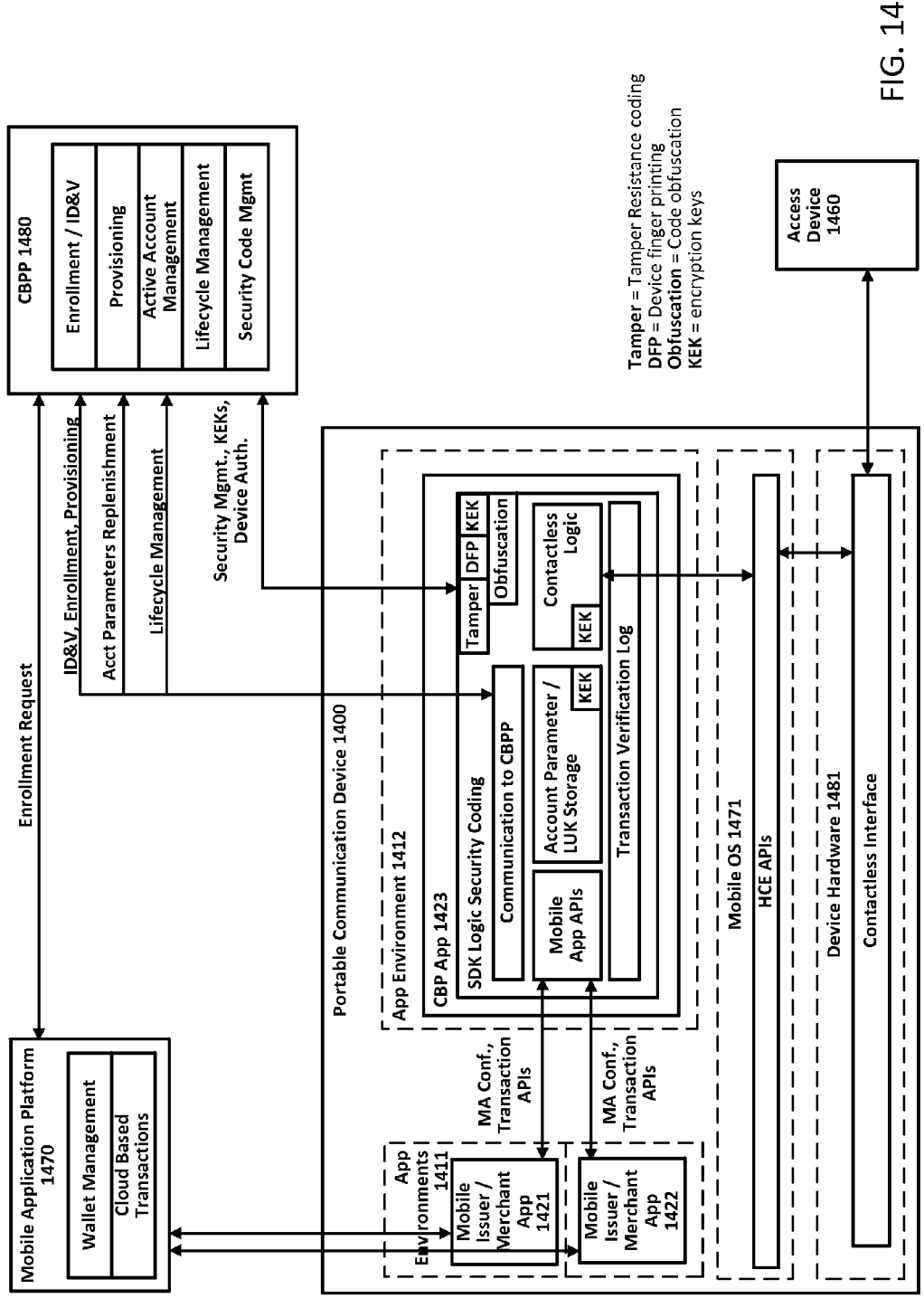
FIG. 14 illustrates a block diagram of a cloud-based transaction system in which a shared cloud-based transaction application is used, according to some embodiments.

In the techniques described above with reference to FIG. 13, each mobile application may have its own integrated CBP SDK, and thus such an implementation may increase the size of each mobile application installed on a portable communication device. To reduce the amount of memory taken up when multiple transaction mobile applications are installed on a portable communication device, instead of have a CBP SDK integrated with each mobile application, a shared CBP application can be used. FIG. 14 illustrates a block diagram of a cloud-based transaction system in which a CBP application is used to enable cloud-based transaction functionalities for other mobile applications, according to some embodiments. According to this technique, CBP application 1423 is a standalone application that includes libraries and logic to access CBPP 1480 and perform functionalities similar to CBP SDK 1311. In some embodiments, CBP application 1423 can be made available in app stores (e.g., iTunes, Goggle Play, etc.) for download. Because CBP application 1423 is a standalone application, CBP application 1423 can execute out of its own local application environment 1412 (e.g., its own virtual machine) that is separate and outside of the local application environments 1411 of other mobile applications (e.g., mobile applications 1421, 1422, etc.). Other mobile applications (e.g., mobile applications 1421, 1422, etc.) executing in their respective application environments 1411 (e.g., respective virtual machines) can access the cloud-based transaction functionalities by communicating with CBP application 1423 installed on portable communication device 1400.

In some embodiments, CBP application 1423 may lack a user interface, and a user may not be able to access CBP application 1423 directly, because CBP application 1423 is used as an enabling application to provide other applications (e.g., mobile applications 1421, 1422, etc.) with cloud-based transaction functionalities. According to the techniques shown in FIG. 14, multiple mobile applications installed on mobile device 1400 can share the same CBP application 1423. As compared to the integrated SDK techniques described above with reference to FIG. 13 which may require multiple copies of the CBP SDK (one per mobile application) to be stored, the standalone CBP application approach uses less storage memory because only one CBP application 1423 codebase needs to be stored on portable communication device 1400.

The functionalities provide by CBP application 1423 can be similar to those described above with reference to CBP SDK 1311, and hence a detailed description of which need not be repeated. To allow other mobile applications (e.g., mobile applications 1421, 1422, etc.) to communicate and interface with CBP application 1423, CBP application 1423 may provide mobile application APIs that the other mobile applications can call to invoke the functionalities of CBP application 1423 and to access accounts parameters provisioned and managed by CBP application 1423. For example, mobile application 1421 or 1422 each executing in their respective local application environments or virtual machines may call mobile application configuration APIs to provision accounts and request account credentials, or call transaction APIs to conduct a transaction. In some embodiments, CBP application 1423 may also include a security framework to prevent modification or hacking of CBP application 1423 similar to those described with reference to CBP SDK 1311.

In the techniques shown in FIG. 14, CBP application 1423 is responsible for performing account parameters management and for conducting cloud-based transactions. After account enrollment, CBP application 1423 may interact with CBPP 1480 to obtain an initial set of account parameters and LUK, and store the account parameters and LUK in the storage area managed by CBP application 1423. When one of the mobile applications 1421, 1422, etc. executing in its own local application environment 1411 (e.g., its own virtual machine) receives a request to conduct a transaction (e.g., in response to user interaction with the mobile application), the mobile application may send the request to CBP application 1423 by calling a transaction API function. CBP application 1423 may access the LUK stored by CBP application 1423, and generate a transaction cryptogram for the transaction using the LUK based on the techniques described herein. CBP application 1423 may then access the contactless interface (e.g., contactless transceiver) of portable communication device 1400 to transmit the transaction cryptogram to access device 1460 to conduct a transaction. CBP application 1423 may store transaction information relating to the transaction in a transaction verification log, which is used during account parameters and LUK replenishment.

In some embodiments, the LUK may be associated with a set of one or more limited-use thresholds that limits usage of the LUK. When CBP application 1423 detects the set of one or more limited-use thresholds has been exceeded or is about to be exceeded by a next transaction, CBP application 1423 may send a replenishment request for a new LUK to CBPP 1480. This can be done without involving mobile applications 1421, 1422, etc. The replenishment request may include transaction log information derived from the transaction verification log (e.g., an authentication code computed over some or all of the information in the transaction verification log). If the transaction log information in the replenishment request matches the transaction log information at CBPP 1480, CBPP 1480 may send a new LUK to CBP application 1423, and CBP application 1423 may store the new LUK to be used in subsequent transactions.

Trusted Execution Environment

Figure 15:
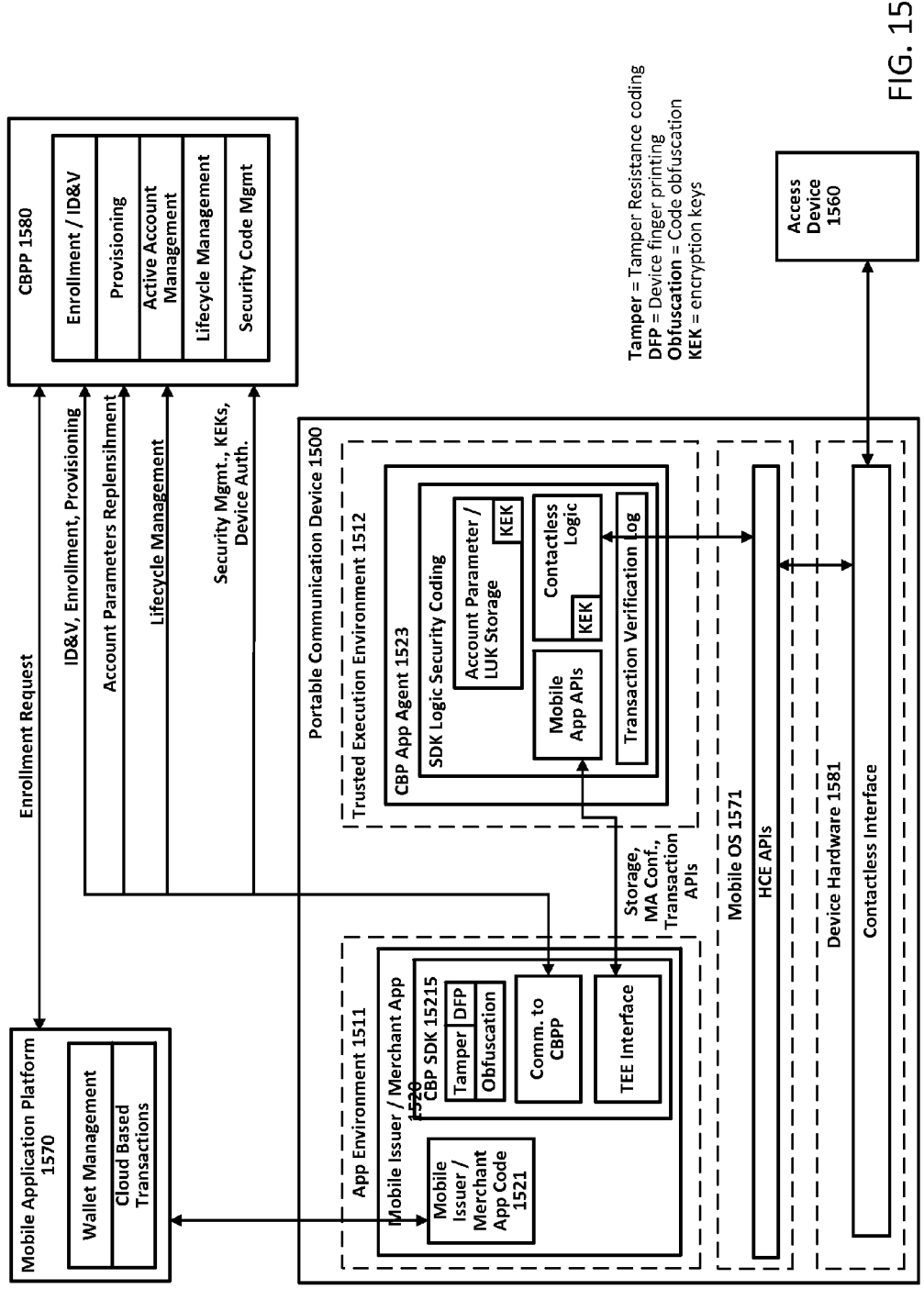
FIG. 15 illustrates a block diagram of a cloud-based transaction system in which a trusted execution environment is used, according to some embodiments.

FIG. 15 illustrates a block diagram of a cloud-based transaction system in which a trusted execution environment is used to enable cloud-based transaction functionalities for a mobile application, according to some embodiments. According to this technique, the cloud-based transaction functionalities are distributed between a CBP application agent 1523 executing in a trusted execution environment 512 and a CBP SDK 1525 integrated with a mobile application 1521. Thus, this implementation can be thought of as a hybrid between the integrated SDK and standalone CBP application techniques described above with reference to FIGS. 13-14. Furthermore, the trusted execution environment technique may enhance the security of portable communication device 1500 as compared to the other techniques, because security sensitive functions implemented in CBP application agent 1523 are protected by trusted execution environment (TEE) 1512. For example, security sensitive functions such as functions to conduct a transaction, generation of transaction cryptograms, storage of account parameters including the LUK and other encryption keys, etc. can be implemented in CBP application agent 1523 executing in TEE 1512, whereas external communication functions such as functionalities to communicate with CBPP 1580 and user interface functions can be implemented in mobile application 1521 executing in the normal application execution environment outside of TEE 1512. It should be noted that CBP application agent 1523 executing in TEE 1512 can be shared by multiple mobile applications, and thus the trusted execution environment technique may provide some of the memory savings similar to the shared standalone CBP application techniques described with reference to FIG. 14.

TEE 1512 provides an isolated execution environment for trusted applications such as CBP application agent 1523. The execution environment of TEE 1512 is separate and isolated from the normal application execution environment to prevent rouge applications or malware from accessing the trusted applications. In addition to providing an isolated execution space, TEE 1512 may also provide secure storage for data and information used by the trusted applications executing in TEE 1512. Data and information stored in the secure storage of TEE 1512 may be stored in an encrypted form, and may be accessible only from trusted applications executing in TEE 1512. In some embodiments, portable communication device 500 may partition its available memory into different memory regions including a memory region that is dedicated for use by TEE 1512.

TEE 1512 can be implemented as a secure virtual machine or as a secure operating mode of the processor of portable communication device 1500, and access to the functionalities and applications executing in TEE 1512 can be restricted to processes and applications with the requisite privileges. For example, if TEE 1512 is implemented as a secure virtual machine, a hypervisor or a virtual machine monitor can be used to restrict access to the applications executing in TEE 1512. In some implementations, the processor of portable communication device 1500 may provide a secure operating mode to implement TEE 1512. For example, a processor may include multiple processing cores, and a processing core can be set in a secure operating mode such that the processing core is dedicated to execute operations originating from trusted applications in TEE 1512. In some embodiments, a processor can also be virtualized into multiple virtual processors, and a virtual processor can be set in a secure operating mode to implement TEE 1512. In some embodiments, specialized instruction sets can be implemented to distinguish between secure processor instructions and normal processor instructions, and only applications executing in TEE 1512 may call the secure processor instructions.

Referring to FIG. 15, CBP application agent 1523 can be stored in a memory region dedicated for use by TEE 1512, and be executed in TEE 1512 to isolate CBP application agent 1523 from the normal application execution environment 1511. CBP application agent 1523 can be developed by a cloud-based transactions service provider, and may implement security sensitive functions such as contactless logic that interfaces with host card emulation (HCE) APIs in mobile OS 1571 to conduct contactless transactions via the contactless interface (e.g., including transaction cryptogram generation logic and functions such as those described with reference to FIGS. 3-4). In some embodiments, the contactless interface (e.g., contactless transceiver) of portable communication device 1500 is not accessible by applications executing in the normal execution environment 1511 except via the CBP application agent 1523 executing in TEE 1512.

CBP application agent 1523 executing in TEE 1512 may also provide secure storage of account parameters including the LUK, and transaction verification logging of transaction information to support post payment functions such as account parameters replenishment. In some embodiments, CBP application agent 1523 may also provide activity logging of information such as geo-location information, loyalty or couponing information, etc. to support value added services. In some embodiments, the data and information managed by CBP application agent 1523 can be stored encrypted in a dedicated secure storage managed by TEE 1512. As shown in FIG. 15, CBP application agent 1523 does not implement functionalities to directly communicate with external devices outside of portable communication device 1500. This may provide an additional layer of protection to prevent CBP application agent 1523 from being remotely accessed by external devices or entities.

To allow mobile application 1520 to interface with CBP application agent 1523, CBP application agent 1523 may provide mobile application APIs that mobile application 1520 can call to invoke the functionalities of CBP application agent 1523 and to access accounts parameters provisioned and managed by CBP application agent 1523. For example, mobile application 1520 may call mobile application configuration APIs to provision accounts and request account credentials, or call transaction APIs to conduct a transaction. In some embodiments, CBP application agent 1523 may only respond to mobile application APIs calls from a TEE interface implemented in mobile application 1520. This can prevent rouge applications and malware from calling the mobile application APIs to access CBP application agent 1523.

Mobile application 1520 may include mobile application code 1521 developed by an issuer, merchant, or other third-party, and CBP SDK 1525 developed by a cloud-based transactions service provider. Mobile application 1520 can be stored in a memory region that is outside of TEE 1512, and be executed in a normal application execution environment (e.g., can be executed in its own virtual machine). Mobile application code 1521 may include user interface logic to allow a user to interact with mobile application 1520 (e.g., to initiate a transaction with access device 1560). Mobile application code 1521 may also include communication logic to allow mobile application 1520 to communicate with MAP 1570 or with an issuer or merchant to access issuer or merchant services such as account enrollment.

CBP SDK 1525 may include communication logic to enable mobile application 520 to communicate with CBPP 1580. Thus, in some embodiments, CBP application agent 1523 executing in TEE 1512 does not communicate with CBPP 1580 except via CBP SDK 1525 executing in normal execution environment 1511. In addition to implementing communication logic to communicate with CBPP 1580, CBP SDK 1525 may also include a TEE interface to communicate with CBP application agent 1523. In some embodiments, only TEE interface may call the mobile application APIs to communicate with and access CBP application agent 1523. Furthermore, TEE interface may perform periodic integrity check of mobile application 1520 and may disable access to CBP application agent 1523 if the integrity check of mobile application 1520 fails. In some embodiments, TEE interface may need to authenticate itself to CBP application agent 1523 before CBP application agent 1523 would respond to mobile application API calls from TEE interface.

In some embodiments, both CBP application agent 1523 and CBK SDK 1525 can be protected by a security framework to prevent modification or hacking of their code. For example, CBP application agent 1523 and/or CBK SDK 1525 may include tamper resistance coding such as data and application logic code obfuscation, white box cryptography coding, etc. CBP application agent 1523 and/or CBK SDK 1525 may also include tamper detection protections such as periodic code verification to ensure the code has not been modified. The security framework may also provide secure data storage (e.g., for encryption keys), and device fingerprinting and/or device authentication functions.

Figure 16:
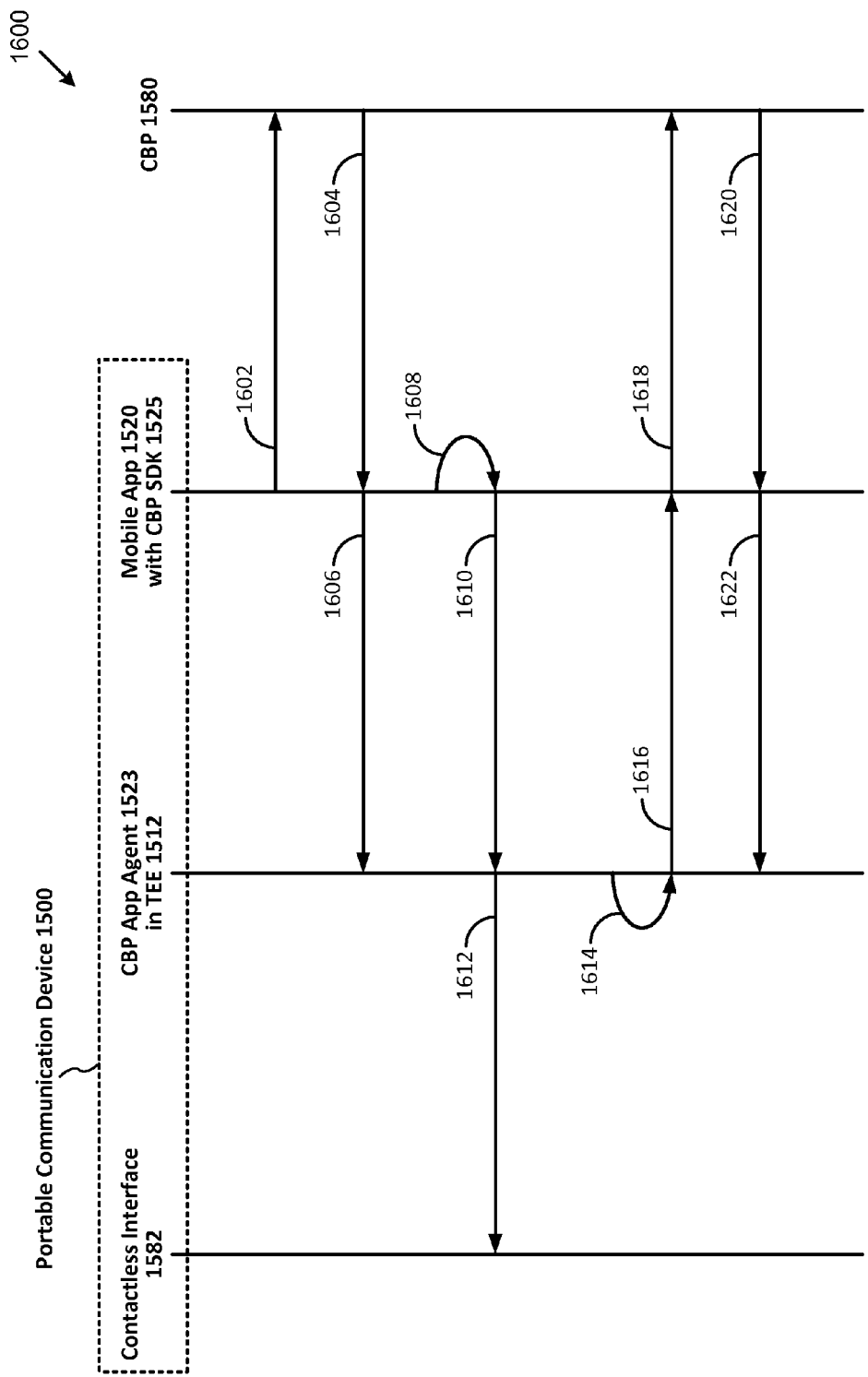
FIG. 16 illustrates a flow diagram of interactions of a trusted execution environment in a cloud-based transaction system, according to some embodiments.

FIG. 16 shows a flow diagram illustrating some of the interactions between CBP application agent 1523 and mobile application 1520 integrated with CBP SDK 1525, according to some embodiments. After a user has downloaded and installed CBP application agent 1523 and mobile application 1520 on portable communication device 1500, a user may enroll an account for the cloud-based transaction services via mobile application 1520. Once an account has been enrolled, mobile application 1520 may send a request for an initial set of account parameters (e.g., token, LUK, etc.) at step 1602 to CBPP 1580. In response, CBPP 1580 may verify the account and mobile application 1520, and generate an initial set of account parameters for mobile application 1520, including a LUK that is associated with a set of one or more limited-use thresholds that limits usage of the LUK. At step 1604, CBPP 1580 sends the initial set of account parameters to mobile application 1520.

Upon receiving the account parameters including the LUK from CBPP 1580 by mobile application 1520 executing in the normal execution environment of portable communication device 1500, mobile application 1502 may send, at step 1606, the account parameters including the LUK to CBP application agent 1523 executing in TEE 1512 via the TEE interface of mobile application 1520. In response to receiving the account parameters including the LUK from mobile application 1520, CBP application agent 1523 may store the account parameters including the LUK in a secure storage of TEE 1512. In some embodiments, CBP application agent 1523 may encrypt the account parameters and the LUK, and store them in an encrypted form in the secure storage of TEE 1512.

At step 1608, mobile application 1520 executing in the normal execution environment may receive a request to conduct a transaction. The request to conduct a transaction can be received based on user interaction with mobile application 1520. For example, a user may launch mobile application 1520, and wave portable communication device 1500 in proximity to an access device to initiate a transaction, or issue a command on the user interface of portable communication device 1500 to initiate a transaction (e.g., press a "pay" button displayed on the user interface). If any consumer verification method is required (e.g., entry of a PIN), mobile application 1520 may verify the consumer verification method, and forward the request to conduct the transaction to CBP application agent 1523 executing in TEE 1512 at step 1610 (e.g., by invoking a transaction API via the TEE interface).

When CBP application agent 1523 executing in TEE 1512 receives the request to conduct the transaction, CBP application agent 1523 may generate a transaction cryptogram using the LUK (e.g., in accordance with the techniques described herein). At step 1612, CBP application agent 1523 may access the contactless interface (e.g., a contactless transceiver such as a NFC transceiver) of portable communicate device 1500 to transmit the transaction cryptogram to an access device to conduct the transaction. This can be achieved, for example, by CBP application agent 1523 accessing the HCE APIs provided by the operating system of portable communicate device 1500. In some embodiments, CBP application agent 1523 executing in TEE 512 may be able to directly communicate with the access device via the contactless interface. Once the transaction is complete, CBP application agent 1523 may store transaction information associated with the transaction in a transaction verification log. Additional transactions can be performed in a similar manner.

At step 1614, CBP application agent 1523 may detect that one or more of the limited-use thresholds associated with the LUK has been or is about to be exceeded. At step 1616, CBP application agent 1523 executing in TEE 1512 sends a replenishment request for a new LUK to mobile application 1520 executing in the normal executing environment of portable communication device 1500. In some embodiments, the replenishment request may include transaction log information derived from the transaction verification log stored in TEE 1512. At step 1618, mobile application 1520 executing in the normal execution environment may send the replenish request including the transaction log information to CBP 1580. CBP 1580 may verify the transaction log information received in the replenishment request with the transaction log information at CBP 1580. If the transaction log information matches (e.g., indicating the transaction history of mobile application 1520 matches the transaction history maintained by CBP 1580), CBP 1580 may generate a new LUK for mobile application 1520.

At step 1620, CBP 1580 sends the new LUK (and any additional refreshed account parameters) to mobile application 1520. At step 1622, when mobile application 1520 executing in the normal execution environment receives the new LUK from CBP 1580, mobile application 1520 may send the new LUK (and any additional refreshed account parameters) to CBP application agent 1523 executing in TEE 512 for storage. CBP application agent 1523 then stores the new LUK (and any additional refreshed account parameters) to be used for subsequent transactions. In some embodiments, the old LUK can be deleted by CBP application agent 1523 once a new LUK is received.

Operating System Integration

Figure 17:
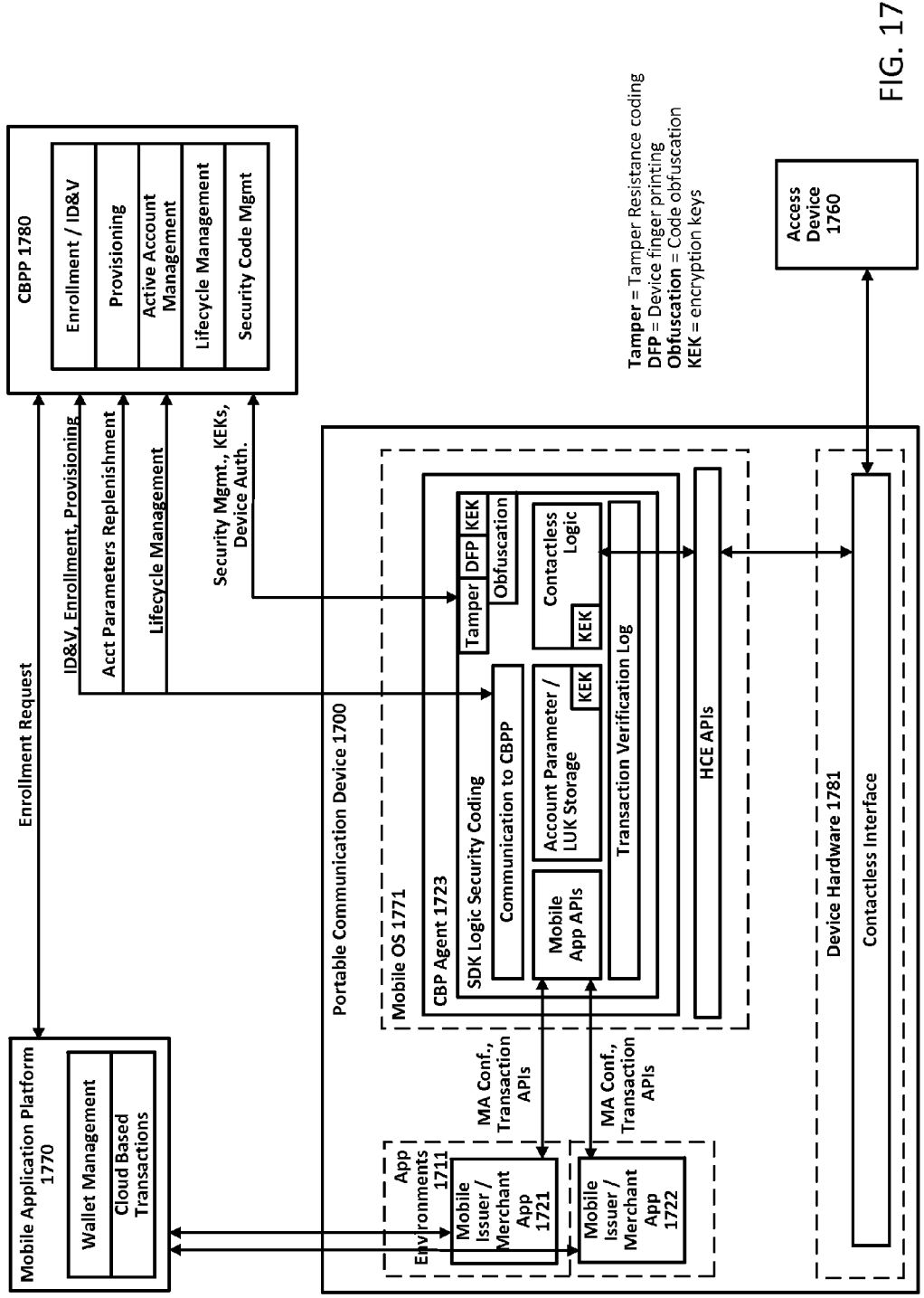
FIG. 17 illustrates a block diagram of a cloud-based transaction system in which a cloud-based transaction agent is incorporated into an operating system, according to some embodiments.

FIG. 17 illustrates a block diagram of a cloud-based transaction system in which the operating system of a portable communication device is used to enable cloud-based transaction functionalities for a mobile application, according to some embodiments. According to this technique, the cloud-based transaction logic and functionalities may be implemented as a CBP agent 623 that is incorporated into the portable communication device's operating system (OS) 1771 (e.g., an Android operating system). The cloud-based transaction logic and functionalities integrated with mobile operating system 1771 can be implemented as OS features or OS services, and a set of operating system calls or functions implemented as mobile application APIs can be invoked by mobile applications (e.g., mobile application 1721, 1722, etc.) to access CBPP 1780. The cloud-based transaction logic and functionalities implemented in CBP agent 1723 incorporated into mobile OS 1771 are similar to those discussed above with reference to CBP application 1423, except that they are executed within the mobile operating system environment. Accordingly, a detailed description of which need not be repeated. Similar to the techniques described above with reference to FIG. 14, integrating CBP agent 1723 into mobile OS 1771 may reduce the amount of memory taken up by the mobile applications as compared to the integrated SDK approach.

XIII. Exemplary Computer System

The various entities or components described herein with reference to FIG. 1 may be associated with or operate one or more computer apparatuses to facilitate the functions described herein. Any of the entities or components in FIG. 1, including any server or database, may use any suitable number of subsystems to facilitate the functions.

Figure 18:
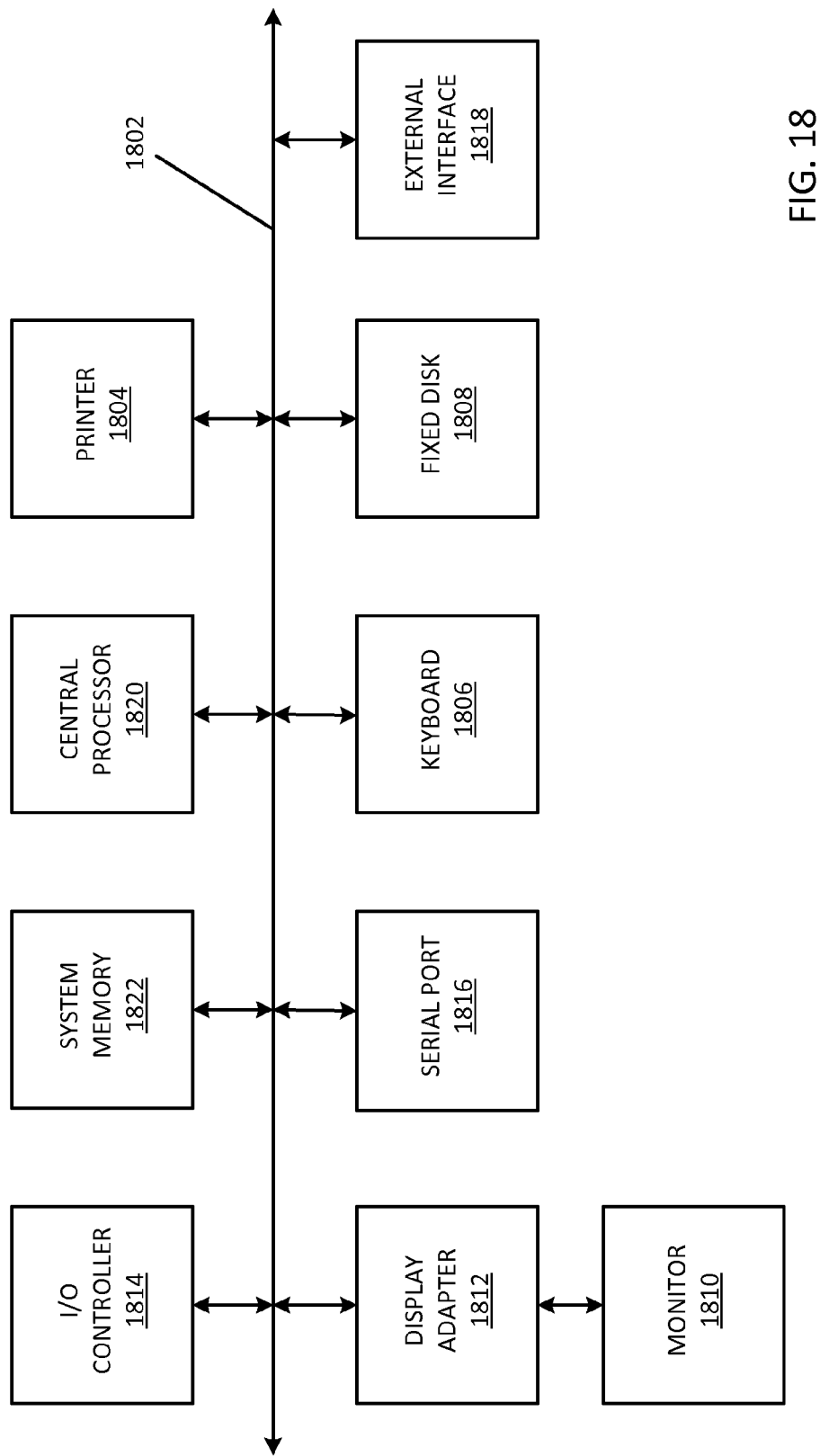
FIG. 18 illustrates a block diagram of an example of a computer system, according to some embodiments.

Examples of such subsystems or components are shown in FIG. 18. The subsystems shown in FIG. 18 are interconnected via a system bus 1802. Additional subsystems such as a printer 1804, keyboard 1806, fixed disk 1808 (or other memory comprising computer readable media), monitor 1810, which is coupled to display adapter 1812, and others are shown. Peripherals and input/output (I/O) devices, which couple to I/O controller 1814 (which can be a processor or other suitable controller), can be connected to the computer system by any number of means known in the art, such as serial port 1816. For example, serial port 1816 or external interface 1818 can be used to connect the computer apparatus to a wide area network such as the Internet, a mouse input device, or a scanner. The interconnection via system bus allows the central processor 1820 to communicate with each subsystem and to control the execution of instructions from system memory 1822 or the fixed disk 1808, as well as the exchange of information between subsystems. The system memory 1822 and/or the fixed disk 1808 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A portable communication device comprising:
    a processor device;
    a contactless transceiver coupled to the processor device;
    a first memory region storing an application executing in a normal execution environment; and
    a second memory region storing an application agent executing in a trusted execution environment,
    wherein the application agent receives, from the application executing in the normal execution environment, a limited-use key (LUK) generated by a remote computer and associated with a set of one or more limited-use thresholds that limits usage of the LUK, stores the LUK in a secure storage of the trusted execution environment, receives a request to conduct a transaction from the application executing in the normal execution environment, generates a transaction cryptogram using the LUK, accesses the contactless transceiver, and transmits the transaction cryptogram to an access device via the contactless transceiver, and
    wherein the application agent sends a replenishment request for a second LUK to the application executing in the normal execution environment, the replenishment request including transaction log information derived from a transaction log stored in the trusted execution environment, receives the second LUK from the application executing in the normal execution environment when the transaction log information in the replenishment request matches transaction log information at the remote computer, and stores the second LUK in the secure storage of the trusted execution environment.

2. The portable communication device of claim 1, wherein the application agent further stores the transaction log in the secure storage of the trusted execution environment.

3. The portable communication device of claim 1, wherein the contactless transceiver of the portable communication device is not accessible by the application executing in the normal execution environment except via the application agent executing in the trusted execution environment.

4. The portable communication device of claim 1, wherein the application agent executing in the trusted execution environment does not communicate with the remote computer except via the normal execution environment.

5. The portable communication device of claim 1, wherein the trusted execution environment is implemented as a virtual machine or as a secure operating mode of the processor.

6. The portable communication device of claim 1, wherein the transaction log information includes an authentication code computed over at least a portion of the transaction log.

7. A method for enhancing security of a portable communication device, the method comprising:
    receiving, from a remote computer by an application executing in a normal execution environment of the portable communication device, a limited-use key (LUK) that is associated with a set of one or more limited-use thresholds that limits usage of the LUK;
    sending, by the application executing in the normal execution environment, the LUK to an application agent executing in a trusted execution environment of the portable communication device;
    receiving, by the application executing in the normal execution environment, a request to conduct a transaction;
    sending, by the application executing in the normal execution environment, the request to conduct the transaction to the application agent executing in the trusted execution environment, wherein the application agent generates a transaction cryptogram using the LUK, and accesses a contactless interface of the portable communication device to transmit the transaction cryptogram to an access device to conduct the transaction;
    receiving, from the application agent executing in the trusted execution environment, a replenishment request for a second LUK, the replenishment request including transaction log information derived from a transaction log stored in the trusted execution environment;
    sending, by the application executing in the normal execution environment, the replenish request to the remote computer;
    receiving, by the application executing in the normal execution environment, the second LUK from the remote computer when the transaction log information in the replenishment request matches transaction log information at the remote computer; and
    sending, by the application executing in a normal execution environment, the second LUK to the application agent executing in the trusted execution environment for storage.

8. The method of claim 7, wherein the application agent stores the transaction log in the trusted execution environment.

9. The method of claim 7, wherein the contactless interface of the portable communication device is not accessible by the application executing in the normal execution environment except via the application agent executing in the trusted execution environment.

10. The method of claim 7, wherein the application agent executing in the trusted execution environment does not communicate with the remote computer except via the normal execution environment.

11. The method of claim 7, wherein the trusted execution environment is implemented in a first virtual machine, and the normal execution environment is implemented in a second virtual machine.

12. The method of claim 7, wherein the trusted execution environment is implemented as a secure operating mode in the processor of the portable communication device.

13. The method of claim 7, wherein the transaction log information includes an authentication code computed over at least a portion of the transaction log.

14. A method for enhancing security of a portable communication device, the method comprising:
    receiving, by an application agent executing in a trusted execution environment of the portable communication device, a limited-use key (LUK) from an application executing in a normal execution environment of the portable communication device, the LUK associated with a set of one or more limited-use thresholds that limits usage of the LUK, and provided to the application executing in the normal execution environment from a remote computer;
    storing, by the application agent executing in the trusted execution environment, the LUK in a secure storage of the trusted execution environment;
    receiving, by the application agent executing in the trusted execution environment, a request to conduct a transaction from the application executing in the normal execution environment;
    generating, by the application agent executing in the trusted execution environment, a transaction cryptogram using the LUK;
    accessing a contactless interface of the portable communication device to transmit the transaction cryptogram to an access device to conduct the transaction;
    sending a replenishment request for a second LUK, the replenishment request including transaction log information derived from a transaction log stored in the trusted execution environment;
    receiving the second LUK when the transaction log information in the replenishment request matches transaction log information at the remote computer; and
    storing the second LUK in a secure storage of the trusted execution environment.

15. The method of claim 14, further comprising:
    storing, by the application agent executing in the trusted execution environment, the transaction log in the secure storage of the trusted execution environment.

16. The method of claim 14, wherein the contactless interface of the portable communication device is not accessible to the application executing in the normal execution environment except via the application agent executing in the trusted execution environment.

17. The method of claim 14, wherein the application agent executing in the trusted execution environment does not communicate with the remote computer except via the normal execution environment.

18. The method of claim 14, wherein the trusted execution environment is implemented in a first virtual machine, and the normal execution environment is implemented in a second virtual machine.

19. The method of claim 14, wherein the trusted execution environment is implemented as a secure operating mode in the processor of the portable communication device.

20. The method of claim 14, wherein the transaction log information includes an authentication code computed over at least a portion of the transaction log.

* * * * *